(12) United States Patent
Huang et al.

(10) Patent No.: US 11,778,541 B2
(45) Date of Patent: Oct. 3, 2023

(54) CHANNEL BANDWIDTH CONFIGURATION METHOD AND DEVICE

(71) Applicant: HUAWEI TECHNOLOGIES CO., LTD., Guangdong (CN)

(72) Inventors: Guogang Huang, Shenzhen (CN); Ming Gan, Shenzhen (CN); Yunbo Li, Shenzhen (CN); Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/939,815

(22) Filed: Sep. 7, 2022

(65) Prior Publication Data

US 2023/0007571 A1 Jan. 5, 2023

Related U.S. Application Data

(63) Continuation of application No. PCT/CN2021/076916, filed on Feb. 19, 2021.

(30) Foreign Application Priority Data

Apr. 17, 2020 (CN) .......................... 202010308094.4

(51) Int. Cl.
*H04L 12/28* (2006.01)
*H04W 48/08* (2009.01)
(Continued)

(52) U.S. Cl.
CPC ....... *H04W 48/08* (2013.01); *H04W 72/0453* (2013.01)

(58) Field of Classification Search
CPC . H04L 1/0068; H04L 1/1614; H04L 27/2602; H04W 72/042; H04W 72/0453; H04W 28/20; H04W 84/12
(Continued)

(56) References Cited

U.S. PATENT DOCUMENTS

2019/0327740 A1* 10/2019 Verma .................. H04L 5/0044
2021/0212035 A1* 7/2021 Son ........................ H04H 20/95
(Continued)

FOREIGN PATENT DOCUMENTS

CN 108391304 A 8/2018
CN 110730050 A 1/2020
(Continued)

OTHER PUBLICATIONS

Chu et al., "EHT BSS with Wider BW," IEEE 802.11-20/0398r2, Mar. 1, 2020, 16 pages.
(Continued)

*Primary Examiner* — John Pezzlo
(74) *Attorney, Agent, or Firm* — Fish & Richardson P.C.

(57) ABSTRACT

Embodiments of this application provide a channel bandwidth configuration method and a device. The method includes: receiving bandwidth configuration information of a BSS, where the bandwidth configuration information of the BSS is carried in an EHT operation element, the EHT operation element includes a channel bandwidth field, a first channel center frequency field, and a second channel center frequency field, the channel bandwidth field indicates channel bandwidth information of the BSS, the first channel center frequency field and the second channel center frequency field indicate channel location information of the BSS, and the bandwidth information is any channel bandwidth in a plurality of channel bandwidths supported by a terminal; and obtaining the channel bandwidth information and the channel location information based on the bandwidth configuration information of the BSS. This application can be applied to a Wi-Fi system that supports the 802.11 standard, for example, the 802.11be standard.

19 Claims, 25 Drawing Sheets

(51) Int. Cl.
*H04W 72/0453* (2023.01)
*H04J 1/16* (2006.01)

(58) Field of Classification Search
USPC .......................................... 370/252, 329, 430
See application file for complete search history.

(56) References Cited

U.S. PATENT DOCUMENTS

| | | | | |
|---|---|---|---|---|
| 2021/0298076 A1* | 9/2021 | Kim | .................. | H04W 72/0453 |
| 2021/0321388 A1* | 10/2021 | Kwon | ............... | H04W 72/0453 |
| 2022/0393843 A1* | 12/2022 | Verma | .................... | H04L 5/0044 |
| 2023/0016370 A1* | 1/2023 | Kim | ....................... | H04L 5/0053 |
| 2023/0076285 A1* | 3/2023 | Ko | ......................... | H04W 74/08 |

FOREIGN PATENT DOCUMENTS

| | | |
|---|---|---|
| CN | 110769467 A | 2/2020 |
| CN | 110831107 A | 2/2020 |
| WO | 2019240541 A1 | 12/2019 |
| WO | 2020024883 A1 | 2/2020 |
| WO | 2020043196 A1 | 3/2020 |

OTHER PUBLICATIONS

IEEE Std 802.11-2016, "IEEE Standard for Information technology—Telecommunications and Information Exchange between Systems Local and Metropolitan Area Networks—Specific Requirements, Part 11: Wireless LAN Medium Access Control (MAC) and Physical Layer (PHY) Specifications," Dec. 2016, 3534 pages.

IEEE Std 802.11ac-2013, "IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 4: Enhancements for Very High Throughput for Operation in Bands below 6 GHz," Dec. 11, 2013, 425 pages.

IEEE P802.11ax/D6.0, "Draft Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," Nov. 2019, 780 pages.

Huawei et al., "NR Numerology and Frame Structure for Unlicensed Bands," 3GPP TSG RAN WG1 Meeting #95, Spokane, USA, 12-16 Nov. 16, 2018, 13 pages.

PCT International Search Report and Written Opinion issued in International Application No. PCT/CN2021/076916 dated Apr. 27, 2021, 15 pages (with English translation).

Chu et al., "EHT BSS with Wider BW," IEEE 802.11-20/0398r1, Mar. 1, 2020, 18 pages.

Huang et al., "320 MHz BSS Configuration," IEEE 802.11-20/0384r1, Feb. 6, 2020, 10 pages.

Extended European Search Report in European Appln No. 21787821.4, dated Aug. 8, 2023, 10 pages.

* cited by examiner

CHANNEL BANDWIDTH CONFIGURATION METHOD AND DEVICE

CROSS-REFERENCE TO RELATED APPLICATIONS

This application is a continuation of International Application No. PCT/CN2021/076916, filed on Feb. 19, 2021, which claims priority to Chinese Patent Application No. 202010308094.4, filed on Apr. 17, 2020. The disclosures of the aforementioned applications are hereby incorporated by reference in their entireties.

TECHNICAL FIELD

Embodiments of this application relate to the communication field, and in particular, to a channel bandwidth configuration method and a device.

BACKGROUND

Currently, large-scale application and deployment of a wireless communication system can provide various types of communication, for example, voice, data, and multimedia services, for a plurality of users.

The Institute of Electrical and Electronics Engineers (IEEE) 802.11 is one of current mainstream wireless access standards and currently has been widely used in commercial applications. In the IEEE 802.11a standard, only a bandwidth of 20 megahertzes (MHz) is supported, and the bandwidth continuously increases in a subsequent standard evolution process. The 802.11n standard supports a maximum bandwidth of 40 MHz, the 802.11ac/ax standard supports a maximum bandwidth of 160 MHz, and the 802.11be standard supports a maximum bandwidth of 320 MHz.

An access point (AP) device may establish a basic service set (BSS), and indicate a channel bandwidth and location of the BSS to a station (STA).

In a solution in the conventional technology, with respect to an extended bandwidth, for example, a bandwidth higher than 160 MHz, when a channel bandwidth of a BSS is configured for an extremely high throughput (EHT) STA, the EHT STA needs to read a very high throughput (VHT) operation element, a high throughput (HT) operation element and an EHT operation element, or a high efficiency (HE) operation element and an EHT operation element that is/are delivered by an AP. However, a VHT STA or HE STA reads an operating mode notification element or an Operating Mode Notification frame to ignore a bandwidth indication of the VHT operation element or the HE operation element and update a channel bandwidth configuration of the BSS. Therefore, the conventional technology requires that the EHT STA should ignore the Operating Mode Notification frame. However, the previous protocol specifies that a legacy STA (including an HT STA, a VHT STA, or an HE STA) and a new generation STA (EHT STA) can both read the Operating Mode Notification frame. In other words, to implement the foregoing manner in the conventional technology, usage of the Operating Mode Notification frame in the previous protocol needs to be changed.

SUMMARY

This application provides a channel bandwidth configuration method and a device to reduce signaling overheads to some extent.

To achieve the foregoing objective, the following technical solutions are used in this application.

According to a first aspect, an embodiment of this application provides a channel bandwidth configuration method. The method includes: A terminal device receives bandwidth configuration information of a BSS, where the bandwidth configuration information of the BSS is carried in an extremely high throughput operation element, the extremely high throughput operation element includes a channel bandwidth field, a first channel center frequency field, and a second channel center frequency field, the channel bandwidth field is used to indicate channel bandwidth information of the BSS, the first channel center frequency field and the second channel center frequency field are used to indicate channel location information of the BSS, and the bandwidth information is any channel bandwidth in a plurality of channel bandwidths that can be supported by the terminal device. The terminal device obtains the channel bandwidth information and the channel location information based on the bandwidth configuration information of the BSS.

Based on the foregoing manner, channel bandwidth indications of the BSS are implemented for an EHT STA and a legacy STA separately by using the newly defined EHT operation element and an HT/VHT/HE operation element defined in an existing standard.

In a possible implementation, the extremely high throughput operation element further includes a puncture information field used to indicate a punctured channel in the BSS.

Based on the foregoing manner, the punctured channel of the EHT STA may be indicated by using the extremely high throughput operation element, that is, when the punctured channel exists, the channel bandwidth indications of the BSS are implemented for the EHT STA and the legacy STA separately by using the newly defined EHT operation element and the HT/VHT/HE operation element defined in the existing standard.

In a possible implementation, the puncture information field includes at least one bit; the bit one-to-one corresponds to a channel element in a channel bandwidth of the BSS; and when the bit is a first preset bit value, it indicates that the corresponding channel element is a punctured channel, and the channel element is 20 MHz.

Based on the foregoing manner, a manner of indicating a location of the punctured channel is implemented.

In a possible implementation, the puncture information field includes puncture mode indication information used to indicate that the punctured channel is in any one of preset punctured channel modes.

Based on the foregoing manner, a manner of indicating a location of the punctured channel is implemented.

In a possible implementation, the method further includes, receiving a high throughput operation element, where the high throughput operation element includes a primary channel field, and primary channel information is carried in the primary channel field.

Based on the foregoing manner, the EHT STA can further obtain the primary channel information by reading the high throughput operation element in a 5 GHz frequency band.

In a possible implementation, the method further includes: receiving a high efficiency operation element, where the high efficiency operation element includes a primary channel field, and primary channel information is carried in the primary channel field.

Based on the foregoing manner, the EHT STA can further obtain the primary channel information by reading the high efficiency operation element in a 6 GHz frequency band.

In a possible implementation, the channel bandwidth field indicates a first preset value, a second preset value, or a third preset value, the first channel center frequency field includes first channel center frequency information used to indicate a center frequency of the channel bandwidth of the BSS, the second channel center frequency field includes second channel center frequency information, and the second channel center frequency information is zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

Based on the foregoing manner, a manner of indicating the channel bandwidth of the BSS by using the extremely high throughput operation element is implemented.

In a possible implementation, the channel bandwidth field indicates a fourth preset value, the first channel center frequency field includes third channel center frequency information used to indicate a center frequency of a first segment of the BSS, and the second channel center frequency field includes fourth channel center frequency information used to indicate a center frequency of a second segment of the BSS, where the fourth preset value is used to indicate that the channel bandwidth of the BSS is 160 MHz or 80+80 MHz; and if a difference between the third channel center frequency information and the fourth channel center frequency information is equal to a first preset difference, the channel bandwidth of the BSS is 160 MHz; or if a difference between the third channel center frequency information and the fourth channel center frequency information is greater than a second preset difference, the channel bandwidth of the BSS is 80+80 MHz.

Based on the foregoing manner, a manner of indicating the channel bandwidth of the BSS by using the extremely high throughput operation element is implemented.

In a possible implementation, the channel bandwidth field indicates a fifth preset value, the first channel center frequency field includes fifth channel center frequency information used to indicate a center frequency of a first segment of the BSS, and the second channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fifth channel center frequency information and the sixth channel center frequency information is equal to a third preset difference, the channel bandwidth of the BSS is 320 MHz; or if a difference between the third channel center frequency information and the fourth channel center frequency information is greater than a fourth preset difference, the channel bandwidth of the BSS is 160+160 MHz.

Based on the foregoing manner, a manner of indicating the channel bandwidth of the BSS by using the extremely high throughput operation element is implemented.

According to a second aspect, an embodiment of this application provides a channel bandwidth configuration method. The method includes: A network device generates bandwidth configuration information of a BSS, where the bandwidth configuration information of the BSS is carried in an extremely high throughput operation element, the extremely high throughput operation element includes a channel bandwidth field, a first channel center frequency field, and a second channel center frequency field, the channel bandwidth field is used to indicate channel bandwidth information of the BSS, the first channel center frequency field and the second channel center frequency field are used to indicate channel location information of the BSS, and the bandwidth information is any channel bandwidth in a plurality of channel bandwidths that can be supported by a terminal device. The network device sends the bandwidth configuration information of the BSS.

In a possible implementation, the extremely high throughput operation element further includes a puncture information field used to indicate a punctured channel in the BSS.

In a possible implementation, the puncture information field includes at least one bit; the bit one-to-one corresponds to a channel element in a channel bandwidth of the BSS; and when the bit is a first preset bit value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the network device sends a high throughput operation element, where the high throughput operation element carries primary channel information of the BSS.

In a possible implementation, the network device sends a high efficiency operation element, where the high efficiency operation element carries primary channel information of the BSS.

In a possible implementation, the channel bandwidth field indicates a first preset value, a second preset value, or a third preset value, the first channel center frequency field includes first channel center frequency information used to indicate a center frequency of the channel bandwidth of the BSS, the second channel center frequency field includes second channel center frequency information, and the second channel center frequency information is zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

In a possible implementation, the channel bandwidth field indicates a fourth preset value, the first channel center frequency field includes third channel center frequency information used to indicate a center frequency of a first segment of the BSS, and the second channel center frequency field includes fourth channel center frequency information used to indicate a center frequency of a second segment of the BSS, where the fourth preset value is used to indicate that the channel bandwidth of the BSS is 160 MHz or 80+80 MHz; and if a difference between the third channel center frequency information and the fourth channel center frequency information is equal to a first preset difference, the channel bandwidth of the BSS is 160 MHz; or if a difference between the third channel center frequency information and the fourth channel center frequency information is greater than a second preset difference, the channel bandwidth of the BSS is 80+80 MHz.

In a possible implementation, the channel bandwidth field indicates a fifth preset value, the first channel center frequency field includes fifth channel center frequency information used to indicate a center frequency of a first segment of the BSS, and the second channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fifth channel center frequency information and the sixth channel center frequency information is equal to a third preset difference, the channel bandwidth of the BSS is 320 MHz; or if a difference between the third channel center frequency information and the fourth channel center frequency information is greater than a fourth preset difference, the channel bandwidth of the BSS is 160+160 MHz.

According to a third aspect, an embodiment of this application provides a channel bandwidth configuration method. The method is applied to a terminal device and includes: receiving bandwidth configuration information of a BSS, where the bandwidth configuration information of the BSS is carried in an extremely high throughput operation element, the extremely high throughput operation element includes a channel bandwidth field and a center frequency field, the channel bandwidth field is used to indicate channel bandwidth information of the BSS, the center frequency field is used to indicate location information of the BSS, and the bandwidth information is any channel bandwidth in a plurality of channel bandwidths that can be supported by the terminal device; and obtaining the channel bandwidth information and the location information based on the bandwidth configuration information of the BSS.

In a possible implementation, the center frequency field includes a first channel center frequency field, where the first channel center frequency field includes first channel center frequency information used to indicate a center frequency of a channel bandwidth of the BSS.

Based on the foregoing manner, different formats of the extremely high throughput operation element are implemented, and one center frequency field may be included to indicate a channel bandwidth configuration of the BSS.

In a possible implementation, the center frequency field includes a second channel center frequency field and a third channel center frequency field, where the second channel center frequency field includes second channel center frequency information used to indicate a center frequency of a first segment of the BSS, and the third channel center frequency field includes third channel center frequency information used to indicate a center frequency of a second segment of the BSS.

In a possible implementation, the channel bandwidth field indicates any one of a first preset value, a second preset value, a third preset value, a fourth preset value, a fifth preset value, and a sixth preset value, where the first preset value is used to indicate that the channel bandwidth of the BSS is 20 MHz, the second preset value is used to indicate that the channel bandwidth of the BSS is 40 MHz, the third preset value is used to indicate that the channel bandwidth of the BSS is 80 MHz, the fourth preset value is used to indicate that the channel bandwidth of the BSS is 160 MHz, the fifth preset value is used to indicate that the channel bandwidth of the BSS is 240 MHz, and the sixth preset value is used to indicate that the channel bandwidth of the BSS is 320 MHz.

Based on the foregoing manner, different channel bandwidths correspond to values in different channel bandwidth fields.

In a possible implementation, the channel bandwidth field indicates any one of a seventh preset value, an eighth preset value, a ninth preset value, and a tenth preset value, where the seventh preset value is used to indicate that the channel bandwidth of the BSS is 80+80 MHz, the eighth preset value is used to indicate that the channel bandwidth of the BSS is 160+80 MHz, the ninth preset value is used to indicate that the channel bandwidth of the BSS is 80+160 MHz, and the tenth preset value is used to indicate that the channel bandwidth of the BSS is 160+160 MHz.

In a possible implementation, the extremely high throughput operation element further includes a puncture information field used to indicate a punctured channel in the BSS.

In a possible implementation, the puncture information field includes at least one bit; the bit one-to-one corresponds to a channel element in the channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the method further includes: receiving a high throughput operation element, where the high throughput operation element includes a primary channel field, and identification information of a primary channel is carried in the primary channel field.

In a possible implementation, the method further includes: receiving a high efficiency operation element, where the high efficiency operation element includes a primary channel field, and identification information of a primary channel is carried in the primary channel field.

According to a fourth aspect, an embodiment of this application provides a channel bandwidth configuration method. The method includes: A network device generates bandwidth configuration information of a BSS, where the bandwidth configuration information of the BSS is carried in an extremely high throughput operation element, the extremely high throughput operation element includes a channel bandwidth field and a center frequency field, the channel bandwidth field is used to indicate channel bandwidth information of the BSS, the center frequency field is used to indicate location information of the BSS, and the bandwidth information is any channel bandwidth in a plurality of channel bandwidths that can be supported by a terminal device. The network device sends the bandwidth configuration information of the BSS.

In a possible implementation, the center frequency field includes a first channel center frequency field, where the first channel center frequency field includes first channel center frequency information used to indicate a center frequency of a channel bandwidth of the BSS.

In a possible implementation, the center frequency field includes a second channel center frequency field and a third channel center frequency field, where the second channel center frequency field includes second channel center frequency information used to indicate a center frequency of a first segment of the BSS, and the third channel center frequency field includes third channel center frequency information used to indicate a center frequency of a second segment of the BSS.

In a possible implementation, the channel bandwidth field indicates any one of a first preset value, a second preset value, a third preset value, a fourth preset value, a fifth preset value, and a sixth preset value, where the first preset value is used to indicate that the channel bandwidth of the BSS is 20 MHz, the second preset value is used to indicate that the channel bandwidth of the BSS is 40 MHz, the third preset value is used to indicate that the channel bandwidth of the BSS is 80 MHz, the fourth preset value is used to indicate that the channel bandwidth of the BSS is 160 MHz, the fifth preset value is used to indicate that the channel bandwidth of the BSS is 240 MHz, and the sixth preset value is used to indicate that the channel bandwidth of the BSS is 320 MHz.

In a possible implementation, the channel bandwidth field indicates any one of a seventh preset value, an eighth preset value, a ninth preset value, and a tenth preset value, where the seventh preset value is used to indicate that the channel bandwidth of the BSS is 80+80 MHz, the eighth preset value is used to indicate that the channel bandwidth of the BSS is 160+80 MHz, the ninth preset value is used to indicate that the channel bandwidth of the BSS is 80+160 MHz, and the tenth preset value is used to indicate that the channel bandwidth of the BSS is 160+160 MHz.

In a possible implementation, the extremely high throughput operation element further includes a puncture information field used to indicate a punctured channel in the BSS.

In a possible implementation, the puncture information field includes at least one bit; the bit one-to-one corresponds to a channel element in the channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the network device sends a high throughput operation element, where the high throughput operation element carries primary channel information of the BSS.

In a possible implementation, the network device sends a high efficiency operation element, where the high efficiency operation element carries primary channel information of the BSS.

According to a fifth aspect, an embodiment of this application provides a channel bandwidth configuration method. The method is applied to a terminal device and includes: receiving bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, and a third center frequency field, the channel bandwidth field is used to indicate channel bandwidth information of the BSS, the first channel center frequency field, the second channel center frequency field, and the third channel center frequency field are used to indicate location information of the BSS, and the bandwidth information is any channel bandwidth in a plurality of channel bandwidths that can be supported by the terminal device; and obtaining the channel bandwidth information and the location information based on the bandwidth configuration information of the BSS.

In a possible implementation, the extremely high throughput operation element further includes a puncture information field used to indicate a punctured channel in the BSS.

In a possible implementation, the puncture information field includes at least one bit, the bit one-to-one corresponds to a channel element in a channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the method further includes, receiving a high throughput operation element, where the high throughput operation element includes a primary channel field, and identification information of a primary channel is carried in the primary channel field.

In a possible implementation, the method further includes: receiving a high efficiency operation element, where the high efficiency operation element includes a primary channel field, and identification information of a primary channel is carried in the primary channel field.

In a possible implementation, the channel bandwidth field indicates a first preset value, a second preset value, or a third preset value, the first channel center frequency field includes first channel center frequency information used to indicate a center frequency of the channel bandwidth of the BSS, and the second channel center frequency field and the third channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

In a possible implementation, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field is set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a second preset difference, the channel bandwidth of the BSS is 80+80 MHz.

In a possible implementation, the channel bandwidth field indicates a fifth preset value, the first channel center frequency field includes fourth channel center frequency information, the second channel center frequency field includes fifth channel center frequency information, the first channel center frequency field and the second channel center frequency field are used to indicate a center frequency of a first segment of the BSS, and the third channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fourth channel center frequency information and the fifth channel center frequency information is equal to a third preset difference, and a difference between the fifth channel center frequency information and the sixth channel center frequency information is equal to a fourth preset difference, the channel bandwidth of the BSS is 320 MHz; or if a difference between the fourth channel center frequency information and the fifth channel center frequency information is equal to a fifth preset value, and a difference between the fifth channel center frequency information and the sixth channel center frequency information is greater than a sixth preset difference, the channel bandwidth of the BSS is 160+160 MHz.

According to a sixth aspect, an embodiment of this application provides a channel bandwidth configuration method. The method includes: A network device generates bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, and a third center frequency field, the channel bandwidth field is used to indicate channel bandwidth information of the BSS, the first channel center frequency field, the second channel center frequency field, and the third channel center frequency field are used to indicate location information of the BSS, and the bandwidth information is any channel bandwidth in a plurality of channel bandwidths that can be supported by a terminal device. The network device sends the bandwidth configuration information of the BSS.

In a possible implementation, the extremely high throughput operation element further includes a puncture information field used to indicate a punctured channel in the BSS.

In a possible implementation, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the method further includes: sending a high throughput operation element, where the high throughput operation element includes a primary channel field, and identification information of a primary channel is carried in the primary channel field.

In a possible implementation, the method further includes: sending a high efficiency operation element, where the high efficiency operation element includes a primary channel field, and identification information of a primary channel is carried in the primary channel field.

In a possible implementation, the channel bandwidth field indicates a first preset value, a second preset value, or a third preset value, the first channel center frequency field includes first channel center frequency information used to indicate a center frequency of the channel bandwidth of the BSS, and the second channel center frequency field and the third channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

In a possible implementation, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field is set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a second preset difference, the channel bandwidth of the BSS is 80+80 MHz.

In a possible implementation, the channel bandwidth field indicates a fifth preset value, the first channel center frequency field includes fourth channel center frequency information, the second channel center frequency field includes fifth channel center frequency information, the first channel center frequency field and the second channel center frequency field are used to indicate a center frequency of a first segment of the BSS, and the third channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fourth channel center frequency information and the fifth channel center frequency information is equal to a third preset difference, and a difference between the fifth channel center frequency information and the sixth channel center frequency information is equal to a fourth preset difference, the channel bandwidth of the BSS is 320 MHz; or if a difference between the fourth channel center frequency information and the fifth channel center frequency information is equal to a fifth preset value, and a difference between the fifth channel center frequency information and the sixth channel center frequency information is greater than a sixth preset difference, the channel bandwidth of the BSS is 160+160 MHz.

According to a seventh aspect, an embodiment of this application provides a channel bandwidth configuration method. The method is applied to a terminal device and includes: receiving bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, a third center frequency field, and a fourth center frequency field, the channel bandwidth field is used to indicate channel bandwidth information of the BSS, the first channel center frequency field, the second channel center frequency field, the third center frequency field, and the fourth center frequency field are used to indicate location information of the BSS, and the bandwidth information is any channel bandwidth in a plurality of channel bandwidths that can be supported by the terminal device; and obtaining the channel bandwidth information and the location information based on the bandwidth configuration information of the BSS.

In a possible implementation, the extremely high throughput operation element further includes a puncture information field used to indicate a punctured channel in the BSS.

In a possible implementation, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the method further includes: receiving a high throughput operation element, where the high throughput operation element includes a primary channel field, and identification information of a primary channel is carried in the primary channel field.

In a possible implementation, the method further includes: receiving a high efficiency operation element, where the high efficiency operation element includes a primary channel field, and identification information of a primary channel is carried in the primary channel field.

In a possible implementation, the channel bandwidth field indicates a first preset value, a second preset value, or a third preset value, the first channel center frequency field includes first channel center frequency information used to indicate a center frequency of the channel bandwidth of the BSS, and the second channel center frequency field, the third channel center frequency field, and the fourth channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

In a possible implementation, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field and the fourth channel center frequency field are set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a first preset difference, the channel bandwidth of the BSS is 80+80 MHz.

In a possible implementation, the channel bandwidth field indicates a fifth preset value, the first channel center frequency field includes fourth channel center frequency information used to indicate a center frequency of a first segment of the BSS, the second channel center frequency field includes fifth channel center frequency information used to indicate a center frequency of a second segment of the BSS, the third channel center frequency field includes sixth channel center frequency information used to indicate a center frequency of a third segment of the BSS, and the fourth channel center frequency field is set to zero, where the fifth preset value is used to indicate that the channel bandwidth of the BSS is 240 MHz, 160+80 MHz, or 80+160 MHz; and if a difference between the fourth channel center frequency information and the fifth channel center frequency information is equal to a second preset difference, and a difference between the fifth channel center frequency information and the sixth channel center frequency information is equal to the second preset difference, the channel bandwidth of the BSS is 240 MHz; if a difference between the fourth channel center frequency information and the fifth channel center frequency information is equal to a third preset difference, and a difference between the fifth channel center frequency information and the sixth channel center frequency information is greater than the third preset difference, the channel bandwidth of the BSS is 160+80 MHz; or if a difference between the fourth channel center frequency information and the fifth channel center frequency information is greater than a fourth preset difference, and a difference between the fifth channel center frequency information and the sixth channel center frequency information is equal to the fourth preset difference, the channel bandwidth of the BSS is 80+160 MHz.

In a possible implementation, the channel bandwidth field indicates a sixth preset value, the first channel center frequency field includes seventh channel center frequency information used to indicate a center frequency of a first segment of the BSS, the second channel center frequency field includes eighth channel center frequency information used to indicate a center frequency of a second segment of the BSS, the third channel center frequency field includes ninth channel center frequency information used to indicate a center frequency of a third segment of the BSS, and the fourth channel center frequency field includes tenth channel center frequency information used to indicate a center frequency of a fourth segment of the BSS, where the sixth preset value is used to indicate that the channel bandwidth of the BSS is 320 MHz or 160+160 MHz; and if a difference between the seventh channel center frequency information and the eighth channel center frequency information, a difference between the eighth channel center frequency information and the ninth channel center frequency information, and a difference between the ninth channel center frequency information and the tenth channel center frequency information are all equal to a fifth preset difference, the channel bandwidth of the BSS is 320 MHz; or if a difference between the seventh channel center frequency information and the eighth channel center frequency information and a difference between the seventh channel center frequency information and the tenth channel center frequency information are both equal to a sixth preset difference, and a difference between the eighth channel center frequency information and the ninth channel center frequency information is greater than the sixth preset difference, the channel bandwidth of the BSS is 160+160 MHz.

According to an eighth aspect, an embodiment of this application provides a channel bandwidth configuration method. The method includes: A network device generates bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, a third center frequency field, and a fourth center frequency field, the channel bandwidth field is used to indicate channel bandwidth information of the BSS, the first channel center frequency field, the second channel center frequency field, the third center frequency field, and the fourth center frequency field are used to indicate location information of the BSS, and the bandwidth information is any channel bandwidth in a plurality of channel bandwidths that can be supported by a terminal device. The network device sends the bandwidth configuration information of the BSS.

In a possible implementation, the extremely high throughput operation element further includes a puncture information field used to indicate a punctured channel in the BSS.

In a possible implementation, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

In a possible implementation, the puncture information field includes puncture mode indication information used to indicate that the punctured channel is in any one of preset punctured channel modes.

In a possible implementation, the method further includes: sending a high throughput operation element, where the high throughput operation element includes a primary channel field, and identification information of a primary channel is carried in the primary channel field.

In a possible implementation, the method further includes: sending a high efficiency operation element, where the high efficiency operation element includes a primary channel field, and identification information of a primary channel is carried in the primary channel field.

In a possible implementation, the channel bandwidth field indicates a first preset value, a second preset value, or a third preset value, the first channel center frequency field includes first channel center frequency information used to indicate a center frequency of the channel bandwidth of the BSS, and the second channel center frequency field, the third channel center frequency field, and the fourth channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

In a possible implementation, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field and the fourth channel center frequency field are set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a first preset difference, the channel bandwidth of the BSS is 80+80 MHz.

In a possible implementation, the channel bandwidth field indicates a fifth preset value, the first channel center frequency field includes fourth channel center frequency information used to indicate a center frequency of a first segment of the BSS, the second channel center frequency field includes fifth channel center frequency information used to indicate a center frequency of a second segment of the BSS, the third channel center frequency field includes sixth channel center frequency information used to indicate a center frequency of a third segment of the BSS, and the fourth channel center frequency field is set to zero, where the fifth preset value is used to indicate that the channel bandwidth of the BSS is 240 MHz, 160+80 MHz, or 80+160 MHz- and if a difference between the fourth channel center frequency information and the fifth channel center frequency information is equal to a second preset difference, and a difference between the fifth channel center frequency information and the sixth channel center frequency information is equal to the second preset difference, the channel bandwidth of the BSS is 240 MHz; if a difference between the fourth channel center frequency information and the fifth channel center frequency information is equal to a third preset difference, and a difference between the fifth channel center frequency information and the sixth channel center frequency information is greater than the third preset difference, the channel bandwidth of the BSS is 160+80 MHz; or if a difference between the fourth channel center frequency information and the fifth channel center frequency information is greater than a fourth preset difference, and a difference between the fifth channel center frequency information and the sixth channel center frequency information is equal to the fourth preset difference, the channel bandwidth of the BSS is 80+160 MHz.

In a possible implementation, the channel bandwidth field indicates a sixth preset value, the first channel center frequency field includes seventh channel center frequency information used to indicate a center frequency of a first segment of the BSS, the second channel center frequency field includes eighth channel center frequency information used to indicate a center frequency of a second segment of the BSS, the third channel center frequency field includes ninth channel center frequency information used to indicate a center frequency of a third segment of the BSS, and the fourth channel center frequency field includes tenth channel center frequency information used to indicate a center frequency of a fourth segment of the BSS, where the sixth preset value is used to indicate that the channel bandwidth of the BSS is 320 MHz or 160+160 MHz; and if a difference between the seventh channel center frequency information and the eighth channel center frequency information, a difference between the eighth channel center frequency information and the ninth channel center frequency information, and a difference between the ninth channel center frequency information and the tenth channel center frequency information are all equal to a fifth preset difference, the channel bandwidth of the BSS is 320 MHz; or if a difference between the seventh channel center frequency information and the eighth channel center frequency information and a difference between the seventh channel center frequency information and the tenth channel center frequency information are both equal to a sixth preset difference, and a difference between the eighth channel center frequency information and the ninth channel center frequency information is greater than the sixth preset difference, the channel bandwidth of the BSS is 160+160 MHz.

According to a ninth aspect, an embodiment of this application provides a terminal device, including a transceiver and a processor, where the processor performs the method according to any manner of the first aspect, the third aspect, the fifth aspect, or the seventh aspect, to control the transceiver to receive a signal or send a signal.

According to a tenth aspect, an embodiment of this application provides a network device, including a transceiver and a processor, where the processor performs the method according to any manner of the second aspect, the fourth aspect, the sixth aspect, or the eighth aspect, to control the transceiver to receive a signal or send a signal.

According to an eleventh aspect, an embodiment of this application provides a chip, including an interface and at least one processor, where the processor performs the method according to any manner of the first aspect, the third aspect, the fifth aspect, or the seventh aspect, to control the interface to receive a signal or send a signal.

According to a twelfth aspect, an embodiment of this application provides a chip, including an interface and at least one processor, where the processor performs the method according to any manner of the second aspect, the fourth aspect, the sixth aspect, or the eighth aspect, to control the interface to receive a signal or send a signal.

According to a thirteenth aspect, an embodiment of this application provides a terminal device, including a transceiver module and a processing module, where the processing module performs the method according to any manner of the first aspect, the third aspect, the fifth aspect, or the seventh aspect, to control the transceiver module to receive a signal or send a signal.

According to a fourteenth aspect, an embodiment of this application provides a network device, including a transceiver module and a processing module, where the processing module performs the method according to any manner of the second aspect, the fourth aspect, the sixth aspect, or the eighth aspect, to control the transceiver module to receive a signal or send a signal.

According to a fifteenth aspect, an embodiment of this application provides a computer-readable medium, configured to store a computer program, where the computer program includes instructions for performing any method in the first aspect, the third aspect, the fifth aspect, or the seventh aspect.

According to a sixteenth aspect, an embodiment of this application provides a computer-readable medium, configured to store a computer program, where the computer program includes instructions for performing any method in the second aspect, the fourth aspect, the sixth aspect, or the eighth aspect.

According to a seventeenth aspect, an embodiment of this application provides a computer program, where the computer program includes instructions for performing any method in the first aspect, the third aspect, the fifth aspect, or the seventh aspect.

According to an eighteenth aspect, an embodiment of this application provides a computer program, where the computer program includes instructions for performing any method in the second aspect, the fourth aspect, the sixth aspect, or the eighth aspect.

According to a nineteenth aspect, an embodiment of this application provides a communication system, where the communication system includes the network device and the terminal device according to the first aspect to the eighth aspect.

BRIEF DESCRIPTION OF DRAWINGS

To describe technical solutions in embodiments of this application more clearly, the following briefly describes accompanying drawings for describing the embodiments of this application. Definitely, the accompanying drawings in the following description show merely some embodiments of this application, and a person of ordinary skill in the art may further derive other accompanying drawings from these accompanying drawings without creative efforts.

DESCRIPTION OF EMBODIMENTS

Figure 1:
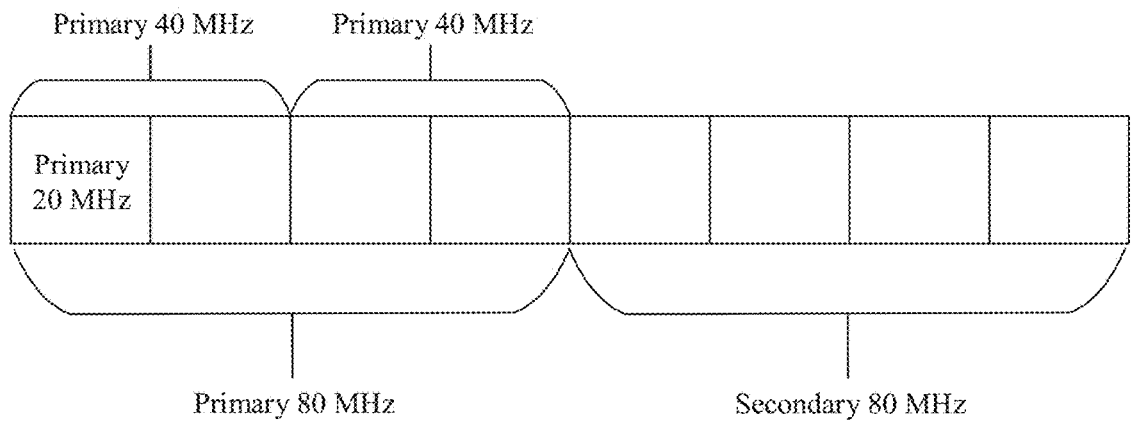
FIG. 1 is an example schematic diagram of a channel bandwidth.

The following clearly describes technical solutions in embodiments of this application with reference to accompanying drawings in the embodiments of this application. Definitely, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: only A exists, both A and B exist, and only B exists.

In the specification and claims in the embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In the embodiments of this application, the word "example" or "for example" is used to represent giving an example, an illustration, or a description. Any embodiment or design scheme described as an "example" or "for example" in the embodiments of this application should not be explained as being more preferred or more advantageous than another embodiment or design scheme. Exactly, use of the word "example", "for example", or the like is intended to present a related concept in a specific manner.

In the description of the embodiments of this application, unless otherwise stated, "a plurality of" means two or more than two. For example, a plurality of processing units mean two or more processing units. A plurality of systems mean two or more systems.

To help a person skilled in the art better understand the technical solutions of this application, the related background is briefly described first.

(1) Channel Bonding

A channel bandwidth used in the 802.11a and 802.11g standards is 20 MHz. Standards starting from 802.11n support bonding of two adjacent 20 MHz channels, to achieve a channel bandwidth of 40 MHz and increase a transmission rate. Starting from 802.11ac, existing protocols further support bonding of non-overlapping and non-contiguous channels, to achieve a larger channel bandwidth. For example, to achieve a channel bandwidth of 160 MHz, two contiguous channels whose channel bandwidths are 80 MHz may be bonded, or two non-contiguous channels whose bandwidths are 80 MHz may be bonded. This bonding manner may be indicated as 80+80 MHz. In other words, given a channel bandwidth of 160 MHz, if the channel bandwidth is continuous 160 MHz, the channel bandwidth may be directly indicated as 160 MHz. If the channel bandwidth is discontinuous, that is, if the channel bandwidth is generated by bonding two non-contiguous channels, the channel bandwidth is indicated as 80+80 MHz. Manners of indicating other possible channel bandwidths are similar to the manner in the foregoing example, and are not exhaustively illustrated herein.

As specified in the 802.11 standard, one of two bonded channels is a primary channel, and the other one is a secondary channel. A difference between the primary channel and the secondary channel lies in that the primary channel carries a management frame. Optionally, the management frame may be a beacon frame.

A channel whose channel bandwidth is 160 MHz is used as an example. As shown in FIG. 1, in the channel, a channel whose channel bandwidth is 20 MHz needs to be selected as a primary channel for carrying a management frame. In this example, the channel carrying the management frame is referred to as a primary 20 MHz channel, an 80 MHz channel to which the primary 20 MHz channel belongs is referred to as a primary 80 MHz channel, and another channel whose bandwidth is 80 MHz in the 160 MHz channel is referred to as a secondary 80 MHz channel. In the primary 80 MHz channel, a 40 MHz channel to which the primary 20 MHz channel belongs is referred to as a primary 40 MHz channel, and another 40 MHz channel is a secondary 40 MHz channel. In the primary 40 MHz channel, a 20 MHz channel other than the primary 20 MHz channel is referred to as secondary 20 MHz.

(2) Channel Puncturing

The channel bandwidth is becoming larger. For example, a maximum of 160 MHz is supported in the 802.11ax standard. However, in actual deployment, it is difficult to achieve complete 160 MHz due to interference or other reasons. Therefore, a puncture mode is proposed in 802.11ax. Specifically, a channel puncturing technology using a channel bandwidth of 20 MHz as a granularity is used to alleviate the problem. Likewise, a BSS whose channel bandwidth is 320 MHz is used as an example. In the puncture mode, a channel whose channel bandwidth is 20 MHz in the BSS is a punctured channel. Apart from the punctured channel, remaining 300 MHz spectrum resources can still be used for data transmission. Therefore, an overall throughput of the BSS is improved.

(3) Backward Compatibility

It may be understood that a legacy STA cannot recognize signaling of a new protocol, but a new STA can recognize signaling of a previous protocol. In addition, a legacy AP cannot send signaling of the new protocol, but a new AP can send signaling of the previous protocol.

The following describes in detail a meaning of backward compatibility with reference to each standard. Table 1 shows each protocol version and related parameters corresponding to the protocol version.

TABLE 1

| Protocol version | Publication time | Frequency (GHz) | Channel bandwidth (MHz) | Data rate (Mbit/s) |
| --- | --- | --- | --- | --- |
| 802,11 | 1997 | 2.4 | 20 | 1 and 2 |
| 802.11b | 1999 | 2.4 | 20 | 5.5 and 11 |
| 802.11a | 1999 | 5 | 20 | 6 to 54 |
| 802.11g | 2003 | 2.4 | 20 | 1 to 54 |
| 802.11n | 2009 | 2.4 and 5 | 20 and 40 | 6 to 600 |
| 802.11ac (VHT) | 2016 | 5 | 20, 40, 80, 160, and 80 + 80 | 6 to 6933 |
| 802.11ax (HE) | 2019 | 2.4, 5, and 6 | 20, 40, 80, 160, and 80 + 80; and supporting a specific preamble puncture mode | 6 to 9607.8 |
| 802.11be (EHT) | | 2.4, 5, and 6 | 20, 40, 80, 160, 80 + 80, 320, and 160 + 160; and supporting channel puncturing | |

Refer to Table 1. The legacy STA described above refers to "previous" in a relative sense. To be specific, depending on the publication time of the standard, for a STA supporting the 802.11ax protocol (HE STA for short), a STA supporting 802.11ac (VHT STA for short) and a STA supporting the 802.11n protocol (HT STA for short) are legacy STAs; and conversely, for a VHT STA and the like, an HE STA is a new STA.

An existing protocol specifies that a legacy STA can only recognize signaling of a previous protocol, but cannot recognize signaling of a new protocol. For example, a VHT STA can only recognize signaling of the 802.11ac protocol and earlier versions, such as an HT operation element and a VHT operation element, but cannot recognize signaling of 802.11ax and later versions, such as an HE operation element and an EHT operation element.

A new STA can recognize signaling of a previous protocol. For example, an EHT STA can recognize signaling of 802.11ac and earlier versions, including signaling of protocols such as 802.11n, 802.11ax, and 802.11be, for example, the HT operation element, the VHT operation element, the HE operation element, and the EHT operation element.

(4) Manner of Configuring the BSS for a STA

The following briefly describes a manner of configuring the BSS for different types of STAs.

a. HT Operation Element and a Manner in which an HT STA Obtains Channel Bandwidth Information of the BSS Specifically, the HT operation element carries the channel bandwidth information of the BSS, and the HT STA may obtain the channel bandwidth information of the BSS by reading the HT operation element.

Figure 2:
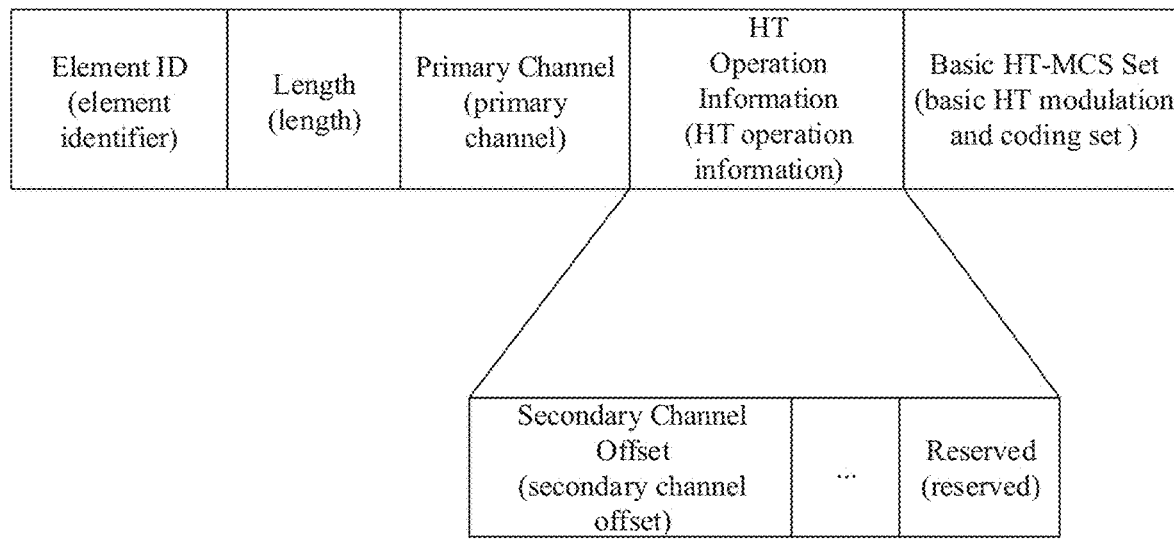
FIG. 2 is an example schematic diagram of a format of an HT operation element.

For example, a schematic diagram of a format of the HT operation element is shown in FIG. 2. Refer to FIG. 2. The HT operation element carries a primary channel field, and the field is used to indicate a location of a primary 20 MHz channel. The Primary Channel field includes primary channel information, and specifically, channel information of the primary 20 MHz channel. For example, the channel information may be identification information of the primary 20 MHz channel. For example, the identification information may be a channel index number or a number.

For example, the HT operation element further carries an HT operation information field used to indicate the channel bandwidth information of the BSS. For example, the HT Operation Information field carries a secondary channel offset (SCO) field used to indicate whether a secondary channel exists and a location of the secondary channel. For example, when a value of the Secondary Channel Offset field is 1, it indicates that a secondary 20 MHz channel is above the primary 20 MHz channel, that is, a frequency of the secondary 20 MHz channel is higher than a frequency of the primary 20 MHz channel; or when a value of the Secondary Channel Offset field is 3, it indicates that a secondary 20 MHz channel is below the primary 20 MHz channel, that is, a frequency of the secondary 20 MHz channel is lower than a frequency of the primary 20 MHz channel. When a value of the Secondary Channel Offset field is 0, it indicates that no secondary 20 MHz channel exists. Optionally, the HT Operation Information further carries other fields, for example, a reserved field. For meanings of the other fields, refer to definitions in an existing standard. Details are not described in this application.

Still refer to FIG. 2. The HT operation element further carries fields such as an element identifier (Element ID) field, a length field, and a basic HT modulation and coding set (Basic HT-MCS Set). For meanings of the fields, refer to definitions in the existing standard. Details are not described in this application.

b. VHT Operation Element and a Manner in which an HE STA Obtains Channel Bandwidth Information of the BSS Specifically, the VHT operation element carries the channel bandwidth information of the BSS, and the VHT STA obtains the channel bandwidth information of the BSS by reading the HT operation element and the VHT operation element.

Figure 3:
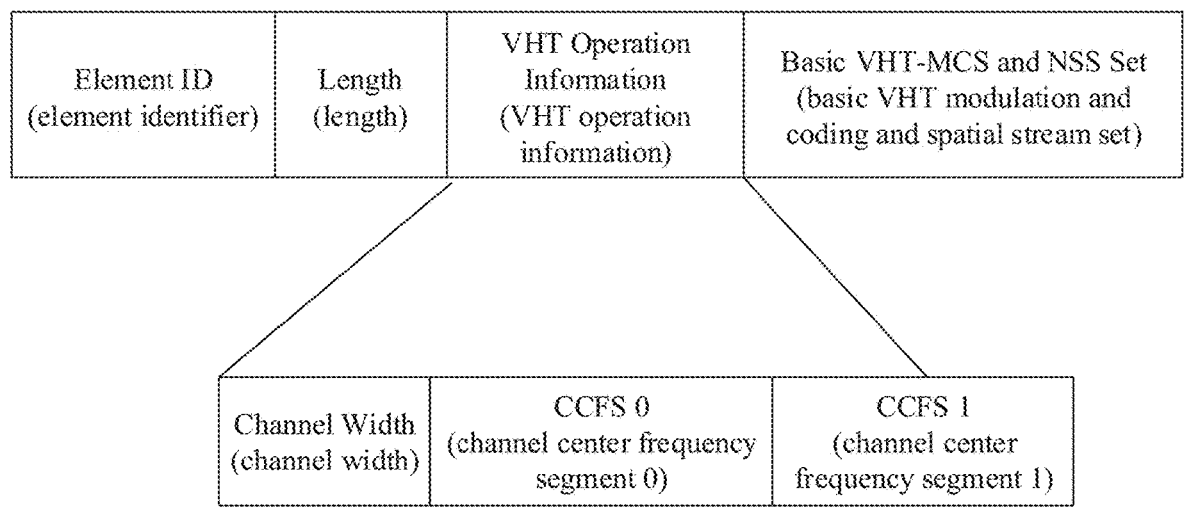
FIG. 3 is an example schematic diagram of a format of a VHT operation element.

For example, a schematic diagram of a format of the VHT operation element is shown in FIG. 3. Refer to FIG. 3. The VHT operation element carries a VHT Operation Information field used to indicate the channel bandwidth information of the BSS.

Specifically, refer to FIG. 3. The VHT Operation Information field carries a channel bandwidth field, a channel center frequency segment (CCFS) 0 field, and a CCFS 1 field.

The Channel Width field includes the channel bandwidth information used to indicate a channel bandwidth of the BSS. Specifically, a value of the Channel Width field may be 0 or 1. For example, if the value of the Channel Width field is 0, it indicates that the channel bandwidth of the BSS is 20 MHz or 40 MHz; or if the value of the Channel Width field is 1, it indicates that the channel bandwidth of the BSS is 80 MHz, 160 MHz, or 80+80 MHz.

The CCFS 0 field includes center frequency information of a segment 0, used to indicate a center frequency of the segment 0. The CCFS 1 field includes center frequency information of a segment 1, used to indicate a center frequency of the segment 1. Optionally, the center frequency information may be an index value (index) corresponding to the center frequency of the segment. For example, if a channel bandwidth corresponding to the segment is 5.00 GHz to 5.08 GHz, an index value corresponding to the segment is 42. In other words, the STA may obtain the corresponding center frequency by reading the index value.

The following describes specific usage of the Channel Width field, the CCFS 0 field, and the CCFS 1 field by using an example.

TABLE 2

| Bandwidth | CCFS 0 | CCFS 1 | Judgment rules |
|---|---|---|---|
| 20 MHz | Center frequency information of a primary 20 MHz channel | 0 | SCO = 0 && Channel Width = 0 |
| 40 MHz | Center frequency information of a primary 40 MHz channel | 0 | SCO! = 0 && Channel Width = 0 |

TABLE 2-continued

| Bandwidth | CCFS 0 | CCFS 1 | Judgment rules |
|---|---|---|---|
| 80 MHz | Center frequency information of a primary 80 MHz channel | 0 | Channel Width = 1 and CCFS 1 = 0 |
| 160 MHz | Center frequency information of a primary 80 MHz channel | Center frequency information of a 160 MHz channel | Channel Width = 1, CCFS 1 > 0, and \|CCFS 1 − CCFS 0\| − 8 |
| 80 + 80 MHz | Center frequency information of a primary 80 MHz channel | Center frequency information of a secondary 80 MHz channel | Channel Width = 1, CCFS 1 > 0, and \|CCFS 1 − CCFS 0\| > 16 |

Refer to Table 2. When the channel bandwidth of the BSS is 20 MHz, the value of the Channel Width field carried in the VHT operation element field is 0, and the value of the Secondary Channel Offset field of the HT operation element is 0. The center frequency information in the CCFS 0 field is used to indicate a center frequency of the 20 MHz channel (that is, the segment 0), and the CCFS 1 field is set to 0. Correspondingly, the VHT STA may determine, by reading the Channel Width field carried in the VHT operation element field, that the channel bandwidth is 20 MHz or 40 MHz, and determine, by reading the Secondary Channel Offset field of the HT operation element, that the channel bandwidth of the BSS is 20 MHz and the channel location of the 20 MHz channel.

When the channel bandwidth of the BSS is 40 MHz, the value of the Channel Width field carried in the VHT operation element field is 0, and the value of the Secondary Channel Offset field of the HT operation element is 1. The center frequency information in the CCFS 0 field is used to indicate a center frequency of the primary 20 MHz channel (that is, the segment 0), and the CCFS 1 field is set to 0. Correspondingly, the VHT STA may determine, by reading the Channel Width field carried in the VHT operation element field, that the channel bandwidth is 20 MHz or 40 MHz, and determine, by reading the Secondary Channel Offset field of the HT operation element, that the channel bandwidth of the BSS is 40 MHz and the channel location of the 40 MHz channel.

When the channel bandwidth of the BSS is 80 MHz, the value of the Channel Width field carried in the VHT operation element field is 1, the center frequency information in the CCFS 0 field is used to indicate a center frequency of the 80 MHz channel (that is, the segment 0), and the CCFS 1 field is set to 0. Correspondingly, the VHT STA may determine, by reading the Channel Width field carried in the VHT operation element field, that the channel bandwidth is 80 MHz, 160 MHz, or 80+80 MHz, determine, by reading the CCFS 1 field and a CCFS 2 field, that the channel bandwidth of the BSS is 80 MHz, and obtain the channel bandwidth information of the BSS, including: the channel bandwidth of 80 MHz and the center frequency of the 80 MHz channel.

When the channel bandwidth of the BSS is 160 MHz, the value of the Channel Width field carried in the VHT operation element field is 1, the center frequency information in the CCFS 0 field is used to indicate a center frequency of the primary 80 MHz channel (that is, the segment 0), the center frequency information in the CCFS 1 field is used to indicate a center frequency of the 160 MHz channel (that is, the segment 1), and |CCFS 1−CCFS 0|=8. Correspondingly, the VHT STA may determine, by reading the Channel Width field carried in the VHT operation element field, that the channel bandwidth is 80 MHz, 160 MHz, or 80+80 MHz, determine, by reading the CCFS 1 field and a CCFS 2 field, that the channel bandwidth of the BSS is 160 MHz. and obtain the channel bandwidth information of the BSS, including the channel bandwidth of 160 MHz, the center frequency of the primary 80 MHz channel, and the center frequency of the 160 MHz channel.

When the channel bandwidth of the BSS is 80+80 MHz, the value of the Channel Width field carried in the VHT operation element field is 1, the center frequency information in the CCFS 0 field is used to indicate a center frequency of the primary 80 MHz channel (that is, the segment 0), the center frequency information in the CCFS 1 field is used to indicate a center frequency of the secondary 80 MHz channel (that is, the segment 1), and |CCFS 1−CCFS 0|>16. Correspondingly, the VHT STA may determine, by reading the Channel Width field carried in the VHT operation element field, that the channel bandwidth is 80 MHz, 160 MHz, or 80+80 MHz, determine, by reading the CCFS 1 field and a CCFS 2 field, that the channel bandwidth of the BSS is 80+80 MHz, and obtain the channel bandwidth information of the BSS, including the channel bandwidth of 80+80 MHz, the center frequency of the primary 80 MHz channel, and the center frequency of the secondary 80 MHz channel.

It should be noted that, a difference between the center frequency information in the CCFS 0 field and the center frequency information in the CCFS 1 field may be expressed as |CCFS 1−CCFS 0|, where "| |" represents an absolute value.

Optionally, the VHT STA reads the Primary Channel field carried in the HT operation element, to determine a location of the primary 20 MHz channel (for a related concept, refer to the foregoing description).

Still refer to FIG. 3. The VHT operation element further includes an Element ID field, a Length field, a basic VHT modulation and coding and spatial stream set (Basic VHT-MCS and NSS Set) field, and the like. For meanings of the fields, refer to definitions in the existing standard. Details are not described in this application.

c. HE Operation Element and a Manner in which an HE STA Obtains Channel Bandwidth Information of the BSS Specifically, for the HE STA, when the BSS is deployed in a 5 GHz frequency band, the HE STA obtains the channel bandwidth information of the BSS by reading the HT operation element and the VHT operation element. When the BSS is deployed in a 6 GHz frequency band, the HE STA obtains the channel bandwidth information of the BSS by reading the HE operation element. It should be noted that conventional (legacy) STAs such as an HT STA and a VHT STA do not appear in the 6 GHz frequency band. Therefore, in the 6 GHz frequency band, an AP does not allow a management frame to carry the HT operation element or the VHT operation element.

Figure 4:
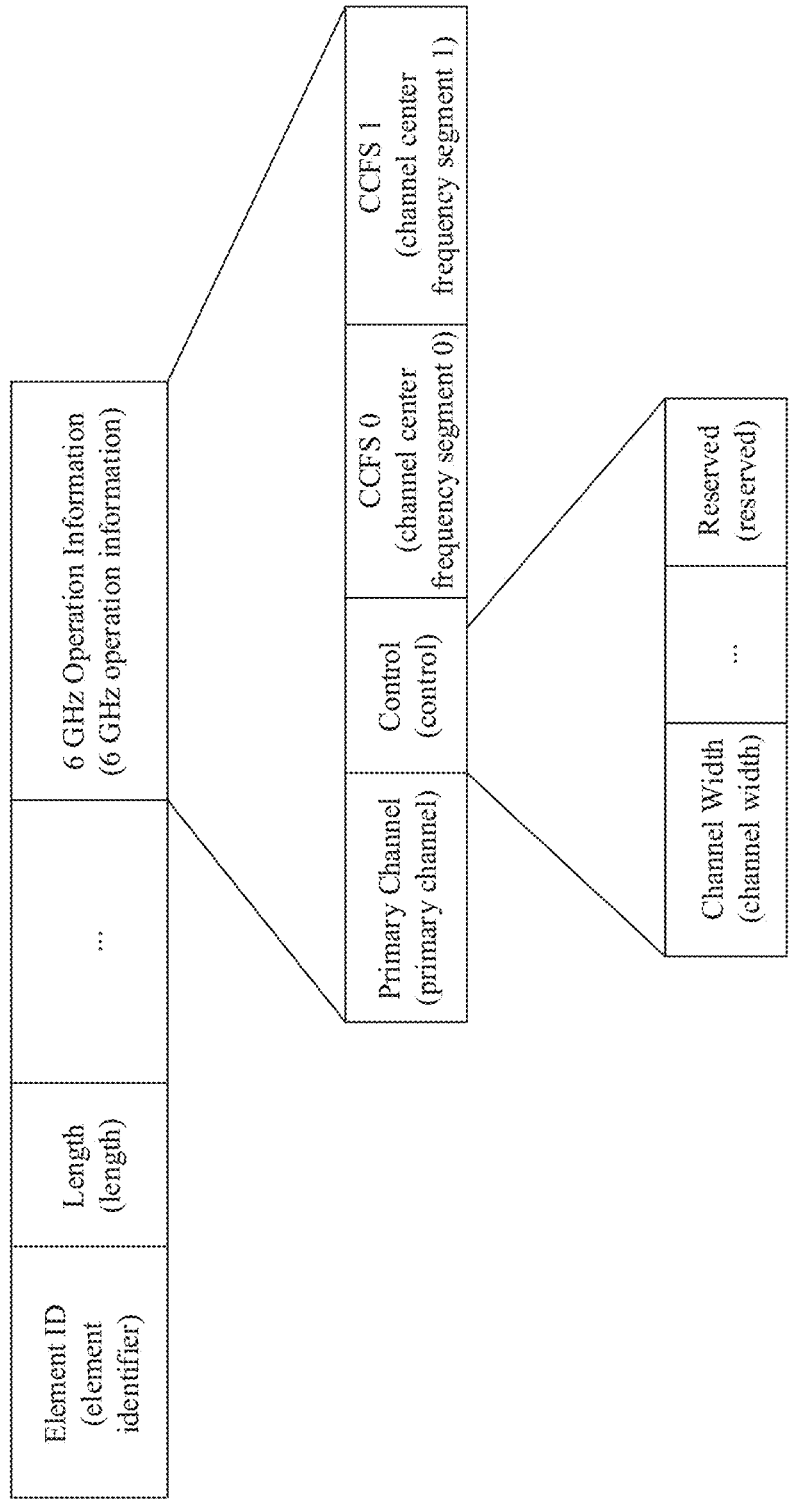
FIG. 4 is an example schematic diagram of a format of an HE operation element.

For example, a schematic diagram of a format of the HE operation element is shown in FIG. 4. Refer to FIG. 4. The HE operation element carries a 6 GHz Operation Information field. The field is present only when the BSS is deployed in the 6 GHz frequency band, and the field is used to indicate the channel bandwidth information of the BSS. The HE operation element further includes fields such as Element and Length. Details are not described in this application.

Specifically, refer to FIG. 4. The 6 GHz Operation Information field carries a Primary Channel field, a control field, a CCFS 0 field, a CCFS 1 field, and the like.

The Primary Channel field is used to indicate a location of a primary 20 MHz channel, and the field includes identification information of the primary 20 MHz channel, for example, a number of the primary 20 MHz channel.

The Control field includes a Channel Width field. The field includes the channel bandwidth information used to indicate a channel bandwidth of the BSS. For example, if a value of the Channel Width field is 0, it indicates that the channel bandwidth of the BSS is 20 MHz; if a value of the Channel Width field is 1, it indicates that the channel bandwidth of the BSS is 40 MHz; if a value of the Channel Width field is 2, it indicates that the channel bandwidth of the BSS is 80 MHz; or if a value of the Channel Width field is 3, it indicates that the channel bandwidth of the BSS is 160 MHz or 80+80 MHz. The Control field further includes another field such as a reserved field. Details are not described in this application.

Still refer to FIG. 4. The CCFS 0 field includes center frequency information of a segment 0, used to indicate a center frequency of the segment 0. The CCFS 1 field includes center frequency information of a segment 1, used to indicate a center frequency of the segment 1.

The following describes specific usage of the Channel Width field, the CCFS 0 field, and the CCFS 1 field by using examples.

eter update of a transmit end (for example, an AP), for example, an update of a channel bandwidth and a maximum quantity of supported transmit streams. Optionally, the Operating Mode field may be carried in an Operating Mode Notification Element, or may be carried in an Operating Mode Notification frame. In other words, the Operating Mode field may be carried in an Operating Mode Notification Element in a management frame (for example, a beacon frame), or may be carried in a separately sent Operating Mode Notification frame.

The following describes usage of the Operating Mode field by using a specific example. When the AP needs to change an operation parameter, for example, the channel bandwidth of the BSS, the AP may carry an Operating Mode Notification Element in a beacon frame to indicate a channel bandwidth update of the BSS. The Operating Mode Notification Element carries an Operating Mode field, and the Operating Mode field includes an updated channel bandwidth of the BSS. In another optional manner, the AP sends an Operating Mode Notification frame by broadcast, where the Operating Mode Notification frame carries an Operating Mode field, to indicate a channel bandwidth update of the BSS. The VHT STA, the HE STA, and the EHT STA may all obtain an updated operation parameter, for example, the channel bandwidth of the BSS, by reading the Operating Mode field. For example, the EHT STA is used as an example for description. The EHT STA may obtain the channel bandwidth information of the BSS by reading the EHT operation element in the beacon frame. For example, the channel bandwidth of the BSS is 320 MHz. If the beacon frame further carries the Operating Mode Notification Element, the EHT STA may further read the Operating Mode Notification Element to update the channel bandwidth information of the BSS. For example, the channel bandwidth is updated to 20 MHz.

It should be noted that the standard specifies that the AP sends the corresponding Operating Mode field only when the AP needs to change the operation parameter.

TABLE 3

| Bandwidth | CCFS 0 | CCFS 1 | Judgment rules |
|---|---|---|---|
| 20 MHz | Center frequency information of a primary 20 MHz channel | 0 | Channel Width = 0 |
| 40 MHz | Center frequency information of a primary 40 MHz channel | 0 | Channel Width = 1 |
| 80 MHz | Center frequency information of a primary 80 MHz channel | 0 | Channel Width = 2 |
| 160 MHz | Center frequency information of a primary 80 MHz channel | Center frequency information of a primary 160 MHz channel | Channel Width = 3, CCFS 1 > 0, and |CCFS 1 − CCFS 0| = 8 |
| 80 + 80 MHz | Center frequency information of a primary 80 MHz channel | Center frequency information of a secondary 80 MHz channel | Channel Width = 3, CCFS 1 > 0, and |CCFS 1 − CCFS 0| > 16 |

The usage shown in Table 3 is similar to the usage shown in Table 2. For details, refer to related descriptions in Table 2. Details are not described herein again.

(4) Operating Mode Field

In the existing protocol, an Operating Mode field is further defined, and is used to indicate an operation param- In the conventional technology, in a manner of configuring the channel bandwidth of the BSS for the EHT STA, the newly defined EHT operation element is used to indicate whether the channel bandwidth of the BSS is greater than 160 MHz or 80+80 MHz. In other words, in the conventional technology, for the BSS whose channel bandwidth is greater than 160 MHz or 80+80 MHz, the EHT STA may obtain the channel bandwidth configuration of the BSS by reading the newly defined EHT operation element. When the channel bandwidth of the BSS is less than or equal to 160 MHz or 80+80 MHz, the EHT STA may obtain the channel bandwidth configuration of the BSS by reading the HT operation element, the VHT operation element, or the HE operation element, that is, the EHT operation element is only used to indicate that the channel bandwidth is greater than 160 MHz or 80+80 MHz.

In the conventional technology, in presence of channel puncturing, the beacon frame carries the Operating Mode field, the HT operation element, the VHT operation element, the HE operation element, and the EHT operation element at the same time. The VHT STA and the HE STA ignore bandwidth indication information of the VHT operation element and the HE operation element based on the Operating Mode field, to obtain channel bandwidth configuration information of the BSS. However, the EHT STA ignores the Operating Mode field, and obtains the bandwidth configuration information of the BSS by reading the newly defined HT operation element, the VHT operation element, the HE operation element, and the EHT operation element.

Definitely, to configure the channel bandwidth of the BSS for the EHT STA, the conventional technology requires the EHT STA to ignore the Operating Mode field. Therefore, conventional usage of the Operating Mode field needs to be changed, that is, in presence of channel puncturing, it is required that the beacon frame should always carry the Operating Mode field to indicate the channel bandwidth configuration information to the VHT STA or HE STA. This causes an increase in signaling overheads.

This application provides a channel bandwidth configuration method, to resolve the foregoing disadvantage in the conventional technology. In the embodiments of this application, a network device may be an access point for a terminal device (such as a mobile phone) to access a wired (or wireless) network, and is mainly deployed in a home, a building, and a park. A typical coverage radius is tens of meters to hundreds of meters. Certainly, the network device may alternatively be deployed outdoors. The access point is equivalent to a bridge that connects a wired network and a wireless network. A main function of the access point is to connect various wireless network clients together and then connect the wireless network to the Ethernet.

Specifically, the access point may be a terminal device (such as a mobile phone) having a wireless fidelity (Wi-Fi) chip, or a network device (such as a router). The access point may be a device that supports the 802.11be. Alternatively, the access point may be a device that supports a plurality of wireless local area network (WLAN) standards of the 802.11 family such as 802.11be, 802.11ax, 802.11ac, 802.11n, 802.11g, 802.11b, and 802.11a. The access point in this application may be an HE-AP or an EHT-AP, or may be an access point applicable to a future-generation Wi-Fi standard.

The terminal device may be a wireless communication chip, a wireless sensor, a wireless communication terminal, or the like, and may also be referred to as a user, a station, or a terminal. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. The station may also support the plurality of WLAN standards of the 802.11 family such as 802.11be, 802.11ax, 802.11ac, 802.11n, 802.11g, 802.11b, and 802.11a.

A terminal in the embodiments of this application may be an HE-STA or an EHT-STA, or may be a STA applicable to a future Wi-Fi standard.

For example, the access point and the station may be devices applied to the Internet of Vehicles, nodes or sensors on the Internet of Things (IoT), smart cameras, smart remote controls, and smart water meters in a smart home, and sensors in a smart city.

It should be noted that an AP station and a non-AP station in this application may alternatively be wireless communication devices that support parallel transmission on a plurality of links, for example, referred to as multi-link devices or multi-band devices. Compared with a device that supports only single-link transmission, a multi-link device has higher transmission efficiency and a higher throughput.

The multi-link device includes one or more affiliated stations (affiliated STAs). The affiliated STA is a logical station and can work on one link.

Although the embodiments of this application are mainly described by using a network deployed based on IEEE 802.11 as an example, a person skilled in the art easily understands that various aspects of this application may be extended to other networks using various standards or protocols such as Bluetooth, a high performance radio LAN (HIPERLAN) (a wireless standard similar to the IEEE 802.11 standard and mainly used in Europe), a wide area network (WAN), a wireless local area network (WLAN), a personal area network (PAN), or other networks currently known or later developed. Therefore, the various aspects provided in this application are applicable to any appropriate wireless network regardless of coverage and a wireless access protocol used.

Figure 5:
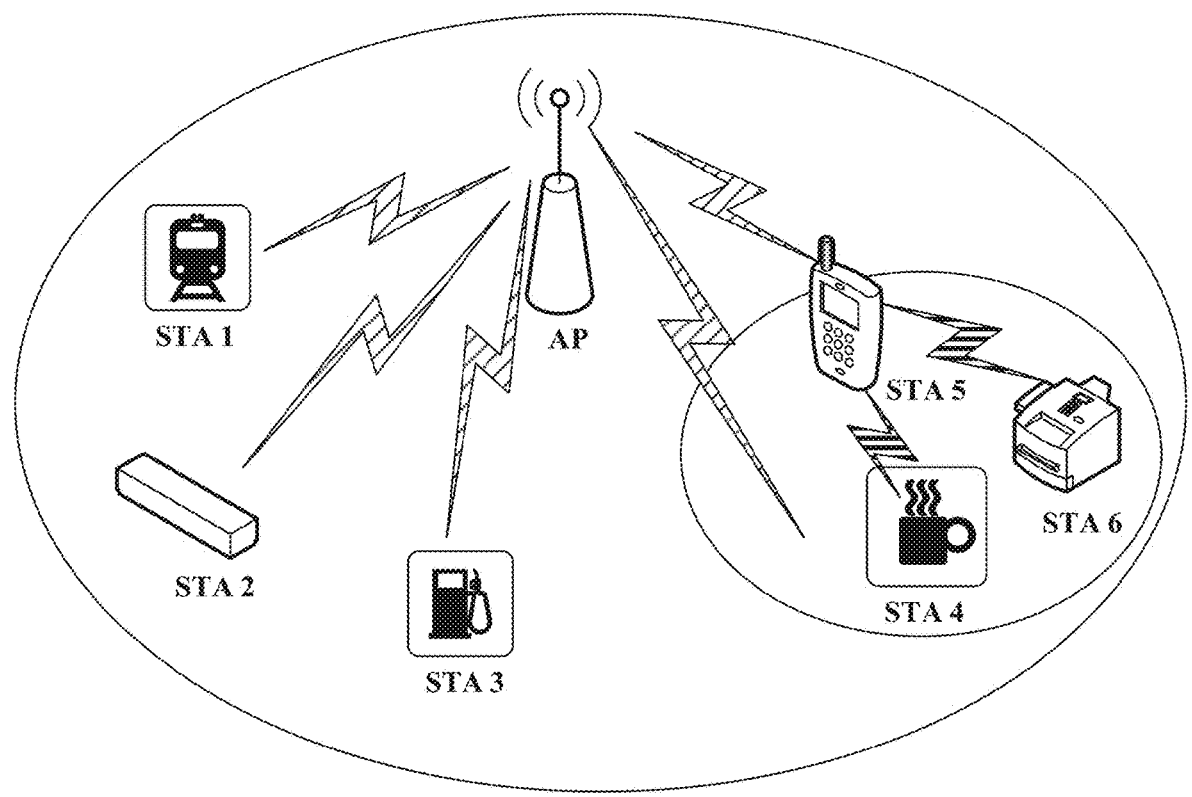
FIG. 5 is a schematic diagram of a structure of a communication system according to an embodiment of this application.

FIG. 5 is a schematic diagram of a network structure according to an embodiment of this application. Refer to FIG. 5. The network structure may include one or more access point (AP) stations and one or more non access point stations (non-AP STAs). For ease of description, an access point station is referred to as an access point (AP), and a non access point station is referred to as a station (STA) in this specification.

The network structure including one AP and six stations (a STA 1, a STA 2, a STA 3, a STA 4, a STA 5, and a STA 6) in FIG. 5 is used as an example for description.

With reference to FIG. 5, the following describes the technical solutions provided in the present invention by using several embodiments.

Figure 6:
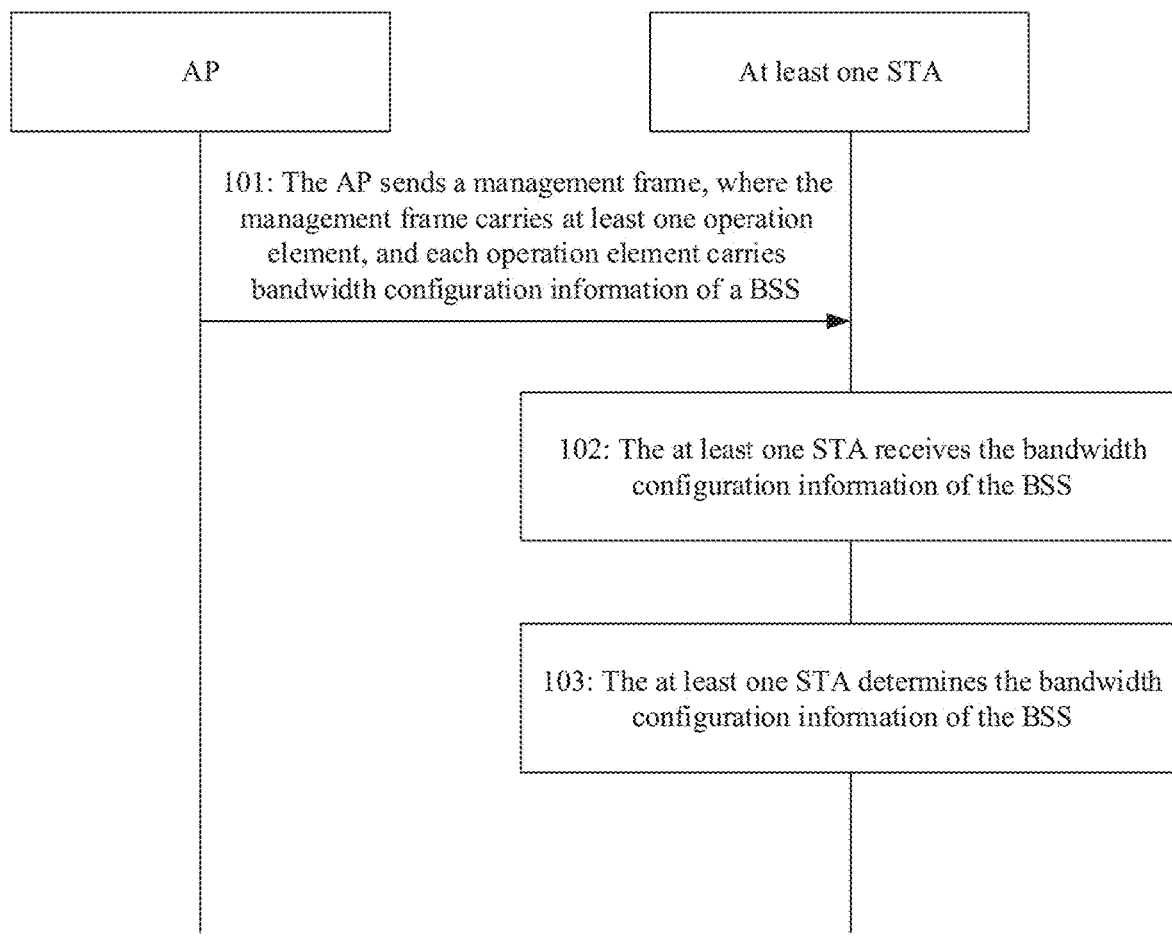
FIG. 6 is a schematic diagram of interaction between a network device and at least one terminal according to an embodiment of this application.

Specifically, with reference to FIG. 5, FIG. 6 is a schematic diagram of interaction between an access point AP and at least one station STA according to an embodiment of this application.

Step 101: An AP sends a management frame, where the management frame carries at least one operation element, and each operation element carries bandwidth configuration information of a BSS.

Specifically, in this application, the AP generates the management frame based on a current channel bandwidth configuration of the BSS, and sends the management frame to at least one STA.

Optionally, the management frame includes but is not limited to at least one element, the at least one element includes the operation element described in this application, and the operation element is used to carry the bandwidth configuration information of the BSS. Optionally, the operation element includes but is not limited to at least one of an HT operation element, a VHT operation element, an HE operation element, and an EHT operation element.

It should be noted that, an existing management frame structure and a name are used as an example for description in this application. If an element in a management frame in a future standard uses another name, it may be considered that any frame including the EHT operation element in this application is implemented based on a same idea as this application.

Optionally, in this application, the management frame may be a beacon frame, or may be another management frame. This is not limited in this application. The AP periodically sends the management frame, to indicate corresponding channel bandwidth configuration information of the BSS to the at least one STA by using the at least one operation element carried in the management frame.

The EHT operation element in the management frame is an information element newly defined in this application. In a possible implementation, the EHT operation element may include a channel bandwidth field, a first channel center frequency field, and a second channel center frequency field, where the channel bandwidth field is used to indicate channel bandwidth information of the BSS, and the first channel center frequency field and the second channel center frequency field are used to indicate channel location information of the BSS. For a specific embodiment, refer to a scenario 1.

In another possible implementation, the EHT operation element may include a channel bandwidth field and a center frequency field, where the channel bandwidth field is used to indicate channel bandwidth information of the BSS, and the center frequency field is used to indicate channel location information of the BSS. The center frequency field includes a first channel center frequency field, or the center frequency field includes a first channel center frequency field and a second channel center frequency field. For a specific embodiment, refer to a scenario 2.

In still another possible implementation, in presence of channel puncturing, the EHT operation element may include a channel bandwidth field, a first channel center frequency field, and a second channel center frequency field, where the channel bandwidth field is used to indicate channel bandwidth information of the BSS, and the first channel center frequency field and the second channel center frequency field are used to indicate channel location information of the BSS; or in absence of channel puncturing, the EHT operation element may include a channel bandwidth field and a first channel center frequency field. For a specific embodiment, refer to a scenario 3.

In still another possible implementation, the EHT operation element may include a channel bandwidth field, a first channel center frequency field, a second channel center frequency field, and a third center frequency field, where the channel bandwidth field is used to indicate channel bandwidth information of the BSS, and the first channel center frequency field, the second channel center frequency field, and the third channel center frequency field are used to indicate channel location information of the BSS. For a specific embodiment, refer to a scenario 4.

In still another possible implementation, the EHT operation element may include a channel bandwidth field, a first channel center frequency field, a second channel center frequency field, a third center frequency field, and a fourth center frequency field, where the channel bandwidth field is used to indicate channel bandwidth information of the BSS, and the first channel center frequency field, the second channel center frequency field, the third center frequency field, and the fourth center frequency field are used to indicate channel location information of the BSS. For a specific embodiment, refer to a scenario 5.

It should be noted that, the channel bandwidth information is used to indicate a channel bandwidth of the BSS, and the channel location information is used to indicate a channel location of the BSS. For example, in this application, a terminal may obtain the channel location information of the BSS by using obtained center frequency information of at least one segment. A specific manner is described in detail in the following embodiment.

It should be further noted that, in this application, the channel bandwidth configuration of the BSS for an EHT STA is mainly used for description. The technical solution in this embodiment of this application is also applicable to new APs and STAs in a future standard.

Step 102: The at least one STA receives the bandwidth configuration information of the BSS.

Specifically, in this application, each STA obtains the bandwidth configuration information of the BSS by reading an operation element corresponding to a protocol supported by the STA.

In a possible implementation, an HT STA reads the bandwidth configuration information of the BSS carried in an HT operation element.

In another possible implementation, a VHT STA reads the bandwidth configuration information of the BSS carried in a VHT operation element.

In still another possible implementation, an HE STA reads the bandwidth configuration information of the BSS carried in an HE operation element.

In still another possible implementation, an EHT STA reads the bandwidth configuration information of the BSS carried in an EHT operation element.

Optionally, the EHT STA, the HE STA, the HT STA, and the VHT STA may be any STAs in FIG. 5. For example, in FIG. 5, the STA 1 may be the EHT STA, the STA 2 may be the VHT STA, the STA 3 may be the HT STA, and the STA 4 may be the HE STA. The foregoing is merely an example, and is not limited in this application.

Step 103: The at least one STA determines the bandwidth configuration information of the BSS.

Specifically, each STA reads the bandwidth configuration information of the BSS carried in the corresponding operation element, to determine the bandwidth configuration of the BSS. Optionally, after receiving its operation element, each STA may return response information to the AP, to indicate that the STA has received the corresponding operation element. The STA obtains the channel bandwidth information and the channel location information of the BSS in response to the received corresponding operation element.

In this application, the EHT STA may obtain the channel bandwidth configuration of the BSS by reading the EHT operation element, without reading the VHT operation element. The VHT operation element is still used to notify the VHT STA and the HE STA of the corresponding channel bandwidth configuration of the BSS, but the channel bandwidth configuration of the BSS does not necessarily need to be indicated by using an Operating Mode field. Therefore, usage of the Operating Mode field is not affected, and the Operating Mode field may still be sent according to a specification in a previous protocol, that is, the Operating Mode field is sent only when an operation parameter changes, and the VHT STA, the HE STA, and the EHT STA may all read the Operating Mode field to update the channel bandwidth configuration of the BSS.

Scenario 1

Figure 7:
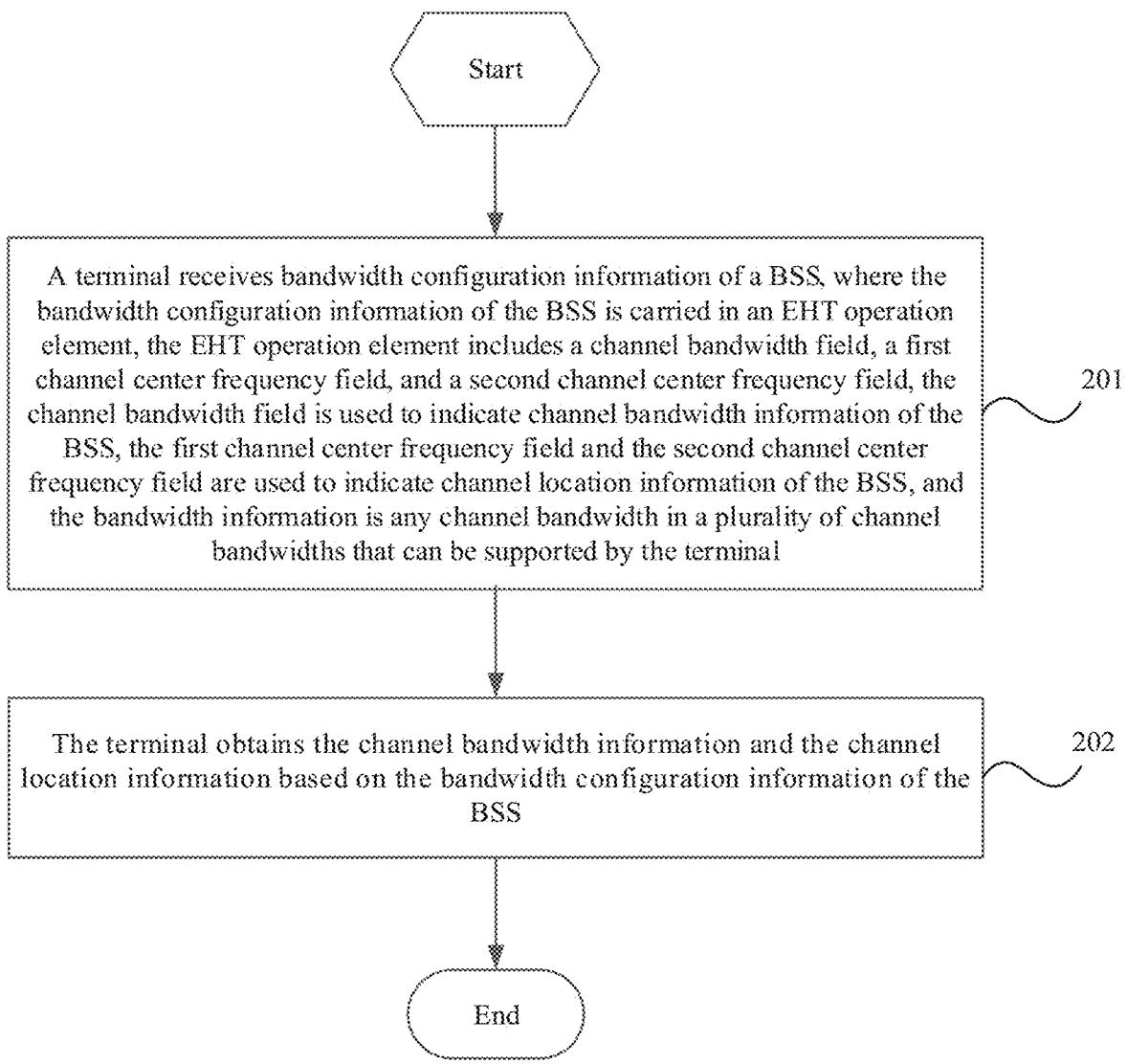
FIG. 7 is a schematic flowchart of a channel bandwidth configuration method according to an embodiment of this application.

With reference to FIG. 5, FIG. 7 is a schematic flowchart of a channel bandwidth configuration method according to an embodiment of this application. It should be noted that all terminals in the scenario 1 to the scenario 5 are EHT STAs. In FIG. 7:

Step 201: A terminal receives bandwidth configuration information of a BSS, where the bandwidth configuration information of the BSS is carried in an EHT operation element, the EHT operation element includes a channel bandwidth field, a first channel center frequency field, and a second channel center frequency field, the channel bandwidth field is used to indicate channel bandwidth information of the BSS, the first channel center frequency field and the second channel center frequency field are used to indicate channel location information of the BSS, and the bandwidth information is any channel bandwidth in a plurality of channel bandwidths that can be supported by the terminal.

Specifically, an AP sends a beacon frame, where the beacon frame carries an EHT operation element used to indicate an EHT STA to configure the BSS based on the EHT operation element. Optionally, when a primary channel of the AP is in a 5 GHz frequency band, the beacon frame sent by the AP also carries an HT/VHT/HE/EHT operation element. Optionally, when a primary channel of the AP is in a 6 GHz frequency band, the beacon frame sent by the AP also carries an HE/EHT operation element.

In this embodiment, only an example in which the terminal is an EHT STA is used to describe in detail a manner of configuring a channel bandwidth for the EHT STA based on the newly defined EHT operation element.

It should be noted that this application is described only by using an example in which a management frame is a beacon frame. A frame carrying an element such as the EHT operation element may alternatively be another type of management frame. This is not limited in this application.

Step 202: The terminal obtains the channel bandwidth information and the channel location information based on the bandwidth configuration information of the BSS.

Specifically, after receiving the EHT operation element, the EHT STA may determine the bandwidth configuration information of the BSS by reading information included in each field carried in the EHT operation element.

Figure 8:
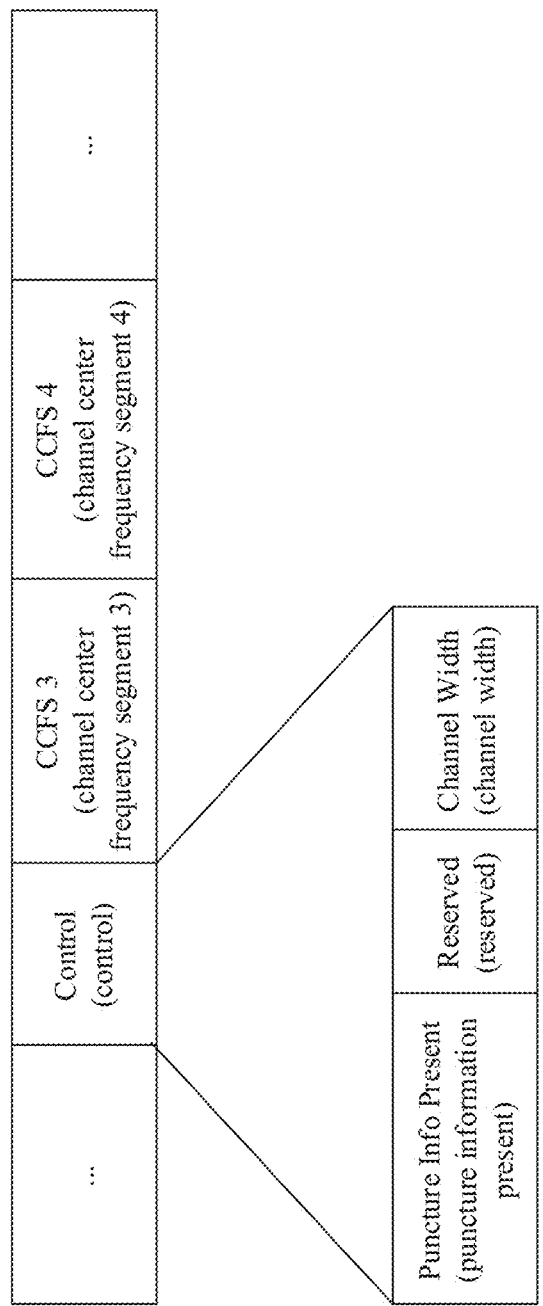
FIG. 8 is an example schematic diagram of a format of an EHT operation element.

Specifically, in this embodiment, a format of the EHT operation element sent by the AP is shown in FIG. 8. Refer to FIG. 8. The EHT operation element includes but is not limited to a Control field, a CCFS 3 field, and a CCFS 4 field, and optionally may further include a puncture information field.

The following describes indication manners of different fields in FIG. 8 in detail.

(1) Control Field

Specifically, the Control field carries a puncture information present (PIP) field and a Channel Width field. The Puncture Info Present field is used to indicate whether a Puncture Info field is present, or understandably, used to indicate whether channel puncturing is present in the BSS. For example, a length of the Control field may be 1 byte.

For example, when Puncture Info Present=0, the Puncture Info field is absent. When Puncture Info Present=1, the Puncture Info field is present. In this case, a length of the Puncture Info Present field may be 1 bit. It should be noted that "=" in this application means that information (or a value) included in a field is equal to a value. For example, Puncture Info Present=1 indicates that a value of the Puncture Info Present field is 1, or the Puncture Info Present field is set to 1. It should be further noted that all settings in this application are examples, and are not limited in this application.

Optionally, the length of the Puncture Info Present field may alternatively be 2 bits. It should be noted that lengths of fields in this application are all examples, and are not limited in this application.

Still refer to FIG. 8. The Channel Width field includes the channel bandwidth information of the BSS, used to indicate a channel bandwidth of the BSS. For example, a length of the Channel Width field may be 2 bits.

In an example, when the Channel Width field includes a first preset value, it indicates that the channel bandwidth of the BSS is 20 MHz. In another example, when the Channel Width field includes a second preset value, it indicates that the channel bandwidth of the BSS is 40 MHz. In still another example, when the Channel Width field includes a third preset value, it indicates that the channel bandwidth of the BSS is 80 MHz. In still another example, when the Channel Width field includes a fourth preset value, it indicates that the channel bandwidth of the BSS is 160 MHz or 80+80 MHz. In still another example, when the Channel Width field includes a fifth preset value, it indicates that the channel bandwidth of the BSS is 320 MHz or 160+160 MHz. The foregoing preset values are all different.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz.

Channel Width=3, used to indicate that the channel bandwidth of the BSS is 160 MHz or 80+80 MHz.

Channel Width=4, used to indicate that the channel bandwidth of the BSS is 320 MHz or 160+160 MHz.

The foregoing value is merely an example, and is not limited in this application.

Refer to FIG. 8. Optionally, the Control field further carries a reserved field, and a length of the field may be 1 bit.

(2) CCFS 3 Field

Specifically, the CCFS 3 field is the first channel center frequency field in this application, and the field includes first segment center frequency information used to indicate a center frequency of a first segment. For example, a length of the CCFS 3 field may be 1 byte.

For example, the first segment center frequency information may be an index value corresponding to the center frequency of the segment. For a related concept of the index value, refer to the foregoing description. Details are not described herein again.

(3) CCFS 4 Field

Specifically, the CCFS 3 field is the second channel center frequency field in this application, and the field carries second segment center frequency information used to indicate a center frequency of a second segment. For example, a length of the CCFS 3 field may be 1 byte.

For example, the center frequency of the second segment may be an index value corresponding to the center frequency of the segment. For a related concept of the index value, refer to the foregoing description. Details are not described herein again.

It should be noted that the center frequency of the first segment described in this application is a center frequency of a primary 20 MHz channel (for a related concept, refer to the foregoing description), or a center frequency of a primary channel to which primary 20 MHz belongs, for example, a primary 80 MHz channel. The center frequency of the second segment described in this application may be a center frequency of an entire channel bandwidth, or may be a center frequency of a secondary channel, for example, a center frequency of a secondary 80 MHz channel or a secondary 160 MHz channel.

Specifically, in this application, when values of Channel Width fields corresponding to two different channel bandwidths are the same, the EHT STA may further read a difference between the first channel center frequency information in the CCFS 3 field and the second channel center frequency information in the CCFS 4 field, to determine the channel bandwidth.

In an example, when the Channel Width field includes the fourth preset value, for example, a value of 3, and the difference between the first channel center frequency information and the second channel center frequency information is equal to a first preset difference, it indicates that the channel bandwidth of the BSS is 160 MHz. For example, if both the first channel center frequency information and the second channel center frequency information are corresponding index values, the first preset difference may be 8.

In another example, when the Channel Width field includes the fourth preset value, for example, a value of 3, and the difference between the first channel center frequency information and the second channel center frequency information is greater than a second preset difference, it indicates that the channel bandwidth of the BSS is 80+80 MHz. For example, if both the first channel center frequency information and the second channel center frequency information are corresponding index values, the second preset difference may be 16.

In still another example, when the Channel Width field includes the fifth preset value, for example, a value of 4, and the difference between the first channel center frequency information and the second channel center frequency information is equal to a third preset difference, it indicates that the channel bandwidth of the BSS is 320 MHz. For example, if both the first channel center frequency information and the second channel center frequency information are corresponding index values, the third preset difference may be 16.

In still another example, when the Channel Width field includes the fifth preset value, for example, a value of 4, and the difference between the first channel center frequency information and the second channel center frequency information is greater than a fourth preset difference, it indicates that the channel bandwidth of the BSS is 160+160 MHz. For example, if both the first channel center frequency information and the second channel center frequency information are corresponding index values, the fourth preset difference may be 32.

It should be noted that the preset difference is also an example, and may be set based on an actual situation. This is not limited in this application.

The following uses specific examples to describe specific usage of the Channel Width field, the CCFS 3 field, and the CCFS 4 field.

TABLE 4

| Bandwidth | CCFS 3 | CCFS 4 | Judgment rules |
| --- | --- | --- | --- |
| 20 MHz | Center frequency information of a primary 20 MHz channel | 0 | Channel Width = 0 |
| 40 MHz | Center frequency information of a primary 40 MHz channel | 0 | Channel Width = 1 |
| 80 MHz | Center frequency information of a primary 80 MHz channel | 0 | Channel Width = 2 |
| 160 MHz | Center frequency information of a primary 80 MHz channel | Center frequency information of a 160 MHz channel | Channel Width = 3, CCFS 3 > 0, CCFS 4 > 0, and |CCFS 3 − CCFS 4| = 8 |
| 80 + 80 MHz | Center frequency information of a primary 80 MHz channel | Center frequency information of a secondary 80 MHz channel | Channel Width = 3, CCFS 3 > 0, CCFS 4 > 0, and |CCFS 3 − CCFS 4| > 16 |
| 320 MHz | Center frequency information of a primary 160 MHz channel | Center frequency information of a 320 MHz channel | Channel Width = 4, CCFS 3 > 0, CCFS 4 > 0, and |CCFS 3 − CCFS 4| = 16 |
| 160 + 160 MHz | Center frequency information of a primary 160 MHz channel | Center frequency information of a secondary 160 MHz channel | Channel Width = 4, CCFS 3 > 0, CCFS 4 > 0, and |CCFS 3 − CCFS 4| > 32 |

Table 4 shows an example of specific usage of the CCFS 3 and the CCFS 4. Refer to Table 4. For example, when the channel bandwidth is 20 MHz, the value of the Channel Width field is 0, the first channel center frequency information in the CCFS 3 field is used to indicate the center frequency of the first segment, that is, the primary 20 MHz channel, and the CCFS 4 field is set to 0. Specifically, the EHT STA reads the value 0 of the Channel Width field, and may determine that the channel bandwidth of the BSS is 20 MHz. The EHT STA may obtain the center frequency of the primary 20 MHz channel by reading the CCFS 3 field. Specifically, the EHT STA determines the center frequency of the corresponding primary 20 MHz channel by reading the index value in the CCFS 3 field. This content is not repeated in the following embodiment. The channel bandwidth information of the BSS determined by the EHT STA includes the channel bandwidth of 20 MHz and the center frequency of the primary 20 MHz channel. When the channel bandwidth is 40 MHz, the value of the Channel Width field is 1, the first channel center frequency information in the CCFS 3 field is used to indicate the center frequency of the first segment, that is, the primary 40 MHz channel, and the CCFS 4 field is set to 0. Specifically, the EHT STA reads the value 1 of the Channel Width field, and may determine that the channel bandwidth of the BSS is 40 MHz. The EHT STA may obtain the center frequency of the primary 40 MHz channel by reading the CCFS 3 field. The channel bandwidth information of the BSS determined by the EHT STA includes the channel bandwidth of 40 MHz and the center frequency of the primary 40 MHz channel.

When the channel bandwidth is 80 MHz, the value of the Channel Width field is 2, the first channel center frequency information in the CCFS 3 field is used to indicate the center frequency of the first segment, that is, the primary 80 MHz channel, and the CCFS 4 field is set to 0. Specifically, the EHT STA reads the value 2 of the Channel Width field, and may determine that the channel bandwidth of the BSS is 80 MHz. The EHT STA may obtain the center frequency of the primary 80 MHz channel by reading the CCFS 3 field. The channel bandwidth information of the BSS determined by the EHT STA includes the channel bandwidth of 80 MHz and the center frequency of the primary 80 MHz channel.

When the channel bandwidth is 160 MHz, the value of the Channel Width field is 3, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the 160 MHz channel, and |CCFS 3−CCFS 4|=8. Specifically, the EHT STA reads the value 3 of the Channel Width field, and may determine that the channel bandwidth of the BSS is 160 MHz or 80+80 MHz. The EHT STA may determine, based on |CCFS 3−CCFS 4|=8 by reading the CCFS 3 field and the CCFS 4 field, that the channel bandwidth is 160 MHz, and obtain the center frequency of the primary 80 MHz channel and the center frequency of the 160 MHz channel. The channel bandwidth information of the BSS determined by the EHT STA includes the channel bandwidth of 160 MHz, the center frequency of the primary 80 MHz channel, and the center frequency of the 160 MHz channel.

When the channel bandwidth is 80+80 MHz, the value of the Channel Width field is 3, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the secondary 80 MHz channel, and |CCFS 3−CCFS 4|>16. Specifically, the EHT STA reads the value 3 of the Channel Width field, and may determine that the channel bandwidth of the BSS is 160 MHz or 80+80 MHz. The EHT STA may determine, based on |CCFS 3−CCFS 4|>16 by reading the CCFS 3 field and the CCFS 4 field, that the channel bandwidth is 80+80 MHz, and obtain the center frequency of the primary 80 MHz channel and the center frequency of the secondary 80 MHz channel. The channel bandwidth information of the BSS determined by the EHT STA includes the channel bandwidth of 80+80 MHz, the center frequency of the primary 80 MHz channel, and the center frequency of the secondary 80 MHz channel.

When the channel bandwidth is 320 MHz, the value of the Channel Width field is 4, the first channel center frequency information in the CCFS 3 field is used to indicate the center frequency of the first segment, that is, the primary 160 MHz channel, the second channel center frequency information in the CCFS 4 field is used to indicate the center frequency of the second segment, that is, the 320 MHz channel, and |CCFS 3−CCFS 4|=16. Specifically, the EHT STA reads the value 4 of the Channel Width field, and may determine that the channel bandwidth of the BSS is 320 MHz or 160+160 MHz. The EHT STA may determine, based on |CCFS 3−CCFS 4|=16 by reading the CCFS 3 field and the CCFS 4 field, that the channel bandwidth is 320 MHz, and obtain the center frequency of the primary 160 MHz channel and the center frequency of the 320 MHz channel. The channel bandwidth information of the BSS determined by the EHT STA includes the channel bandwidth of 320 MHz, the center frequency of the primary 160 MHz channel, and the center frequency of the 320 MHz channel.

When the channel bandwidth is 160+160 MHz, the value of the Channel Width field is 4, the first channel center frequency information in the CCFS 3 field is used to indicate the center frequency of the first segment, that is, the primary 160 MHz channel, the second channel center frequency information in the CCFS 4 field is used to indicate the center frequency of the second segment, that is, the secondary 160 MHz channel, and |CCFS 3−CCFS 4|>32. Specifically, the EHT STA reads the value 4 of the Channel Width field, and may determine that the channel bandwidth of the BSS is 320 MHz or 160+160 MHz. The EHT STA may determine, based on |CCFS 3−CCFS 4|>32 by reading the CCFS 3 field and the CCFS 4 field, that the channel bandwidth is 160+160 MHz, and obtain the center frequency of the primary 160 MHz channel and the center frequency of the secondary 160 MHz channel. The channel bandwidth information of the BSS determined by the EHT STA includes the channel bandwidth of 160+160 MHz, the center frequency of the primary 160 MHz channel, and the center frequency of the secondary 160 MHz channel.

It should be noted that settings in this application are merely examples. In an example, the 80 MHz, 160 MHz, and 80+80 MHz channels may also use a same Channel Width value. Correspondingly, when CCFS 4=0, the EHT STA may determine that the channel bandwidth is 80 MHz. In another example, the Channel Width may further indicate that the channel bandwidth is 240 MHz, 160+80 MHz, and 80+160 MHz. Specific usage is as follows:

TABLE 5

| Bandwidth | CCFS 3 | CCFS 4 | Judgment rules |
|---|---|---|---|
| 20 MHz | Center frequency information of a primary 20 MHz channel | 0 | Channel Width = 0 |
| 40 MHz | Center frequency information of a primary 40 MHz channel | 0 | Channel Width = 1 |
| 80 MHz | Center frequency information of a primary 80 MHz channel | 0 | Channel Width = 2 |
| 160 MHz | Center frequency information of a primary 80 MHz channel | Center frequency information of a 160 MHz channel | Channel Width = 2, CCFS 3 > 0, CCFS 4 > 0, and |CCFS 3 − CCFS 4| = 8 |
| 80 + 80 MHz | Center frequency information of a primary 80 MHz channel | Center frequency information of a secondary 80 MHz channel | Channel Width = 2, CCFS 3 > 0, CCFS 4 > 0, and |CCFS 3 − CCFS 4| > 16 |
| 240 MHz | Center frequency information of a primary 80 MHz channel | Center frequency information of a 240 MHz channel | Channel Width = 3 or 4, CCFS 3 > 0, CCFS 4 > 0, and |CCFS 3 − CCFS 4| = 12 |
| 160 + 80 MHz | Center frequency information of a primary 160 MHz channel | Center frequency information of a secondary 80 MHz channel | Channel Width = 3, CCFS 3 > 0, CCFS 4 > 0, and |CCFS 3 − CCFS 4| > 24 |
| 80 + 160 MHz | Center frequency information of a primary 80 MHz channel | Center frequency information of a secondary 160 MHz channel | Channel Width = 4, CCFS 3 > 0, CCFS 4 > 0, and |CCFS 3 − CCFS 4| > 24 |
| 320 MHz | Center frequency information of a primary 160 MHz channel | Center frequency information of a 320 MHz channel | Channel Width = 5, CCFS 3 > 0, |CCFS 4| > 0, and |CCFS 3 − CCFS 4| = 16 |
| 160 + 160 MHz | Center frequency information of a primary 160 MHz channel | Center frequency information of a secondary 160 MHz channel | Channel Width = 5, CCFS 3 > 0, |CCFS 4| > 0, and |CCFS 3 − CCFS 4| > 32 |

For corresponding descriptions, refer to related descriptions in Table 4. Details are not described herein again.

(4) Puncture Info Field

Specifically, when the Puncture Info field is present, it indicates presence of channel puncturing in the BSS, and the Puncture Info field includes puncture information used to indicate a punctured channel in the BSS.

In a possible implementation, the puncture information may be a puncture bitmap. The puncture bitmap includes at least one bit, and each bit corresponds to a channel whose channel bandwidth is 20 MHz in the channel. In this application, each channel whose bandwidth is 20 MHz in the channel bandwidth may be referred to as a channel element. As described above, each punctured channel in the channel bandwidth uses a 20 MHz bandwidth as a granularity. In this embodiment, a bit location corresponding to a punctured channel is a preset value, for example, 0, used to indicate that the channel element is a punctured channel. For example, if the channel bandwidth is 40 MHz or 80 MHz, a length of the puncture bitmap is 1 byte; if the channel bandwidth is 160 MHz or 80+80 MHz, a length of the puncture bitmap is 2 bytes; or if the channel bandwidth is 320 MHz or 160+160 MHz, a length of the puncture bitmap is 4 bytes. A specific identification manner is described in the following embodiment.

In another possible implementation, the puncture information may be a puncture mode or a puncture pattern. The Puncture Pattern is different from the puncture bitmap in which each channel element corresponds to one bit. The Puncture Pattern may indicate a specific puncture mode by using fewer bits (for example, 2 bits).

Figure 9:
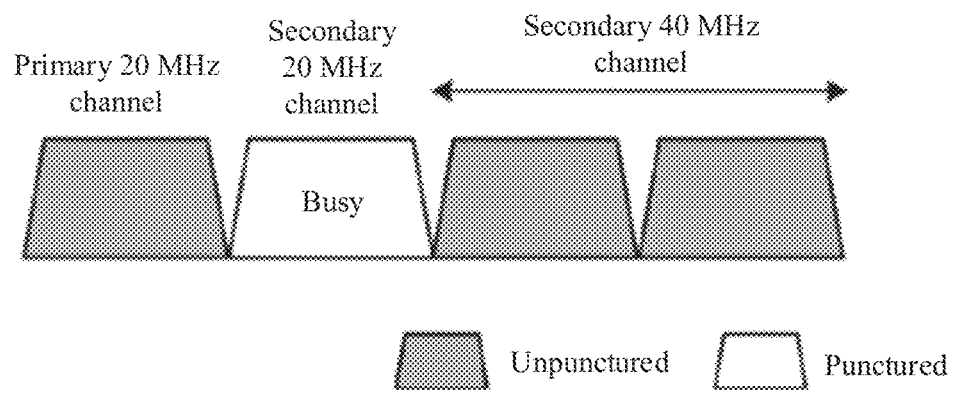
FIG. 9 is an example schematic diagram of a puncture mode.

The following describes four special puncture modes that can be indicated by the Puncture Pattern:

(1) The Puncture Pattern field is set to 4, used to indicate a puncture mode shown in FIG. 9.

Figure 10:
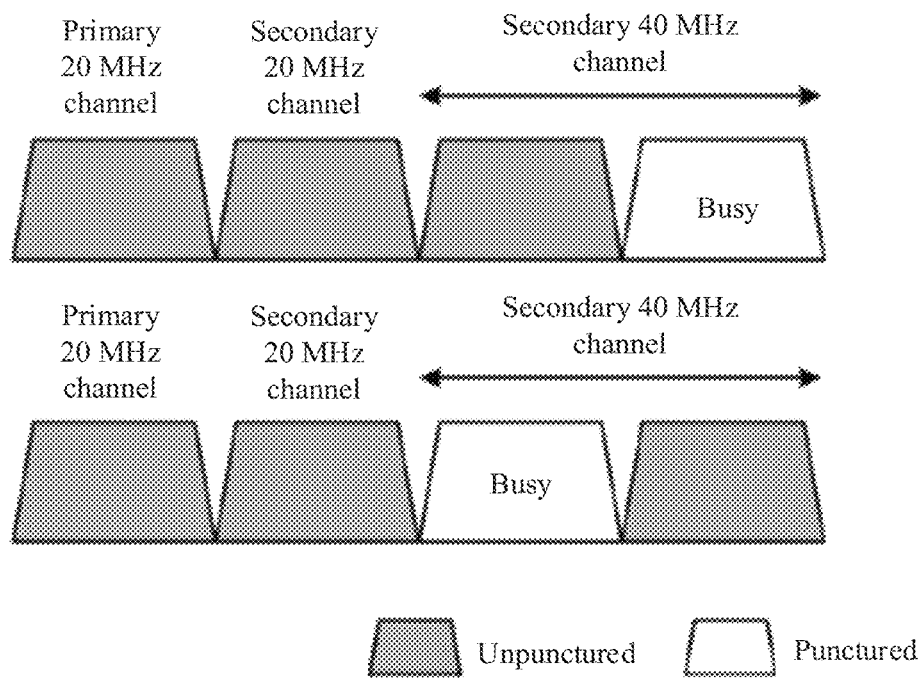
FIG. 10 is an example schematic diagram of a puncture mode.

(2) The Puncture Pattern field is set to 5, used to indicate a puncture mode shown in FIG. 10.

Figure 11:
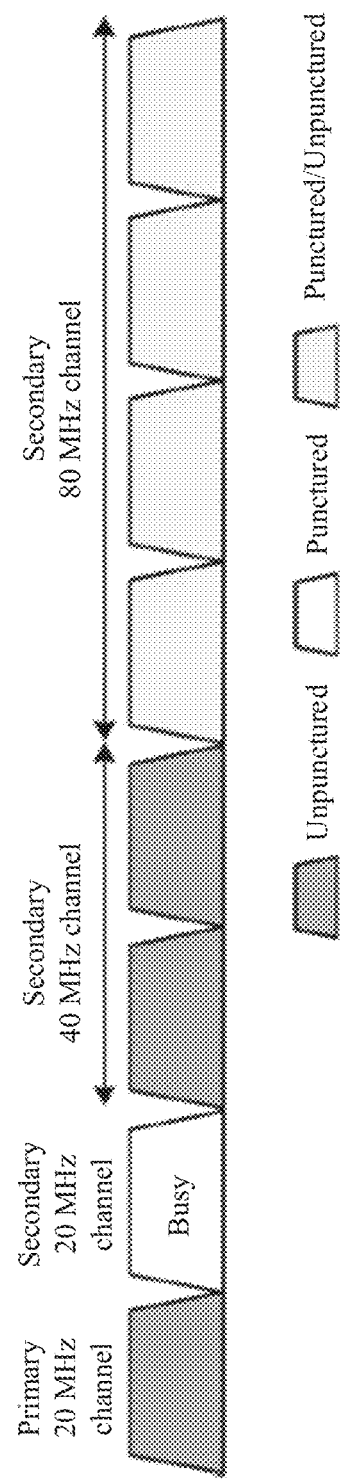
FIG. 11 is an example schematic diagram of a puncture mode.

(3) The Puncture Pattern field is set to 6, used to indicate a puncture mode shown in FIG. 11. It should be noted that, in this example, puncturing cases of the secondary 80 MHz channel may be any combination.

Figure 12:
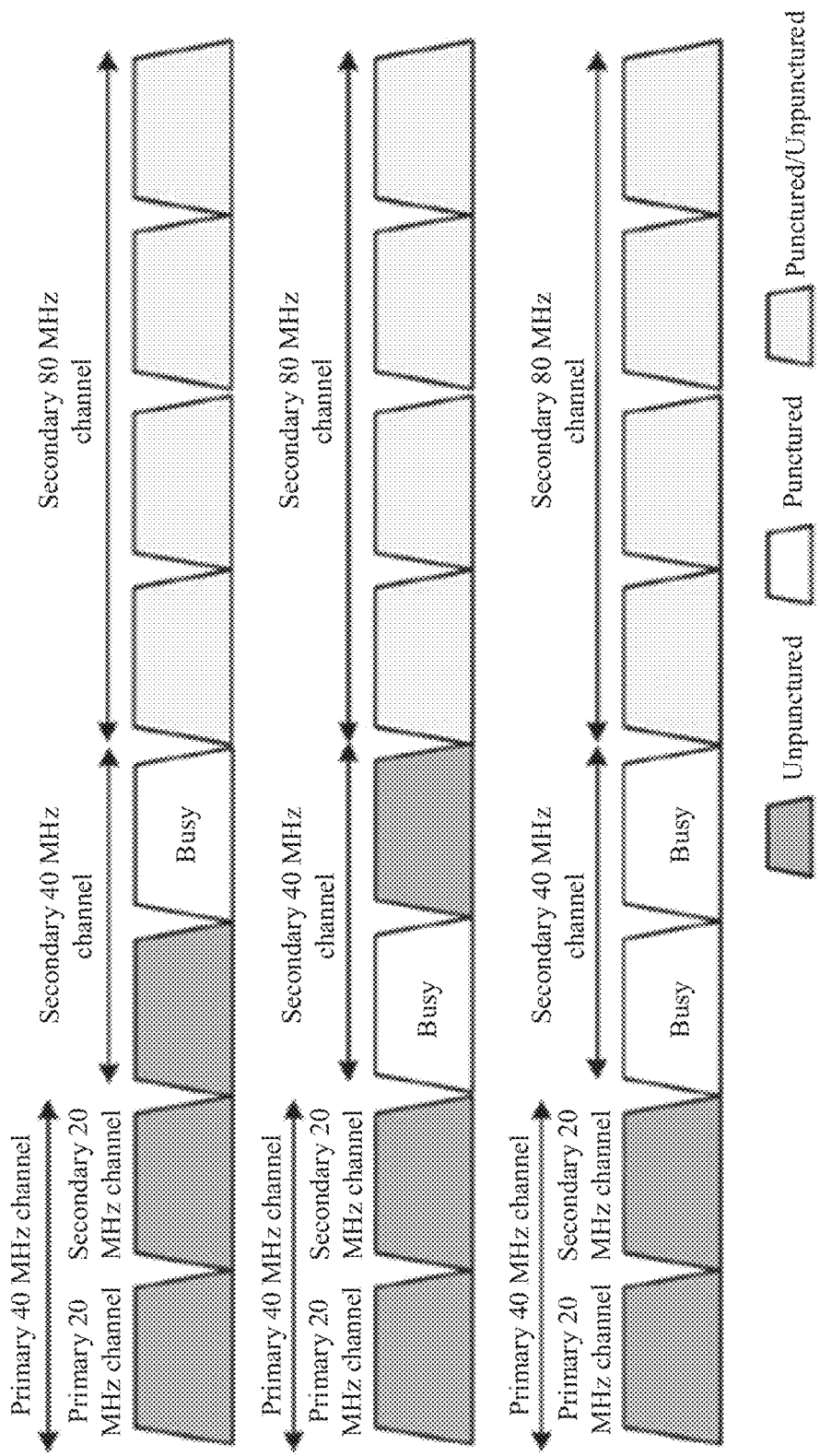
FIG. 12 is an example schematic diagram of a puncture mode.

(4) The Puncture Pattern field is set to 7, used to indicate a puncture mode shown in FIG. 12. Puncturing cases of the secondary 80 MHz channel may be any combination.

It should be noted that the four puncture modes in FIG. 9 to FIG. 12 are merely examples. More puncture modes may be indicated by using corresponding bits in the Puncture Pattern field.

It should be further noted that dark gray shaded parts shown in FIG. 9 to FIG. 12 are unpunctured channels, or may be understood as channels on which data transmission can be performed, and a white "busy" channel is a punctured channel. It may be understood that the channel is interfered or occupied by another channel. A light gray shaded part indicates that a channel element is unpunctured or punctured.

The foregoing describes a structure and an indication manner of the EHT operation element newly defined in this application. Specific usage of the EHT operation element is described in detail by using an example in the following embodiment.

In a possible implementation, when the BSS is established in the 5 GHz frequency band, that is, when the EHT STA receives, in the 5 GHz frequency band, the beacon frame carrying the EHT operation element, the EHT STA may further receive the HT operation element in the beacon frame, and may obtain channel information of the primary 20 MHz channel by reading a Primary Channel field (for a related concept, refer to the foregoing description) carried in the HT operation element, for example, identification information of primary 20 MHz channel, for example, an index number or a channel number of the primary 20 MHz channel. In this way, a specific location of the channel of the BSS on a frequency domain resource is determined with reference to the obtained channel bandwidth information of the BSS.

In another possible implementation, when the BSS is established in the 6 GHz frequency band, that is, when the EHT STA receives, in the 6 GHz frequency band, the management frame carrying the EHT operation element, because the HT operation element is absent from 6 GHz, the EHT STA may receive the HE operation element in the management frame, and may obtain channel information of the primary 20 MHz channel by reading a Primary Channel field (for a related concept, refer to the foregoing description) carried in the HE operation element, for example, identification information of primary 20 MHz, for example, an index number or a channel number of the primary 20 MHz channel. In this way, a specific location of the channel of the BSS on a frequency domain resource is determined with reference to the obtained channel bandwidth information of the BSS.

In still another possible implementation, if the AP needs to change at least one of a channel bandwidth, a maximum quantity of receivable spatial streams, and a low-density parity-check code (LDPC) preference indication of the AP, the AP may add an Operating Mode Notification Element (for a related concept, refer to the foregoing description) to the beacon frame. The EHT STA may obtain an updated channel bandwidth configuration of the BSS by reading the Operating Mode Notification Element. A specific update manner is described in the following embodiment.

In still another possible implementation, if the channel bandwidth of the BSS is 80+80 MHz, 160+160 MHz, or the like and is formed by bonding two non-contiguous channels, optionally, the two channels may be located in different frequency bands. For example, one channel is located in the 5 GHz frequency band, and the other channel is located in the 6 GHz frequency band. In this embodiment, the reserved field in the Control field may include indication information, for example, operating class present (OCP), used to indicate whether the EHT operation element carries an Operating Class field, or understandably, used to indicate whether the two channels are located in different frequency bands. For example, when OCP=1, it indicates that the EHT operation element carries the Operating Class field, that is, the two channels are located in different frequency bands, and the corresponding Operating Class field may include frequency band indication information used to indicate a frequency band in which a secondary 80 MHz channel or a secondary 160 MHz channel is located.

In summary, the EHT STA may obtain the channel bandwidth configuration of the BSS by reading the EHT operation element without reading the VHT operation element. However, the VHT STA and the HE STA may obtain the channel bandwidth configuration of the BSS by reading the VHT operation element. Therefore, usage of the Operating Mode field is not affected, and the Operating Mode field may still be sent according to a specification in a previous protocol, that is, the Operating Mode field is sent only when an operation parameter changes, and the VHT STA, the HE STA, and the EHT STA may all read the Operating Mode field to update the channel bandwidth configuration of the BSS.

The following describes in detail the technical solution of the embodiment in the scenario 1 by using several specific embodiments.

Figure 13:
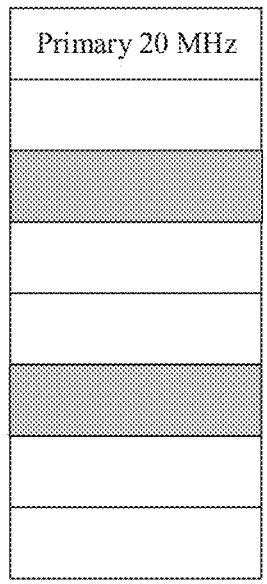
FIG. 13 is an example schematic diagram of a BSS.
Figure 14:
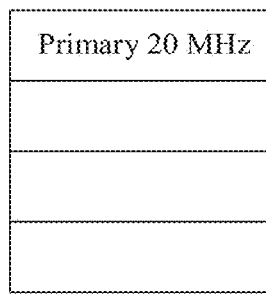
FIG. 14 is an example schematic diagram of a BSS.
Figure 14:
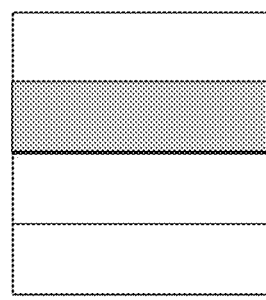
Figure 15:
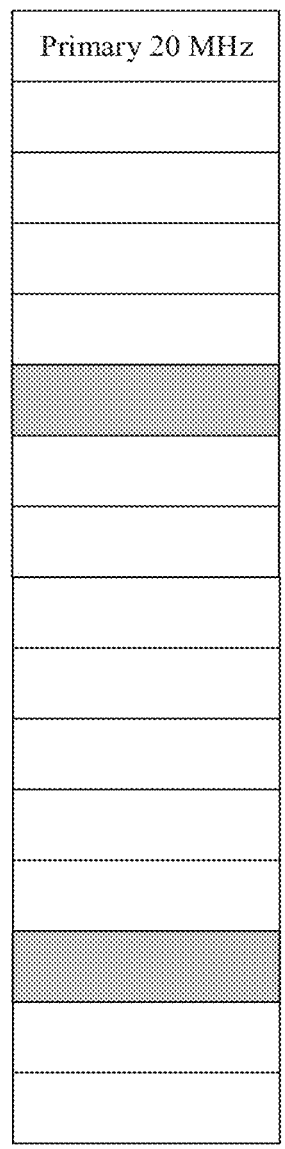
FIG. 15 is an example schematic diagram of a BSS.
Figure 16:
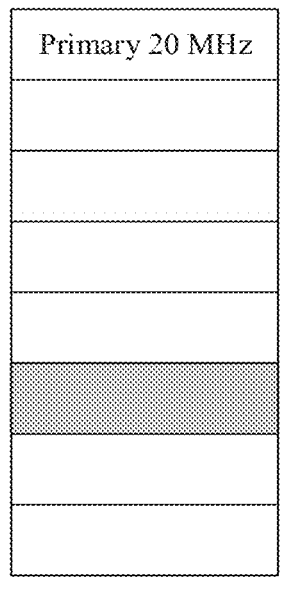
FIG. 16 is an example schematic diagram of a BSS.
Figure 16:
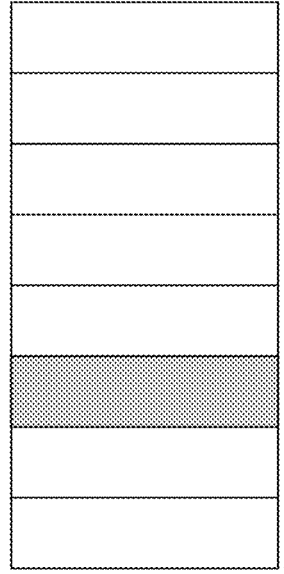

Specifically, FIG. 13 to FIG. 16 are examples of several different cases of the BSS. Refer to FIG. 13. Specifically, in this example, the channel bandwidth of the BSS is 160 MHz, where two channel elements are punctured. Refer to FIG. 14. In this example, the channel bandwidth of the BSS is 80+80 MHz, where two channel elements are punctured. Refer to FIG. 15. In this example, the channel bandwidth of the BSS is 320 MHz, where two channel elements are punctured. Refer to FIG. 16. In this example, the channel bandwidth of the BSS is 160+160 MHz, where two channel elements are punctured.

The following describes the implementations of this application in detail with reference to FIG. 13 to FIG. 16.

Figure 17:
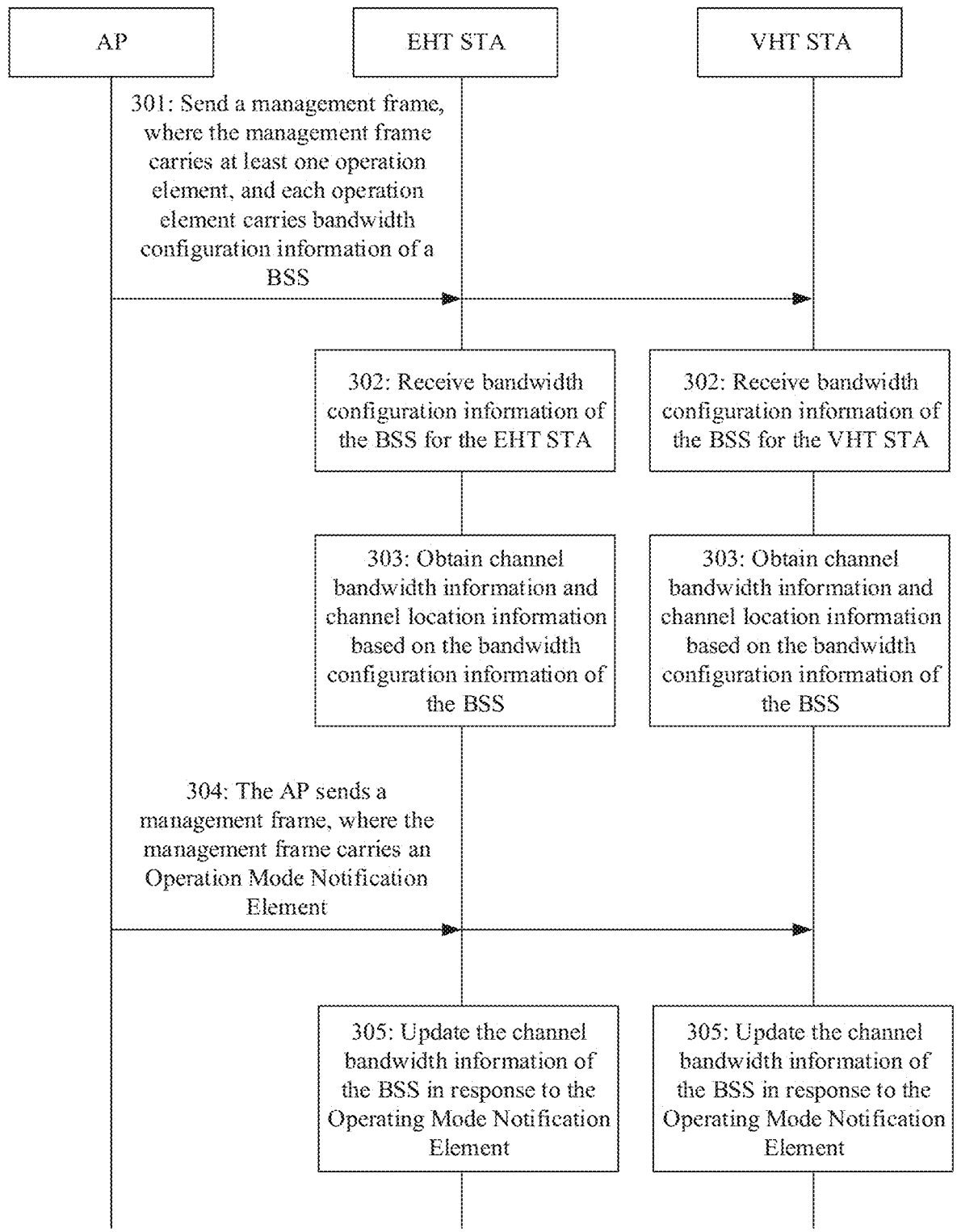
FIG. 17 is a schematic flowchart of a channel bandwidth configuration method according to an embodiment of this application.

Based on the embodiment shown in FIG. 7, with reference to FIG. 13, FIG. 17 is an example schematic flowchart of a channel bandwidth configuration method. In FIG. 17:

Step 301: An AP sends a management frame, where the management frame carries at least one operation element, and each operation element carries bandwidth configuration information of a BSS.

Optionally, the AP sends a beacon frame, where the beacon frame includes but is not limited to an HT operation element, a VHT operation element, and an EHT operation element. It should be noted that, in this embodiment, only manners of configuring channel bandwidths of the BSS for a VHT STA and an EHT STA are described. The management frame further carries an HE operation element. However, because channel bandwidth configurations of the BSS for an HE STA and an HT STA are irrelevant to this application, for a specific implementation, refer to the conventional technology. Details are not described in this application.

For example, refer to FIG. 13. The channel bandwidth of the BSS configured by the AP is 160 MHz, that is, the channel bandwidth of the BSS indicated by the EHT operation element is 160 MHz. However, because the VHT STA does not support channel puncturing, the channel bandwidth of the BSS indicated by the VHT operation element is 40 MHz.

Step 302: The EHT STA and the VHT STA receive corresponding bandwidth configuration information of the BSS.

Step 303. The EHT STA and the VHT STA obtain channel bandwidth information and channel location information based on the bandwidth configuration information of the BSS.

For example, in this embodiment, the HT operation element carries a Primary Channel field and an SCO field, where the Primary Channel field includes a channel number of a primary 20 MHz channel. For example, a value of the SCO field is 3, used to indicate that a secondary channel is present and that the secondary channel is located above the primary channel. For other fields carried in the HT operation element, refer to the foregoing description. Details are not described herein again.

For example, in this embodiment, the VHT operation element carries a Channel Width field, a CCFS 0 field, and a CCFS 1 field. For example, Channel Width=0, CCFS 0>0, CCFS 1=0, and center frequency information in the CCFS 0 field indicates a center frequency of a 40 MHz channel. For other fields in the VHT operation element, refer to the foregoing description and the conventional technology. Details are not described herein again.

Correspondingly, the VHT STA reads the Primary Channel field in the HT operation element to obtain the channel number of the primary 20 MHz channel, and determines, by reading the SCO field, that the value of the SCO field is non-zero. The VHT STA determines, by reading the Channel Width field in the VHT operation element, that a value of the Channel Width field is 0, that is, Channel Width=0. In addition, with reference to the non-zero value of the SCO field, the VHT STA may determine that the channel bandwidth of the BSS is 40 MHz, and the VHT STA may obtain the center frequency of the 40 MHz channel by reading the center frequency information in the CCFS 0 field. In this embodiment, the bandwidth configuration information of the BSS obtained by the VHT STA includes the channel bandwidth of 40 MHz, the center frequency of the 40 MHz channel, and the channel number of the primary 20 MHz channel.

For example, in this embodiment, the EHT operation element carries a Channel Width field, a CCFS 3 field, a CCFS 4 field, and a Puncture Info field. For example, Channel Width=3, CCFS 3>0, CCFS 4>0, and |CCFS 3−CCFS 4|=8. Puncture information in the Puncture Info field is 11011011, first center frequency information in the CCFS 3 field is used to indicate a center frequency of a primary 80 MHz channel, and second center frequency information in the CCFS 4 field is used to indicate a center frequency of a 160 MHz channel.

Correspondingly, the EHT STA determines, by reading the Channel Width field in the EHT operation element, that a value of the Channel Width field is 3, that is, Channel Width=3. The EHT STA may determine that the channel bandwidth is 160 MHz or 80+80 MHz. The EHT STA further reads the CCFS 3 field and the CCFS 4 field, determines |CCFS 3−CCFS 4|=8, to determine that the channel bandwidth is 160 MHz, and obtains the center frequency of the primary 80 MHz channel and the center frequency of the 160 MHz channel. The EHT STA determines, by reading the puncture information in the Puncture Info field, that is, 11011011, that 20 MHz channels corresponding to a third bit and a fifth bit are punctured channels. For example, the EHT STA reads the Primary Channel field in the HT operation element to obtain the channel number of the primary 20 MHz channel. In this embodiment, the bandwidth configuration information of the BSS that may be obtained by the EHT STA includes the channel bandwidth of 160 MHz, the center frequency of the primary 80 MHz channel, the center frequency of the 160 MHz channel, locations of the punctured channels, and the channel number of the primary 20 MHz channel.

Step 304: The AP sends a management frame, where the management frame carries an Operating Mode Notification Element.

For example, the channel bandwidth of the BSS of the AP is 160 MHz. When service load of the AP is relatively low, the AP may add an Operating Mode Notification Element to a beacon frame, where the Operating Mode Notification Element may carry a field used to indicate updated channel bandwidth information, for example, a Channel Width field, and the field may include the updated channel bandwidth information. For example, in this embodiment, the updated channel bandwidth information indicates that the channel bandwidth is updated to 20 MHz. For a structure and a specific indication manner of the Operating Mode Notification Element, refer to an existing standard. The Operating Mode Notification Element is also applicable to a future standard.

It should be noted that, as described above, beacon frames are periodically sent, and each beacon frame carries elements that are used to indicate channel bandwidth information of the BSS, such as an EHT operation element, a VHT operation element, and an HT operation element. However, the Operating Mode Notification Element is sent only when an operation parameter of the AP is updated. Therefore, signaling overheads are reduced.

Step 305: The EHT STA and the VHT STA update the channel bandwidth information of the BSS in response to the Operating Mode Notification Element.

For example, the VHT STA and the EHT STA may read the Operating Mode Notification Element carried in the beacon frame, and update the channel bandwidth of the BSS to 20 MHz.

It should be noted that the channel bandwidth indicated by the Operating Mode Notification Element may be understood as a temporary indication. When service load of the AP is relatively high, the AP may add the Operating Mode Notification Element to the beacon frame to increase the channel bandwidth of the BSS.

Figure 18:
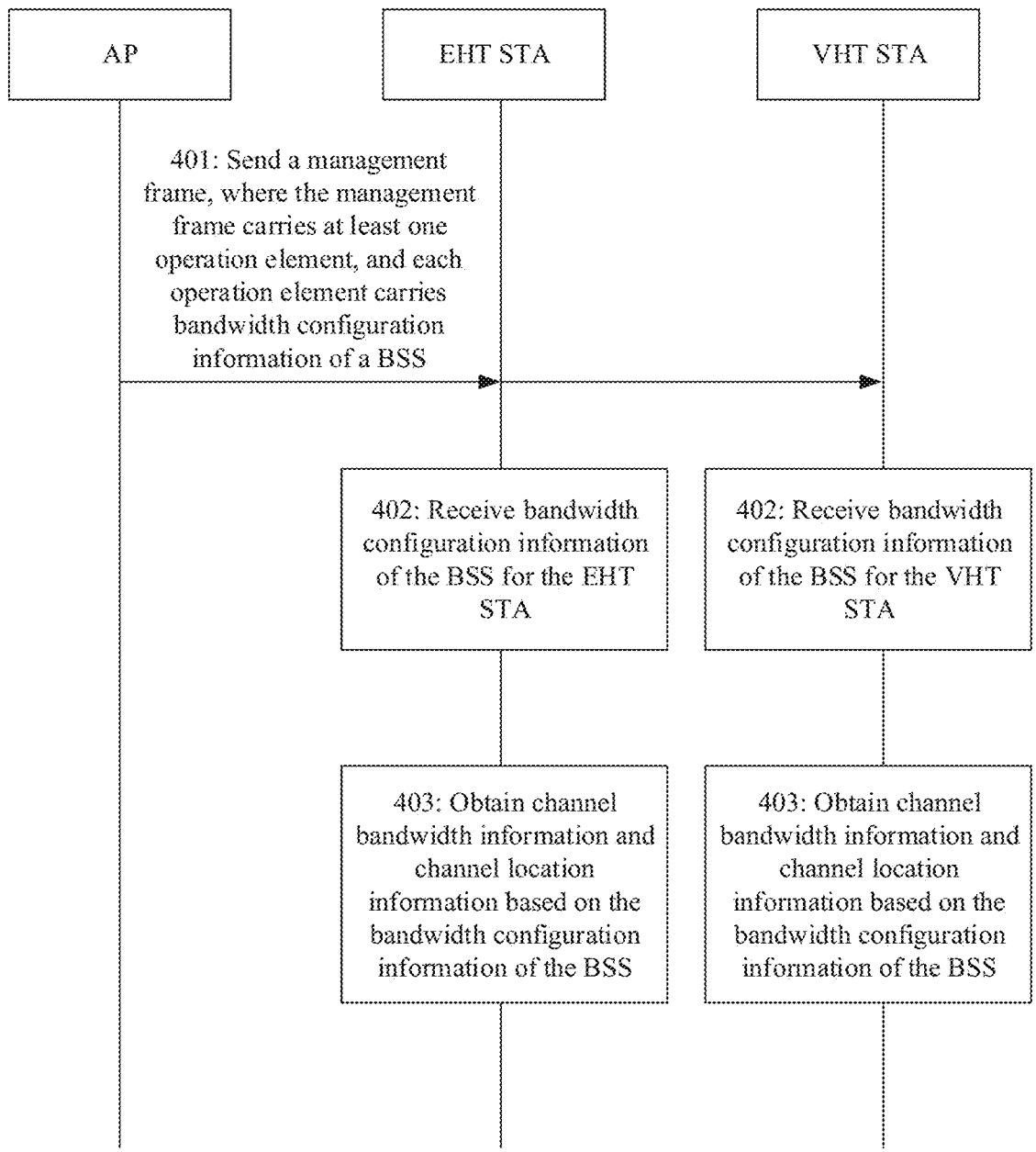
FIG. 18 is a schematic flowchart of a channel bandwidth configuration method according to an embodiment of this application.

Based on the embodiment shown in FIG. 7, with reference to FIG. 14, FIG. 18 is an example schematic flowchart of a channel bandwidth configuration method. In FIG. 18:

Step 401: An AP sends a management frame, where the management frame carries at least one operation element, and each operation element carries bandwidth configuration information of a BSS.

Optionally, the AP sends a beacon frame, where the beacon frame includes but is not limited to an HT operation element, a VHT operation element, and an EHT operation element. It should be noted that, in this embodiment, only manners of configuring channel bandwidths of the BSS for a VHT STA and an EHT STA are described. The beacon frame further carries an HE operation element. However, because channel bandwidth configurations of the BSS for an HE STA and an HT STA are irrelevant to this application, for a specific implementation, refer to the conventional technology. Details are not described in this application.

For example, refer to FIG. 14. The channel bandwidth of the BSS configured by the AP is 80+80 MHz, that is, the channel bandwidth of the BSS indicated by the EHT operation element is 80+80 MHz. However, because the VHT STA does not support channel puncturing, the channel bandwidth of the BSS indicated by the VHT operation element is 80 MHz.

Step 402: The EHT STA and the VHT STA receive corresponding bandwidth configuration information of the BSS.

Step 403: The EHT STA and the VHT STA obtain channel bandwidth information and channel location information based on the bandwidth configuration information of the BSS.

For example, in this embodiment, the HT operation element carries a Primary Channel field, where the Primary Channel field includes a channel number of a primary 20 MHz channel. For other fields carried in the HT operation element, refer to the foregoing description. Details are not described herein again.

For example, in this embodiment, the VHT operation element carries a Channel Width field, a CCFS 0 field, and a CCFS 1 field. For example, Channel Width=1, CCFS 0>0, CCFS 1=0, and center frequency information in the CCFS 0 field indicates a center frequency of a primary 80 MHz channel. For other fields in the VHT operation element, refer to the foregoing description and the conventional technology. Details are not described herein again.

Correspondingly, the VHT STA reads the Primary Channel field in the HT operation element to obtain the channel number of the primary 20 MHz channel. For example, the VHT STA determines, by reading the Channel Width field in the VHT operation element, that a value of the Channel Width field is 1, that is, Channel Width=1. The VHT STA may determine that the channel bandwidth of the BSS is 80 MHz, 160 MHz, or 80+80 MHz. The VHT STA further reads the CCFS 0 field and the CCFS 1 field, determines, based on CCFS 1=0, that the channel bandwidth is 80 MHz, and obtains the center frequency of the primary 80 MHz channel. In this embodiment, the bandwidth configuration information of the BSS that may be obtained by the VHT STA includes the channel bandwidth of 80 MHz, the center frequency of the primary 80 MHz channel, and the channel number of the primary 20 MHz channel.

For example, in this embodiment, the EHT operation element carries a Channel Width field, a CCFS 3 field, a CCFS 4 field, and a Puncture Info field. For example, Channel Width=3, CCFS 3>0, CCFS 4>0, and |CCFS 3−CCFS 4|>16. Puncture information in the Puncture Info field is 11111011, first center frequency information in the CCFS 3 field is used to indicate a center frequency of a primary 80 MHz channel, and second center frequency information in the CCFS 4 field is used to indicate a center frequency of a secondary 80 MHz channel.

Correspondingly, the EHT STA determines, by reading the Channel Width field in the EHT operation element, that a value of the Channel Width field is 3, that is, Channel Width=3. The EHT STA may determine that the channel bandwidth is 160 MHz or 80+80 MHz. The EHT STA further reads the CCFS 3 field and the CCFS 4 field, determines |CCFS 3−CCFS 4|>16, to determine that the channel bandwidth is 80+80 MHz, and obtains the center frequency of the primary 80 MHz channel and the center frequency of the secondary 80 MHz channel. The EHT STA determines, by reading the puncture information in the Puncture Info field, that is, 11111011, that a 20 MHz channel corresponding to a fifth bit (B5) is a punctured channel. For example, the EHT STA reads the Primary Channel field in the HT operation element to obtain the channel number of the primary 20 MHz channel. In this embodiment, the bandwidth configuration information of the BSS that may be obtained by the EHT STA includes the channel bandwidth of 80+80 MHz, the center frequency of the primary 80 MHz channel, the center frequency of the secondary 80 MHz channel, a location of the punctured channel, and the channel number of the primary 20 MHz channel.

In a possible implementation, this embodiment may also be implemented with reference to an Operating Mode Notification Element. This is similar to the foregoing implementation. Details are not described herein again.

Figure 19:
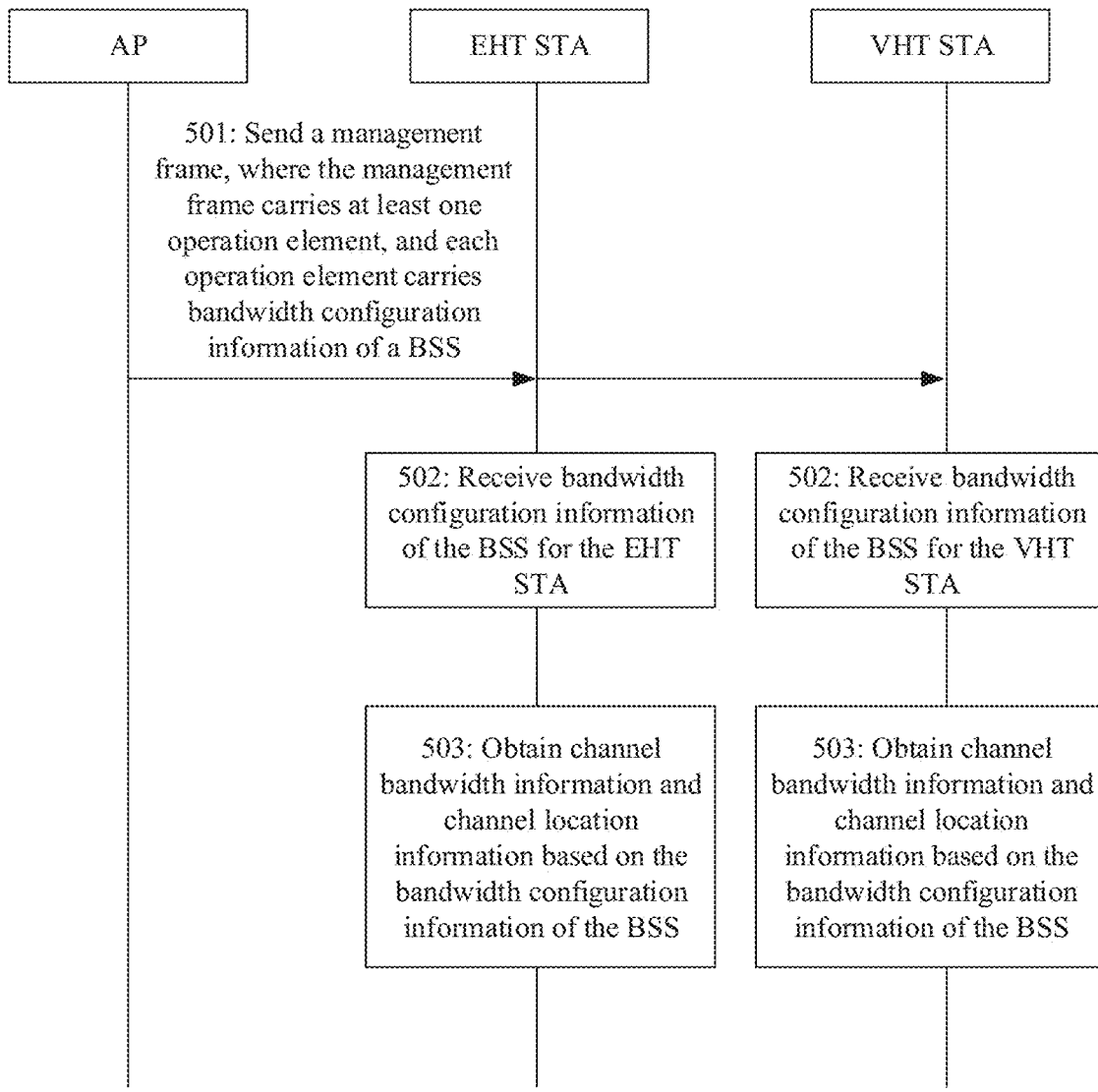
FIG. 19 is a schematic flowchart of a channel bandwidth configuration method according to an embodiment of this application.

Based on the embodiment shown in FIG. 7, with reference to FIG. 15, FIG. 19 is an example schematic flowchart of a channel bandwidth configuration method. In FIG. 19:

Step 501: An AP sends a management frame, where the management frame carries at least one operation element, and each operation element carries bandwidth configuration information of a BSS.

Optionally, the AP sends a management frame, where the management frame includes but is not limited to an HT operation element, a VHT operation element, and an EHT operation element. It should be noted that, in this embodiment, only manners of configuring channel bandwidths of the BSS for a VHT STA and an EHT STA are described. The management frame further carries an HE operation element. However, because channel bandwidth configurations of the BSS for an HE STA and an HT STA are irrelevant to this application, for a specific implementation, refer to the conventional technology. Details are not described in this application.

For example, refer to FIG. 15. The channel bandwidth of the BSS configured by the AP is 320 MHz, that is, the channel bandwidth of the BSS indicated by the EHT operation element is 320 MHz. However, because the VHT STA does not support channel puncturing, the channel bandwidth of the BSS indicated by the VHT operation element is 80 MHz.

Step 502: The EHT STA and the VHT STA receive corresponding bandwidth configuration information of the BSS.

Step 503: The EHT STA and the VHT STA obtain channel bandwidth information and channel location information based on the bandwidth configuration information of the BSS.

For example, in this embodiment, the HT operation element carries a Primary Channel field, where the Primary Channel field includes a channel number of a primary 20 MHz channel. For other fields carried in the HT operation element, refer to the foregoing description. Details are not described herein again.

For example, in this embodiment, the VHT operation element carries a Channel Width field, a CCFS 0 field, and a CCFS 1 field. For example, Channel Width=1, CCFS 0>0, CCFS 1=0, and center frequency information in the CCFS 0 field indicates a center frequency of a primary 80 MHz channel. For other fields in the VHT operation element, refer to the foregoing description and the conventional technology. Details are not described herein again.

Correspondingly, the VHT STA reads the Primary Channel field in the HT operation element to obtain the channel number of the primary 20 MHz channel. For example, the VHT STA determines, by reading the Channel Width field in the VHT operation element, that a value of the Channel Width field is 1, that is, Channel Width=1. The VHT STA may determine that the channel bandwidth of the BSS is 80 MHz, 160 MHz, or 80+80 MHz. The VHT STA further reads the CCFS 0 field and the CCFS 1 field, determines, based on CCFS 1=0, that the channel bandwidth is 80 MHz, and obtains the center frequency of the primary 80 MHz channel. In this embodiment, the bandwidth configuration information of the BSS that may be obtained by the VHT STA includes the channel bandwidth of 80 MHz, the center frequency of the primary 80 MHz channel, and the channel number of the primary 20 MHz channel.

For example, in this embodiment, the EHT operation element carries a Channel Width field, a CCFS 3 field, a CCFS 4 field, and a Puncture Info field. For example, Channel Width=4, CCFS 3>0, CCFS 4>0, and |CCFS 3−CCFS 4|=16. Puncture information in the Puncture Info field is 1111101111111011, first center frequency information in the CCFS 3 field is used to indicate a center frequency of a primary 160 MHz channel, and second center frequency information in the CCFS 4 field is used to indicate a center frequency of a 320 MHz channel.

Correspondingly, the EHT STA determines, by reading the Channel Width field in the EHT operation element, that a value of the Channel Width field is 4, that is, Channel Width=4. The EHT STA may determine that the channel bandwidth is 320 MHz or 160+160 MHz. The EHT STA further reads the CCFS 3 field and the CCFS 4 field, determines |CCFS 3−CCFS 4|=16, to determine that the channel bandwidth is 320 MHz, and obtains the center frequency of the primary 160 MHz channel and the center frequency of the 320 MHz channel. The EHT STA determines, by reading the puncture information in the Puncture Info field, that is, 1111101111111011, that 20 MHz channels corresponding to a fifth bit (B5) and a thirteenth bit (B13) are punctured channels. For example, the EHT STA reads the Primary Channel field in the HT operation element to obtain the channel number of the primary 20 MHz channel. In this embodiment, the bandwidth configuration information of the BSS that may be obtained by the EHT STA includes the channel bandwidth of 320 MHz, the center frequency of the primary 160 MHz channel, the center frequency of the 320 MHz channel, locations of the punctured channels, and the channel number of the primary 20 MHz channel.

In a possible implementation, this embodiment may also be implemented with reference to an Operating Mode Notification Element. This is similar to the foregoing implementation. Details are not described herein again.

Figure 20:
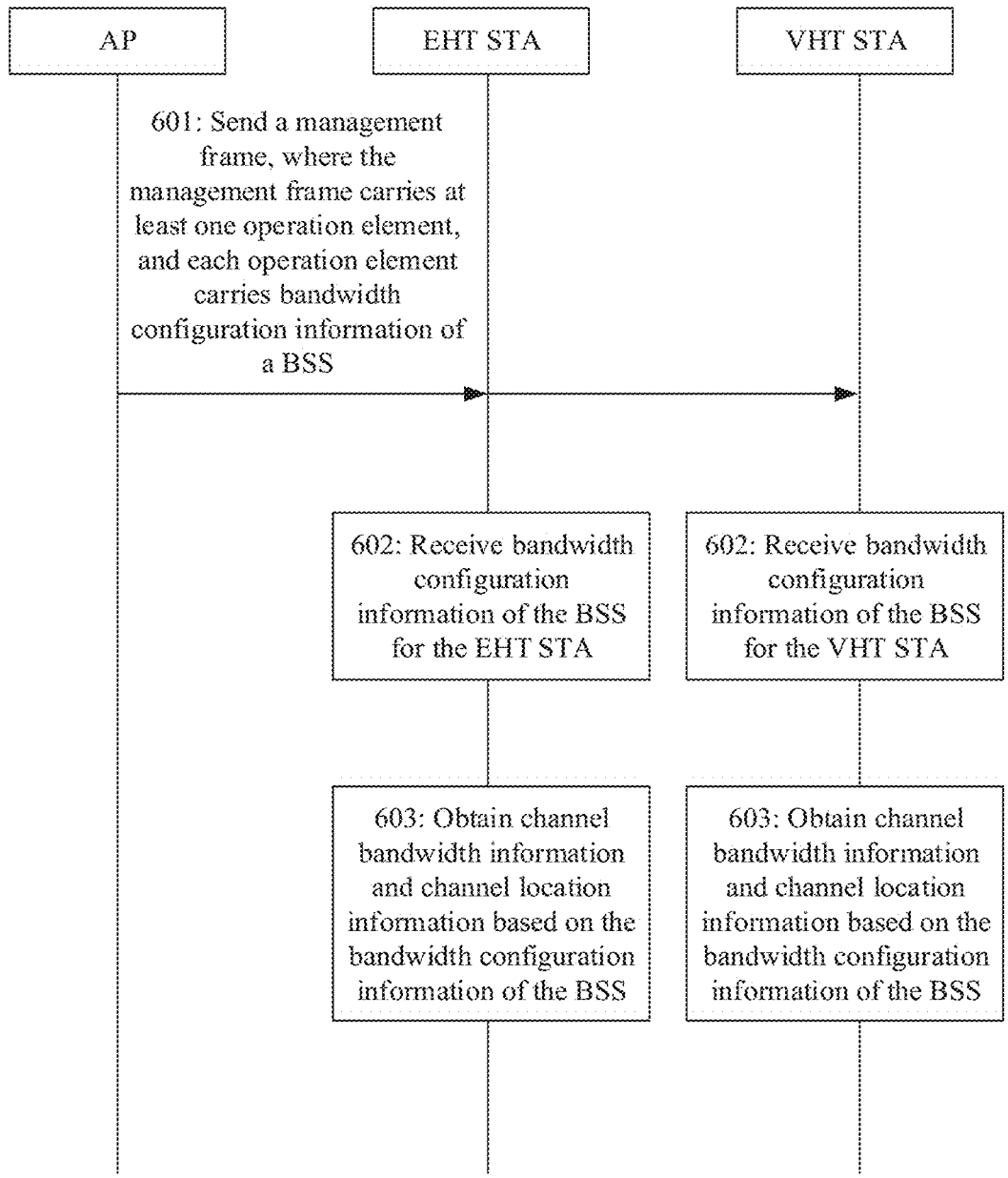
FIG. 20 is a schematic flowchart of a channel bandwidth configuration method according to an embodiment of this application.

Based on the embodiment shown in FIG. 7, with reference to FIG. 16, FIG. 20 is an example schematic flowchart of a channel bandwidth configuration method. In FIG. 20:

Step 601: An AP sends a management frame, where the management frame carries at least one operation element, and each operation element carries bandwidth configuration information of a BSS.

Optionally, the AP sends a beacon frame, where the beacon frame includes but is not limited to an HT operation element, a VHT operation element, and an EHT operation element. It should be noted that, in this embodiment, only manners of configuring channel bandwidths of the BSS for a VHT STA and an EHT STA are described. The management frame further carries an HE operation element. However, because channel bandwidth configurations of the BSS for an HE STA and an HT STA are irrelevant to this application, for a specific implementation, refer to the conventional technology. Details are not described in this application.

For example, refer to FIG. 16. The channel bandwidth of the BSS configured by the AP is 160+160 MHz, that is, the channel bandwidth of the BSS indicated by the EHT operation element is 160+160 MHz. However, because the VHT STA does not support channel puncturing, the channel bandwidth of the BSS indicated by the VHT operation element is 80 MHz.

Step 602: The EHT STA and the VHT STA receive corresponding bandwidth configuration information of the BSS.

Step 603: The EHT STA and the VHT STA obtain channel bandwidth information and channel location information based on the bandwidth configuration information of the BSS.

For example, in this embodiment, the HT operation element carries a Primary Channel field, where the Primary Channel field includes a channel number of a primary 20 MHz channel. For other fields carried in the HT operation element, refer to the foregoing description. Details are not described herein again.

For example, in this embodiment, the VHT operation element carries a Channel Width field, a CCFS 0 field, and a CCFS 1 field. For example, Channel Width=1, CCFS 0>0, CCFS 1=0, and center frequency information in the CCFS 0 field indicates a center frequency of a primary 80 MHz channel. For other fields in the VHT operation element, refer to the foregoing description and the conventional technology. Details are not described herein again.

Correspondingly, the VHT STA reads the Primary Channel field in the HT operation element to obtain the channel number of the primary 20 MHz channel. For example, the VHT STA determines, by reading the Channel Width field in the VHT operation element, that a value of the Channel Width field is 1, that is, Channel Width=1. The VHT STA may determine that the channel bandwidth of the BSS is 80 MHz, 160 MHz, or 80+80 MHz. The VHT STA further reads the CCFS 0 field and the CCFS 1 field, determines, based on CCFS 1=0, that the channel bandwidth is 80 MHz, and obtains the center frequency of the primary 80 MHz channel. In this embodiment, the bandwidth configuration information of the BSS that may be obtained by the VHT STA includes the channel bandwidth of 80 MHz, the center frequency of the primary 80 MHz channel, and the channel number of the primary 20 MHz channel.

For example, in this embodiment, the EHT operation element carries a Channel Width field, a CCFS 3 field, a CCFS 4 field, and a Puncture Info field. For example, Channel Width=4, CCFS 3>0, CCFS 4>0, and |CCFS 3−CCFS 4|>32. Puncture information in the Puncture Info field is 1111101111111011, first center frequency information in the CCFS 3 field is used to indicate a center frequency of a primary 160 MHz channel, and second center frequency information in the CCFS 4 field is used to indicate a center frequency of a secondary 160 MHz channel.

Correspondingly, the EHT STA determines, by reading the Channel Width field in the EHT operation element, that a value of the Channel Width field is 4, that is, Channel Width=4. The EHT STA may determine that the channel bandwidth is 320 MHz or 160+160 MHz. The EHT STA further reads the CCFS 3 field and the CCFS 4 field, determines |CCFS 3−CCFS 4|>32, to determine that the channel bandwidth is 160+160 MHz, and obtains the center frequency of the primary 160 MHz channel and the center frequency of the secondary 160 MHz channel. The EHT STA determines, by reading the puncture information in the Puncture Info field, that is, 1111101111111011, that 20 MHz channels corresponding to a fifth bit (B5) and a thirteenth bit (B13) are punctured channels. For example, the EHT STA reads the Primary Channel field in the HT operation element to obtain the channel number of the primary 20 MHz channel. In this embodiment, the bandwidth configuration information of the BSS that may be obtained by the EHT STA includes the channel bandwidth of 160+160 MHz, the center frequency of the primary 160 MHz channel, the center frequency of the secondary 160 MHz channel, locations of the punctured channels, and the channel number of the primary 20 MHz channel.

In a possible implementation, this embodiment may also be implemented with reference to an Operating Mode Notification Element. This is similar to the foregoing implementation. Details are not described herein again.

Scenario 2

Figure 21:
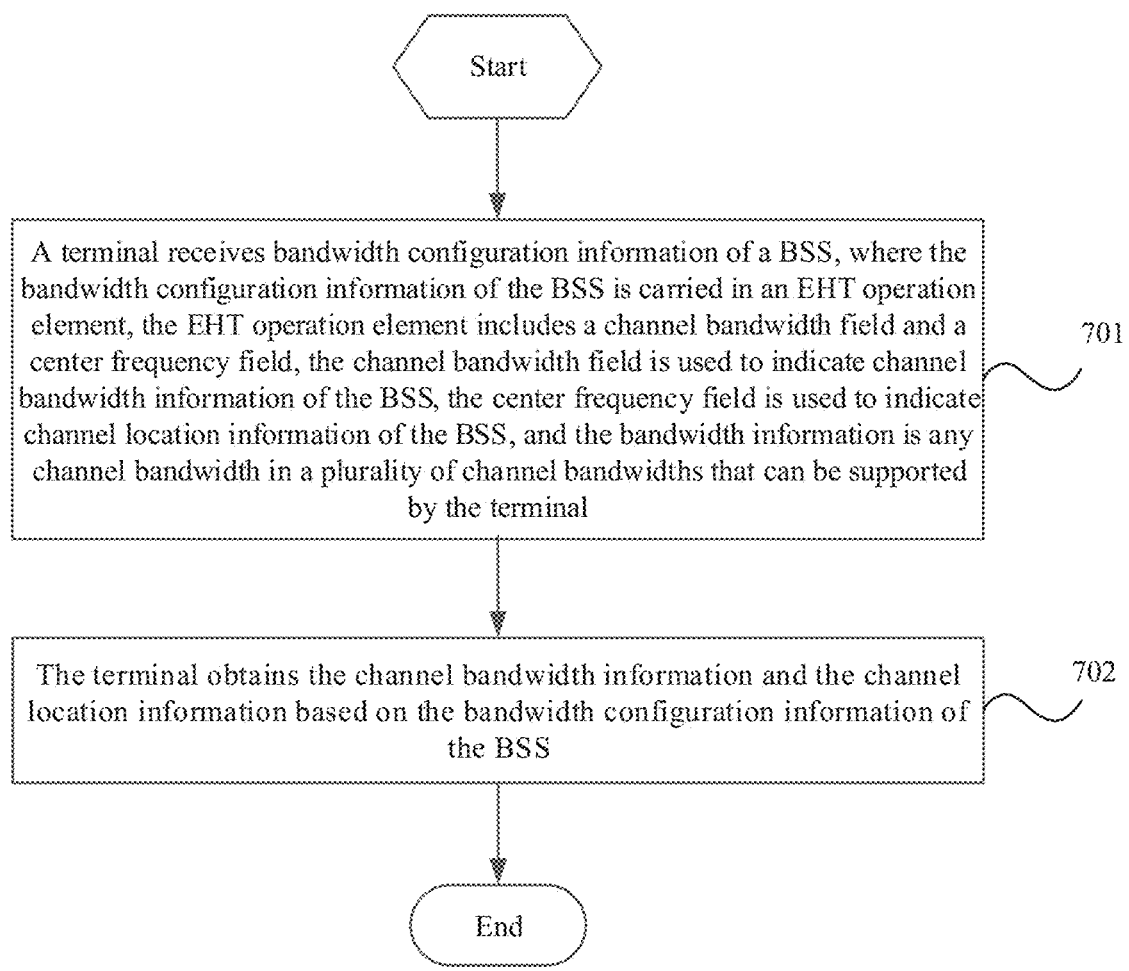
FIG. 21 is a schematic flowchart of a channel bandwidth configuration method according to an embodiment of this application.

With reference to FIG. 5, FIG. 21 is a schematic flowchart of a channel bandwidth configuration method according to an embodiment of this application. In FIG. 21:

Step 701: A terminal receives bandwidth configuration information of a BSS, where the bandwidth configuration information of the BSS is carried in an EHT operation element, the EHT operation element includes a channel bandwidth field and a center frequency field, the channel bandwidth field is used to indicate channel bandwidth information of the BSS, the center frequency field is used to indicate channel location information of the BSS, and the bandwidth information is any channel bandwidth in a plurality of channel bandwidths that can be supported by the terminal.

Specifically, an AP sends a beacon frame, where the beacon frame carries an EHT operation element used to indicate an EHT STA to configure the BSS based on the EHT operation element. Optionally, when a primary channel of the AP is in a 5 GHz frequency band, the beacon frame sent by the AP also carries an HT/VHT/HE/EHT operation element. Optionally, when a primary channel of the AP is in a 6 GHz frequency band, the beacon frame sent by the AP also carries an HE/EHT operation element.

In this embodiment, only an example in which the terminal is an EHT STA is used to describe in detail a manner of configuring a channel bandwidth for the EHT STA based on the newly defined EHT operation element.

It should be noted that this application is described only by using an example in which a management frame is a beacon frame. A frame carrying an element such as the EHT operation element may alternatively be another type of management frame. This is not limited in this application.

Step 702: The terminal obtains the channel bandwidth information and the channel location information based on the bandwidth configuration information of the BSS.

Specifically, after receiving the EHT operation element, the EHT STA may determine the bandwidth configuration information of the BSS by reading information included in each field carried in the EHT operation element. A specific reading manner is described above. Details are not described herein again.

Specifically, in this embodiment, for a structure of the EHT operation element, still refer to FIG. 8. A difference from the scenario 1 lies in that both a CCFS 4 field and a Puncture Info field are optional fields.

With reference to FIG. 8, the following describes in detail an indication manner of each field in this embodiment.

(1) Control Field

Specifically, the Control field carries a Puncture Info Present field, a Channel Width field, and a reserved field. The Puncture Info Present field is used to indicate whether a Puncture Info field is present, or understandably, used to indicate whether channel puncturing is present in the BSS. For example, a length of the Control field may be 1 byte.

For an indication manner of the Puncture Info Present field, refer to the scenario 1. Details are not described herein again.

For example, the Channel Width field includes the channel bandwidth information of the BSS, used to indicate a channel bandwidth of the BSS.

In an example, when the Channel Width field includes a first preset value, it indicates that the channel bandwidth of the BSS is 20 MHz. In another example, when the Channel Width field includes a second preset value, it indicates that the channel bandwidth of the BSS is 40 MHz. In still another example, when the Channel Width field includes a third preset value, it indicates that the channel bandwidth of the BSS is 80 MHz. In still another example, when the Channel Width field includes a fourth preset value, it indicates that the channel bandwidth of the BSS is 160 MHz. In still another example, when the Channel Width field includes a fifth preset value, it indicates that the channel bandwidth of the BSS is 80+80 MHz. In still another example, when the Channel Width field includes a sixth preset value, it indicates that the channel bandwidth of the BSS is 240 MHz. In still another example, when the Channel Width field includes a seventh preset value, it indicates that the channel bandwidth of the BSS is 80+160 MHz. In still another example, when the Channel Width field includes an eighth preset value, it indicates that the channel bandwidth of the BSS is 160+80 MHz. In still another example, when the Channel Width field includes a ninth preset value, it indicates that the channel bandwidth of the BSS is 320 MHz. In still another example, when the Channel Width field includes a tenth preset value, it indicates that the channel bandwidth of the BSS is 160+160 MHz.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz.

Channel Width=3, used to indicate that the channel bandwidth of the BSS is 160 MHz.

Channel Width=4, used to indicate that the channel bandwidth of the BSS is 80+80 MHz.

Channel Width=5, used to indicate that the channel bandwidth of the BSS is 240 MHz.

Channel Width=6, used to indicate that the channel bandwidth of the BSS is 80+160 MHz.

Channel Width=7, used to indicate that the channel bandwidth of the BSS is 160+80 MHz.

Channel Width=8, used to indicate that the channel bandwidth of the BSS is 320 MHz.

Channel Width=9, used to indicate that the channel bandwidth of the BSS is 160+160 MHz.

The foregoing value is merely an example, and is not limited in this application.

(2) CCFS 3 Field

Specifically, the CCFS 3 field is the first channel center frequency field in this application, and the field includes first segment center frequency information used to indicate a center frequency of a first segment.

For example, the first segment center frequency information may be an index value corresponding to the center frequency of the segment. For a related concept of the index value, refer to the foregoing description. Details are not described herein again.

(3) CCFS 4 Field

Specifically, the CCFS 3 field is the second channel center frequency field in this application, and the field carries second segment center frequency information used to indicate a center frequency of a second segment.

For example, the center frequency of the second segment may be an index value corresponding to the center frequency of the segment. For a related concept of the index value, refer to the foregoing description. Details are not described herein again.

In this embodiment, the Channel Width field indicates the corresponding channel bandwidth by using different values. Therefore, for an extended bandwidth (160 MHz or higher), the EHT STA does not need to determine the channel bandwidth with reference to a difference between the CCFS 3 field and the CCFS 4 field. Correspondingly, in this embodiment, the CCFS 4 field is present only when the channel bandwidth is 80+80 MHz, 80+160 MHz, 160+80

MHz, and 160+160 MHz, and the CCFS 4 field is used to indicate a center frequency of a secondary channel. Usage is as follows:

TABLE 6

| Bandwidth | CCFS 3 | CCFS 4 | Judgment rules |
|---|---|---|---|
| 20 MHz | Center frequency information of a primary 20 MHz channel | Not present | Channel Width = 0 |
| 40 MHz | Center frequency information of a primary 40 MHz channel | Not present | Channel Width = 1 |
| 80 MHz | Center frequency information of a primary 80 MHz channel | Not present | Channel Width = 2 |
| 160 MHz | Center frequency information of a primary 80 MHz channel | Not present | Channel Width = 3 |
| 80 + 80 MHz | Center frequency information of a primary 80 MHz channel | Center frequency information of a secondary 80 MHz channel | Channel Width = 4 |
| 240 MHz | Center frequency information of a primary 80 MHz channel | Not present | Channel Width = 5 |
| 80 + 160 MHz | Center frequency information of a primary 80 MHz channel | Center frequency information of a secondary 160 MHz channel | Channel Width = 6 |
| 160 + 80 MHz | Center frequency information of a primary 160 MHz channel | Center frequency information of a secondary 80 MHz channel | Channel Width = 7 |
| 320 MHz | Center frequency information of a primary 160 MHz channel | Not present | Channel Width = 8 |
| 160 + 160 MHz | Center frequency information of a primary 160 MHz channel | Center frequency information of a secondary 160 MHz channel | Channel Width = 9 |

For related descriptions, refer to Table 4. Details are not described herein again.

(4) Puncture Info Field

Usage of the Puncture Info field is the same as that in the scenario 1, and is not described herein again.

In a possible implementation, when the BSS is established in the 5 GHz frequency band, that is, when the EHT STA receives, in the 5 GHz frequency band, the beacon frame carrying the EHT operation element, the EHT STA may further receive the HT operation element in the beacon frame, and may obtain channel information of the primary 20 MHz channel by reading a Primary Channel field (for a related concept, refer to the foregoing description) carried in the HT operation element, for example, identification information of primary 20 MHz, for example, an index number or a channel number of the primary 20 MHz channel. In this way, a specific location of the channel of the BSS on a frequency domain resource is determined with reference to the obtained channel bandwidth information of the BSS.

In another possible implementation, when the BSS is established in the 6 GHz frequency band, that is, when the EHT STA receives, in the 6 GHz frequency band, the management frame carrying the EHT operation element, because the HT operation element is absent from 6 GHz, the EHT STA may receive the HE operation element in the beacon frame, and may obtain channel information of the primary 20 MHz channel by reading a Primary Channel field (for a related concept, refer to the foregoing description) carried in the HE operation element. In this way, a specific location of the channel of the BSS on a frequency domain resource is determined with reference to the obtained channel bandwidth information of the BSS.

In still another possible implementation, if the channel bandwidth of the BSS is 80+80 MHz, 160+160 MHz, or the like and is formed by bonding two non-contiguous channels, optionally, the two channels may be located in different frequency bands. For example, one channel is located in the 5 GHz frequency band, and the other channel is located in the 6 GHz frequency band. In this embodiment, the reserved field in the Control field may include indication information, for example, Operation Class Present (OCP), used to indicate whether the EHT operation element carries an Operation Class field, or understandably, used to indicate whether the two channels are located in different frequency bands. For example, when OCP=1, it indicates that the EHT operation element carries the Operation Class field, that is, the two channels are located in different frequency bands, and the corresponding Operation Class field may include frequency band indication information used to indicate a frequency band in which a secondary 80 MHz channel or a secondary 160 MHz channel is located.

Scenario 3

Figure 22:
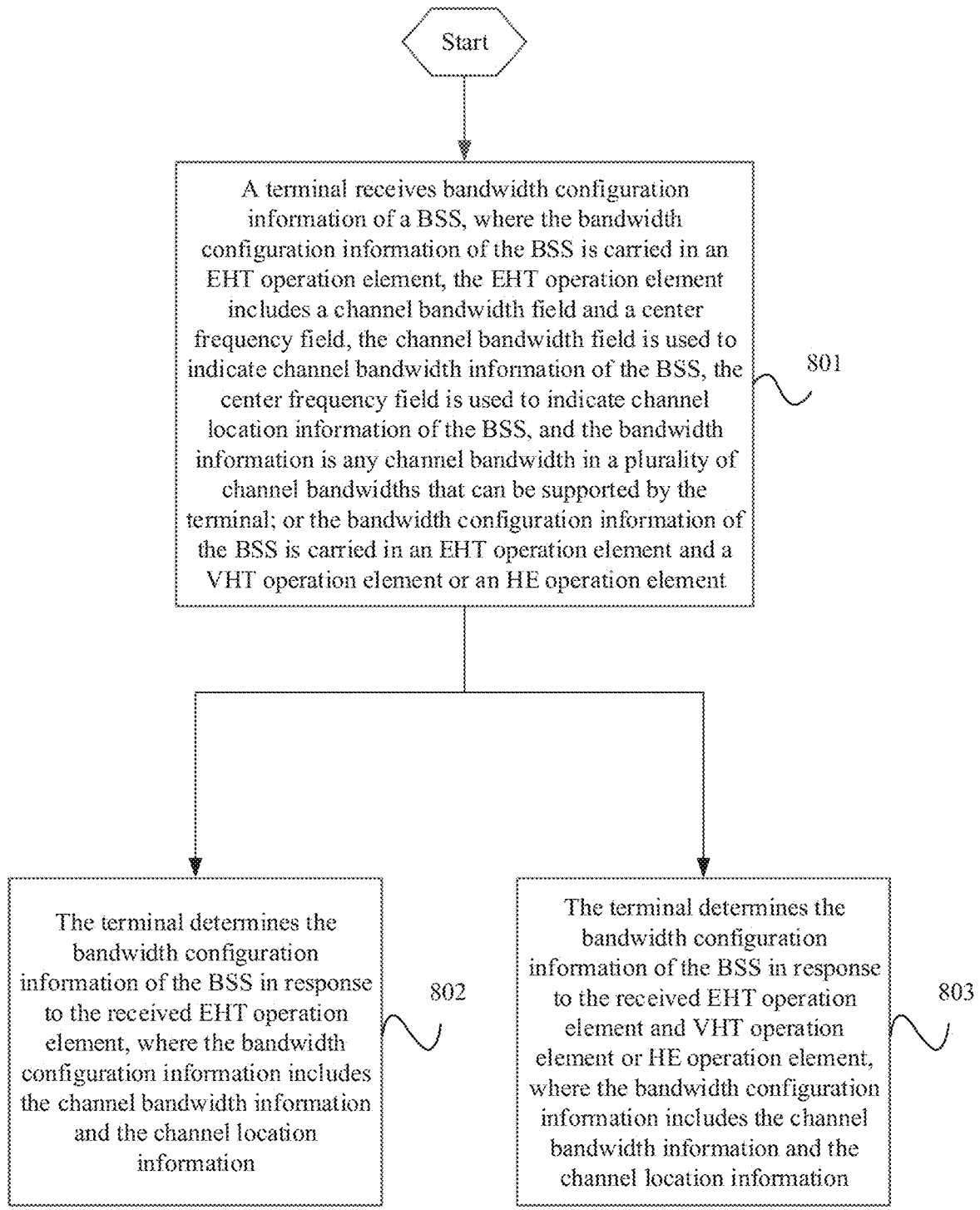
FIG. 22 is a schematic flowchart of a channel bandwidth configuration method according to an embodiment of this application.

With reference to FIG. 5, FIG. 22 is a schematic flowchart of a channel bandwidth configuration method according to an embodiment of this application. In FIG. 22:

Step 801: A terminal receives bandwidth configuration information of a BSS, where the bandwidth configuration information of the BSS is carried in an EHT operation element, the EHT operation element includes a channel bandwidth field and a center frequency field, the channel bandwidth field is used to indicate channel bandwidth information of the BSS, the center frequency field is used to indicate channel location information of the BSS, and the bandwidth information is any channel bandwidth in a plurality of channel bandwidths that can be supported by the terminal; or the bandwidth configuration information of the BSS is carried in an EHT operation element and a VHT operation element or an HE operation element.

Specifically, an AP sends a beacon frame, where the beacon frame carries an EHT operation element used to indicate an EHT STA to configure the BSS based on the EHT operation element. Optionally, when a primary channel of the AP is in a 5 GHz frequency band, the beacon frame sent by the AP also carries an HT/VHT/HE/EHT operation element. Optionally, when a primary channel of the AP is in a 6 GHz frequency band, the beacon frame sent by the AP also carries an HE/EHT operation element.

In this embodiment, only an example in which the terminal is an EHT STA is used to describe in detail a manner of configuring a channel bandwidth for the EHT STA based on the newly defined EHT operation element.

It should be noted that this application is described only by using an example in which a management frame is a beacon frame. A frame carrying an element such as the EHT operation element may alternatively be another type of management frame. This is not limited in this application.

Specifically, in this embodiment, for a structure of the EHT operation element, still refer to FIG. 8. A difference from the scenario 1 lies in that both a CCFS 4 field and a Puncture Info field are optional fields.

With reference to FIG. 8, the following describes in detail an indication manner of each field in this embodiment.

(1) Control Field

Specifically, the Control field carries a Puncture Info Present field, a Channel Width field, and a reserved field. The Puncture Info Present field is used to indicate whether the Puncture Info field and the CCFS 4 field are present. For example, a length of the Control field may be 1 byte.

For example, when Puncture Info Present=0, the Puncture Info field and the CCFS 4 field are absent. When Puncture Info Present=1, the Puncture Info field and the CCFS 4 are present.

Optionally, a length of the Puncture Info Present field may be 1 bit or 2 bits. It should be noted that lengths of fields in this application are all examples, and are not limited in this application.

Specifically, the Channel Width field includes the channel bandwidth information of the BSS, used to indicate a channel bandwidth of the BSS.

In a possible implementation, when Puncture Info Present=1, a length of the Channel Width field may be 3 bits, and usage of the Channel Width field is as follows:

In an example, when the Channel Width field includes a first preset value, it indicates that the channel bandwidth of the BSS is 20 MHz. In another example, when the Channel Width field includes a second preset value, it indicates that the channel bandwidth of the BSS is 40 MHz. In still another example, when the Channel Width field includes a third preset value, it indicates that the channel bandwidth of the BSS is 80 MHz. In still another example, when the Channel Width field includes a fourth preset value, it indicates that the channel bandwidth of the BSS is 160 MHz or 80+80 MHz. In still another example, when the Channel Width field includes a fifth preset value, it indicates that the channel bandwidth of the BSS is 320 MHz or 160+160 MHz. The foregoing preset values are all different.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz.

Channel Width=3, used to indicate that the channel bandwidth of the BSS is 160 MHz or 80+80 MHz.

Channel Width=4, used to indicate that the channel bandwidth of the BSS is 320 MHz or 160+160 MHz.

The foregoing value is merely an example, and is not limited in this application.

In another possible implementation, when Puncture Info Present=0, a length of the Channel Width field may be 1 bit, and usage of the Channel Width field is as follows:

When the Channel Width field includes a first preset value, for example, 0, it indicates that the channel bandwidth of the BSS is less than or equal to 160 MHz or 80+80 MHz.

When the Channel Width field includes a second preset value, for example, 1, it indicates that the channel bandwidth of the BSS is greater than 160 MHz or 80+80 MHz.

(2) CCFS 3 Field

Specifically, the CCFS 3 field is the first channel center frequency field in this application, and the field includes first segment center frequency information used to indicate a center frequency of a first segment.

For example, the first segment center frequency information may be an index value corresponding to the center frequency of the segment. For a related concept of the index value, refer to the foregoing description. Details are not described herein again.

(3) CCFS 4 Field

Specifically, the CCFS 3 field is the second channel center frequency field in this application, and the field carries second segment center frequency information used to indicate a center frequency of a second segment.

For example, the second segment center frequency information may be an index value corresponding to the center frequency of the segment. For a related concept of the index value, refer to the foregoing description. Details are not described herein again.

In a possible implementation, in presence of channel puncturing in the BSS, usage of each field in the EHT operation element is the same as that in the scenario 1, that is, when the CCFS 3 field and the CCFS 4 field are both present, usage is the same as that in the scenario 1. In addition, step 702 is performed.

In another possible implementation, in absence of channel puncturing in the BSS, the CCFS 4 field and the Puncture Info field are absent. For example, if the BSS is deployed in the 5 GHz frequency band, the EHT STA may read a Channel Width field, a CCFS 0 field, and a CCFS 1 field carried in the VHT operation element, the Channel Width field and the CCFS 3 field carried in the EHT operation element, and a Primary channel field in the HT operation element, to obtain the channel bandwidth configuration of the BSS. For example, if the BSS is deployed in the 6 GHz frequency band, the EHT STA may read a Channel Width field, a CCFS 0 field, and a CCFS 1 field carried in the HE operation element, the Channel Width field and the CCFS 3 field carried in the EHT operation element, and a Primary channel field carried in the HE operation element, to obtain the channel bandwidth configuration of the BSS.

For example, assuming that the BSS is deployed on 6 GHz, for specific usage of the EHT operation element and the HE operation element corresponding to the EHT STA, refer to Table 7.

TABLE 7

| Bandwidth | Primary channel (HE) | CCFS 0 (HE) | CCFS 1 (HE) | CCFS 3 (EHT) | Judgment rules |
| --- | --- | --- | --- | --- | --- |
| 20 MHz | Channel number of a primary 20 MHz channel | Center frequency information of the primary 20 MHz channel | 0 | 0 | Channel Width = 0 |
| 40 MHz | Channel number of a primary 20 MHz channel | Center frequency information of a primary 40 MHz channel | 0 | 0 | Channel Width = 1 |

TABLE 7-continued

| Bandwidth | Primary channel (HE) | CCFS 0 (HE) | CCFS 1 (HE) | CCFS 3 (EHT) | Judgment rules |
|---|---|---|---|---|---|
| 80 MHz | Channel number of a primary 20 MHz channel | Center frequency information of a primary 80 MHz channel | 0 | 0 | Channel Width = 2, and CCFS 0 > 0 |
| 160 MHz | Channel number of a primary 20 MHz channel | Center frequency information of a primary 80 MHz channel | Center frequency information of a 160 MHz channel | 0 | Channel Width = 3, CCFS 0 > 0, CCFS 1 > 0, and \|CCFS 1 − CCFS 0\| = 8 |
| 80 + 80 MHz | Channel number of a primary 20 MHz channel | Center frequency information of a primary 80 MHz channel | Center frequency information of a secondary 80 MHz channel | 0 | Channel Width = 3, CCFS 0 > 0, CCFS 1 > 0, and \|CCFS 1 − CCFS 0\| > 16 |
| 320 MHz | Channel number of a primary 20 MHz channel | Center frequency information of a primary 80 MHz channel | Center frequency information of a primary 160 MHz channel | Center frequency information of a secondary 160 MHz channel | EHT STA: Channel Width = 4, CCFS 0 > 0, CCFS 1 > 0, CCFS 3 > 0, \|CCFS 1 − CCFS 0\| = 8, and \|CCFS 3 − CCFS 1\| = 16 |
| 160 + 160 MHz | Channel number of a primary 20 MHz channel | Center frequency information of a primary 80 MHz channel | Center frequency information of a primary 160 MHz channel | Center frequency information of a secondary 160 MHz channel | Channel Width = 4, CCFS 0 > 0, CCFS 1 > 0, CCFS 3 > 0, \|CCFS 1 − CCFS 0\| = 8, and \|CCFS 3 − CCFS 1\| > 32 |

For example, assuming that the BSS is deployed on 5 GHz, for specific usage of the EHT operation element and the VHT operation element corresponding to the EHT STA, refer to Table 8.

TABLE 8

| Bandwidth | Primary channel (VHT) | CCFS 0 (VHT) | CCFS 1 (VHT) | CCFS 3 (EHT) | Judgment rules |
|---|---|---|---|---|---|
| 20 MHz | Channel number of a primary 20 MHz channel | Center frequency information of the primary 20 MHz channel | 0 | 0 | SCO = 0 and Channel Width = 0 |
| 40 MHz | Channel number of a primary 20 MHz channel | Center frequency information of a primary 40 MHz channel | 0 | 0 | SCO! = 0 and Channel Width = 1 |
| 80 MHz | Channel number of a primary 20 MHz channel | Center frequency information of a primary 80 MHz channel | 0 | 0 | Channel Width = 2 and CCFS 0 > 0 |
| 160 MHz | Channel number of a primary 20 MHz channel | Center frequency information of a primary 80 MHz channel | Center frequency information of a 160 MHz channel | 0 | Channel Width = 3, CCFS 0 > 0, CCFS 1 > 0, and \|CCFS 1/2 − CCFS 0\| = 8 |
| 80 + 80 MHz | Channel number of a primary 20 MHz channel | Center frequency information of a primary 80 MHz channel | Center frequency information of a secondary 80 MHz channel | 0 | Channel Width = 3, CCFS 0 > 0, CCFS 1 > 0, and \|CCFS 1 − CCFS 0\| > 16 |

TABLE 8-continued

| Primary Bandwidth | Primary channel (VHT) | CCFS 0 (VHT) | CCFS 1 (VHT) | CCFS 3 (EHT) | Judgment rules |
|---|---|---|---|---|---|
| 320 MHz | Channel number of a primary 20 MHz channel | Center frequency information of a primary 80 MHz channel | Center frequency information of a primary 160 MHz channel | Center frequency information of a secondary 160 MHz channel | Channel Width = 4, CCFS 0 > 0, CCFS 1 > 0, CCFS 3 > 0, CCFS1 – CCFS 0\| = 8, and \|CCFS 3 – CCFS 1 = 16 |
| 160 + 160 MHz | Channel number of a primary 20 MHz channel | Center frequency information of a primary 80 MHz channel | Center frequency information of a primary 160 MHz channel | Center frequency information of a secondary 160 MHz channel | Channel Width = 4, CCFS 0 > 0, CCFS 1 > 0, CCFS 3 > 0, \|CCFS 1 – CCFS 0\| = 8, and \|CCFS 3 – CCFS 1\| > 32 |

(4) Puncture Info Field

If the Puncture Info field is present, usage of the Puncture Info field is the same as that in the scenario 1. Details are not described herein again.

Step 802: The terminal determines the bandwidth configuration information of the BSS in response to the received EHT operation element, where the bandwidth configuration information includes the channel bandwidth information and the channel location information.

Step 803: The terminal determines the bandwidth configuration information of the BSS in response to the received EHT operation element and VHT operation element or HE operation element, where the bandwidth configuration information includes the channel bandwidth information and the channel location information.

Specifically, after receiving the EHT operation element, or receiving the EHT operation element and the VHT operation element, or receiving the EHT operation element and the HE operation element, the EHT STA may determine the bandwidth configuration information of the BSS. A specific reading manner is described above. Details are not described herein again.

In a possible implementation, if the channel bandwidth of the BSS is 80+80 MHz, 160+160 MHz, or the like and is formed by bonding two non-contiguous channels, optionally, the two channels may be located in different frequency bands. For example, one channel is located in the 5 GHz frequency band, and the other channel is located in the 6 GHz frequency band. In this embodiment, the reserved field in the Control field may include indication information, for example, Operation Class Present, used to indicate whether the EHT operation element carries an Operation Class field, or understandably, used to indicate whether the two channels are located in different frequency bands. For example, when OCP=1, it indicates that the EHT operation element carries the Operation Class field, that is, the two channels are located in different frequency bands, and the corresponding Operation Class field may include frequency band indication information used to indicate a frequency band in which a secondary 80 MHz channel or a secondary 160 MHz channel is located.

Scenario 4

Figure 23:
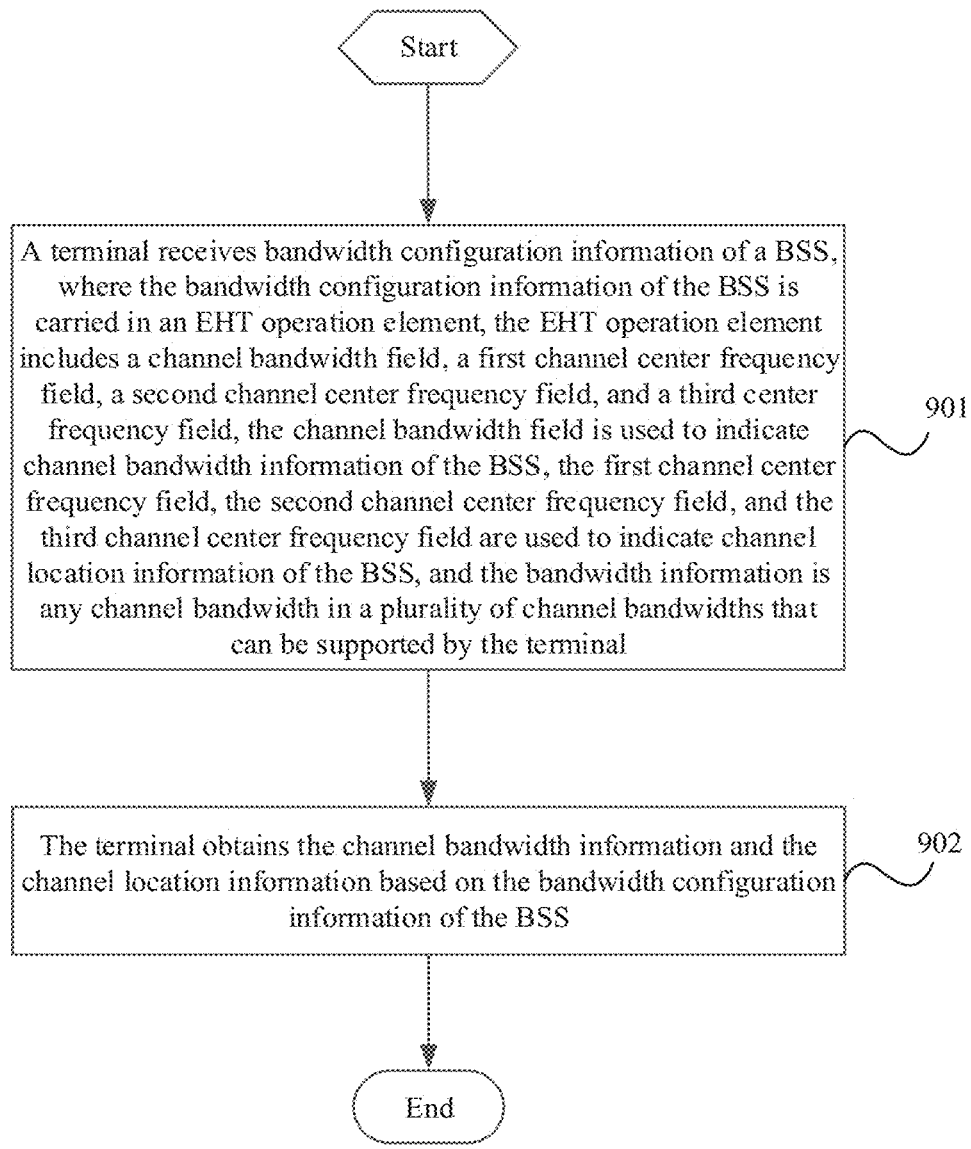
FIG. 23 is a schematic flowchart of a channel bandwidth configuration method according to an embodiment of this application.

With reference to FIG. 5, FIG. 23 is a schematic flowchart of a channel bandwidth configuration method according to an embodiment of this application. In FIG. 23:

Step 901: A terminal receives bandwidth configuration information of a BSS, where the bandwidth configuration information of the BSS is carried in an EHT operation element, the EHT operation element includes a channel bandwidth field, a first channel center frequency field, a second channel center frequency field, and a third center frequency field, the channel bandwidth field is used to indicate channel bandwidth information of the BSS, the first channel center frequency field, the second channel center frequency field, and the third channel center frequency field are used to indicate channel location information of the BSS, and the bandwidth information is any channel bandwidth in a plurality of channel bandwidths that can be supported by the terminal.

Specifically, an AP sends a beacon frame, where the beacon frame carries an EHT operation element used to indicate an EHT STA to configure the BSS based on the EHT operation element. Optionally, when a primary channel of the AP is in a 5 GHz frequency band, the beacon frame sent by the AP also carries an HT/VHT/HE/EHT operation element. Optionally, when a primary channel of the AP is in a 6 GHz frequency band, the beacon frame sent by the AP also carries an HE/EHT operation element.

In this embodiment, only an example in which the terminal is an EHT STA is used to describe in detail a manner of configuring a channel bandwidth for the EHT STA based on the newly defined EHT operation element.

It should be noted that this application is described only by using an example in which a management frame is a beacon frame. A frame carrying an element such as the EHT operation element may alternatively be another type of management frame. This is not limited in this application.

Step 902: The terminal obtains the channel bandwidth information and the channel location information based on the bandwidth configuration information of the BSS.

Specifically, after receiving the EHT operation element, the EHT STA may determine the bandwidth configuration information of the BSS by reading information included in each field carried in the EHT operation element. A specific reading manner is described above. Details are not described herein again.

Figure 24:
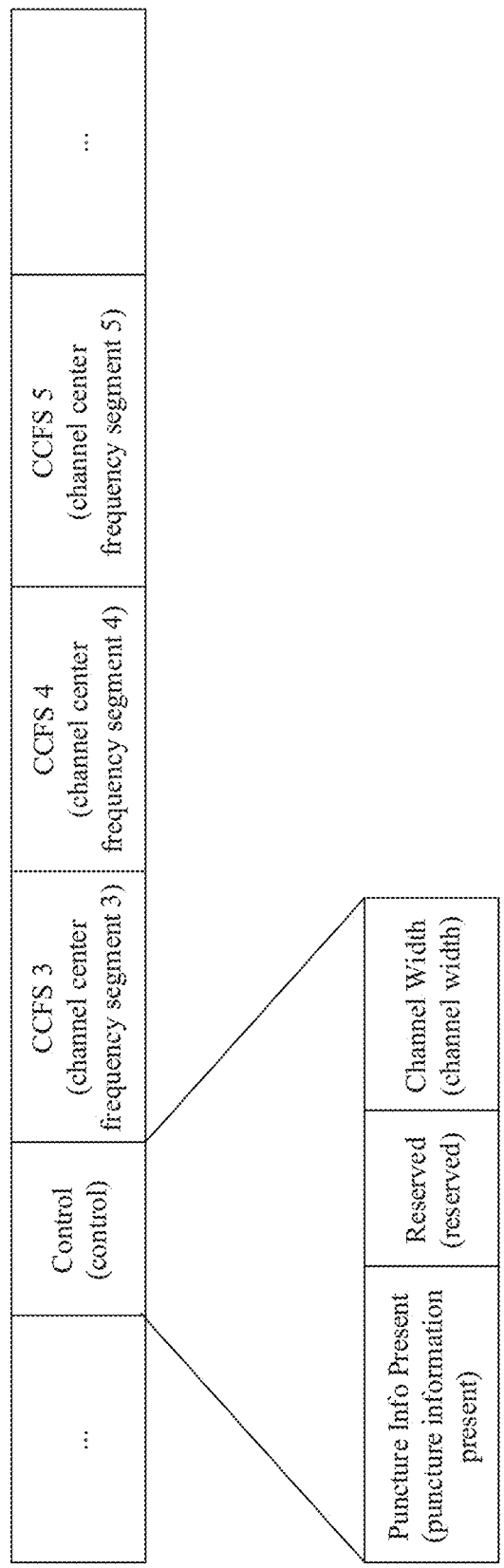
FIG. 24 is an example schematic diagram of a format of an EHT operation element.

Specifically, in this embodiment, a format of the EHT operation element sent by the AP is shown in FIG. 24. Refer to FIG. 24. The EHT operation element includes but is not limited to a Control field, a CCFS 3 field, a CCFS 4 field, and a CCFS 5 field, and optionally may further include a Puncture Info field.

The following describes indication manners of different fields in FIG. 24 in detail.

(1) Control Field

Specifically, the Control field carries a Puncture Info Present field and a Channel Width field. The Puncture Info Present field is used to indicate whether a Puncture Info field is present, or understandably, used to indicate whether channel puncturing is present in the BSS. For example, a length of the Control field may be 1 byte.

For example, when Puncture Info Present=0, the Puncture Info field is absent. When Puncture Info Present=1, the Puncture Info field is present.

Specifically, the Channel Width field includes the channel bandwidth information of the BSS, used to indicate a channel bandwidth of the BSS. In an example, when the Channel Width field includes a first preset value, it indicates that the channel bandwidth of the BSS is 20 MHz. In another example, when the Channel Width field includes a second preset value, it indicates that the channel bandwidth of the BSS is 40 MHz. In still another example, when the Channel Width field includes a third preset value, it indicates that the channel bandwidth of the BSS is 80 MHz. In still another example, when the Channel Width field includes a fourth preset value, it indicates that the channel bandwidth of the BSS is 160 MHz or 80+80 MHz. In still another example, when the Channel Width field includes a fifth preset value, it indicates that the channel bandwidth of the BSS is 320 MHz or 160+160 MHz. The foregoing preset values are all different.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz.

Channel Width=3, used to indicate that the channel bandwidth of the BSS is 160 MHz or 80+80 MHz.

Channel Width=4, used to indicate that the channel bandwidth of the BSS is 320 MHz or 160+160 MHz.

In another example, when the Channel Width field includes a first preset value, it indicates that the channel bandwidth of the BSS is 20 MHz. In another example, w % ben the Channel Width field includes a second preset value, it indicates that the channel bandwidth of the BSS is 40 MHz. In still another example, when the Channel Width field includes a third preset value, it indicates that the channel bandwidth of the BSS is 80 MHz, 160 MHz, or 80+80 MHz. In still another example, when the Channel Width field includes a fourth preset value, it indicates that the channel bandwidth of the BSS is 320 MHz or 160+160 MHz. The foregoing preset values are all different.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz, 160 MHz, or 80+80 MHz.

Channel Width=3, used to indicate that the channel bandwidth of the BSS is 320 MHz or 160+160 MHz.

(2) CCFS 3 Field

Specifically, the CCFS 3 field is the first channel center frequency field in this application, and the field includes first segment center frequency information used to indicate a center frequency of a first segment.

For example, the first segment center frequency information may be an index value corresponding to the center frequency of the segment. For a related concept of the index value, refer to the foregoing description. Details are not described herein again.

(3) CCFS 4 Field

Specifically, the CCFS 4 field is the second channel center frequency field in this application, and the field carries second segment center frequency information used to indicate a center frequency of a second segment.

For example, the center frequency of the second segment may be an index value corresponding to the center frequency of the segment. For a related concept of the index value, refer to the foregoing description. Details are not described herein again.

(4) CCFS 5 Field

Specifically, the CCFS 5 field is the third channel center frequency field in this application, and the field carries third segment center frequency information used to indicate a center frequency of a third segment.

For example, the center frequency of the third segment may be an index value corresponding to the center frequency of the segment. For a related concept of the index value, refer to the foregoing description. Details are not described herein again.

Specifically, in this application, when values of Channel Width fields corresponding to two or more different channel bandwidths are the same, the EHT STA may further read differences between the first channel center frequency information in the CCFS 3 field, the second channel center frequency information in the CCFS 4 field, and the third channel center frequency information in the CCFS 5 field to determine the channel bandwidth.

Specific manners are as follows:

In an example, when the Channel Width field includes the fourth preset value, for example, a value of 3, and the difference between the first channel center frequency information and the second channel center frequency information is equal to a first preset difference, it indicates that the channel bandwidth of the BSS is 160 MHz. For example, if both the first channel center frequency information and the second channel center frequency information are corresponding index values, the first preset difference may be 8.

In another example, when the Channel Width field includes the fourth preset value, for example, a value of 3, and the difference between the first channel center frequency information and the second channel center frequency information is greater than a second preset difference, it indicates that the channel bandwidth of the BSS is 80+80 MHz. For example, if both the first channel center frequency information and the second channel center frequency information are corresponding index values, the second preset difference may be 16.

In still another example, when the Channel Width field includes the fifth preset value, for example, a value of 4, and the difference between the first channel center frequency information and the second channel center frequency information is equal to a third preset difference, and the difference between the second channel center frequency information and the third channel center frequency information is equal to a fourth preset difference, it indicates that the channel bandwidth of the BSS is 320 MHz. For example, if all the first channel center frequency information, the second channel center frequency information, and the third channel center frequency information are corresponding index values, the third preset difference may be 8, and the fourth preset difference is 16.

In still another example, when the Channel Width field includes the fifth preset value, for example, a value of 4, and the difference between the first channel center frequency information and the second channel center frequency information is equal to a fifth preset difference, and the difference between the second channel center frequency information and the third channel center frequency information is equal to a sixth preset difference, it indicates that the channel bandwidth of the BSS is 160+160 MHz. For example, if all the first channel center frequency information, the second channel center frequency information, and the third channel center frequency information are corresponding index values, the fifth preset difference may be 8, and the sixth preset difference is 32.

The following uses specific examples to describe specific usage of the Channel Width field, the CCFS 3 field, the CCFS 4 field, and the CCFS 5 field.

TABLE 9

| Bandwidth | CCFS 3 | CCFS 4 | CCFS 5 | Judgment rules |
|---|---|---|---|---|
| 20 MHz | Center frequency information of a primary 20 MHz channel | 0 | 0 | Channel Width = 0 |
| 40 MHz | Center frequency information of a primary 40 MHz channel | 0 | 0 | Channel Width = 1 |
| 80 MHz | Center frequency information of a primary 80 MHz channel | 0 | 0 | Channel Width = 2, CCFS 4 = 0, and CCFS 5 = 0 |
| 160 MHz | Center frequency information of a primary 80 MHz channel | Center frequency information of a primary 160 MHz channel | 0 | Channel Width = 3, CCFS 3 > 0, CCFS 4| > 0, CCFS 5 = 0, and |CCFS 4 − CCFS 3| = 8 |
| 80 + 80 MHz | Center frequency information of a primary 80 MHz channel | Center frequency information of a secondary 80 MHz channel | 0 | Channel Width = 3, CCFS 3 > 0, CCFS 4 > 0, CCFS 5 = 0, and |CCFS 4 − CCFS 3| > 16 |
| 320 MHz | Center frequency information of a primary 80 MHz channel | Center frequency information of a primary 160 MHz channel | Center frequency information of a 320 MHz channel | Channel Width = 4, CCFS 3 > 0, CCFS 4 > 0, CCFS 5 > 0, |CCFS 4 − CCFS 3| = 8, and |CCFS 5 − CCFS 4| = 16 |
| 160 + 160 MHz | Center frequency information of a primary 80 MHz channel | Center frequency information of a primary 160 MHz channel | Center frequency information of a secondary 160 MHz channel | Channel Width = 4, CCFS 3 > 0, CCFS 4 > 0, CCFS 5 > 0, |CCFS 4 − CCFS 3| = 8, and |CCFS 5 − CCFS 4| > 32 |

Table 9 shows an example of specific usage of the CCFS 3 and the CCFS 4. Refer to Table 9. For example, when the channel bandwidth is 20 MHz, the value of the Channel Width field is 0, the first channel center frequency information in the CCFS 3 field is used to indicate the center frequency of the first segment, that is, the primary 20 MHz channel, the CCFS 4 field is set to 0, and the CCFS 5 field is set to 0. Specifically, the EHT STA reads the value 0 of the Channel Width field, and may determine that the channel bandwidth of the BSS is 20 MHz. The EHT STA may obtain the center frequency of the primary 20 MHz channel by reading the CCFS 3 field. Specifically, the EHT STA determines the center frequency of the corresponding primary 20 MHz channel by reading the index value in the CCFS 3 field. This content is not repeated in the following embodiment. The channel bandwidth information of the BSS determined by the EHT STA includes the channel bandwidth of 20 MHz and the center frequency of the primary 20 MHz channel.

When the channel bandwidth is 40 MHz, the value of the Channel Width field is 1, the first channel center frequency information in the CCFS 3 field is used to indicate the center frequency of the first segment, that is, the primary 40 MHz channel, the CCFS 4 field is set to 0, and the CCFS 5 field is set to 0. Specifically, the EHT STA reads the value 1 of the Channel Width field, and may determine that the channel bandwidth of the BSS is 40 MHz. The EHT STA may obtain the center frequency of the primary 40 MHz channel by reading the CCFS 3 field. The channel bandwidth information of the BSS determined by the EHT STA includes the channel bandwidth of 40 MHz and the center frequency of the primary 40 MHz channel.

When the channel bandwidth is 80 MHz, the value of the Channel Width field is 2, the first channel center frequency information in the CCFS 3 field is used to indicate the center frequency of the first segment, that is, the primary 80 MHz channel, the CCFS 4 field is set to 0, and the CCFS 5 field is set to 0. Specifically, the EHT STA reads the value 2 of the Channel Width field, and may determine that the channel bandwidth of the BSS is 80 MHz. The EHT STA may obtain the center frequency of the primary 80 MHz channel by reading the CCFS 3 field. The channel bandwidth information of the BSS determined by the EHT STA includes the channel bandwidth of 80 MHz and the center frequency of the primary 80 MHz channel.

When the channel bandwidth is 160 MHz, the value of the Channel Width field is 3, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the primary 160 MHz channel, the CCFS 5 field is set to 0, and |CCFS 3−CCFS 4|=8.

Specifically, the EHT STA reads the value 3 of the Channel Width field, and may determine that the channel bandwidth of the BSS is 160 MHz or 80+80 MHz. The EHT STA may determine, based on |CCFS 3−CCFS 4|=8 by reading the CCFS 3 field and the CCFS 4 field, that the channel bandwidth is 160 MHz, and obtain the center frequency of the primary 80 MHz channel and the center frequency of the 160 MHz channel. The channel bandwidth information of the BSS determined by the EHT STA includes the channel bandwidth of 160 MHz, the center frequency of the primary 80 MHz channel, and the center frequency of the 160 MHz channel.

When the channel bandwidth is 80+80 MHz, the value of the Channel Width field is 3, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the secondary 80 MHz channel, and |CCFS 3−CCFS 4|>16. Specifically, the EHT STA reads the value 3 of the Channel Width field, and may determine that the channel bandwidth of the BSS is 160 MHz or 80+80 MHz. The EHT STA may determine, based on |CCFS 3−CCFS 4|>16 by reading the CCFS 3 field and the CCFS 4 field, that the channel bandwidth is 80+80 MHz, and obtain the center frequency of the primary 80 MHz channel and the center frequency of the secondary 80 MHz channel. The channel bandwidth information of the BSS determined by the EHT STA includes the channel bandwidth of 80+80 MHz, the center frequency of the primary 80 MHz channel, and the center frequency of the secondary 80 MHz channel.

When the channel bandwidth is 320 MHz, the value of the Channel Width field is 4, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the primary 160 MHz channel, the third channel center frequency information in the CCFS 5 field is used to indicate the center frequency of the third segment, that is, the secondary 160 MHz channel, |CCFS 3−CCFS 4|=8, and |CCFS 4−CCFS 5|=16. Specifically, the EHT STA reads the value 4 of the Channel Width field, and may determine that the channel bandwidth of the BSS is 320 MHz or 160+160 MHz. The EHT STA may determine, based on |CCFS 3−CCFS 4|=8 and |CCFS 4−CCFS 5|=16 by reading the CCFS 3 field, the CCFS 4 field, and the CCFS 5 field, that the channel bandwidth is 320 MHz, and obtain the center frequency of the primary 80 MHz channel, the center frequency of the primary 160 MHz channel, and the center frequency of the 320 MHz channel. The channel bandwidth information of the BSS determined by the EHT STA includes the channel bandwidth of 320 MHz, the center frequency of the primary 80 MHz channel, the center frequency of the primary 160 MHz channel, and the center frequency of the 320 MHz channel.

When the channel bandwidth is 160+160 MHz, the value of the Channel Width field is 4, the first channel center frequency information in the CCFS 3 field is used to indicate the center frequency of the first segment, that is, the primary 80 MHz channel, the second channel center frequency information in the CCFS 4 field is used to indicate the center frequency of the second segment, that is, the primary 160 MHz channel, the third channel center frequency information in the CCFS 5 field is used to indicate the center frequency of the third segment, that is, the secondary 160 MHz channel, |CCFS 3−CCFS 4|=8, and |CCFS 4−CCFS 5|>32. Specifically, the EHT STA reads the value 4 of the Channel Width field, and may determine that the channel bandwidth of the BSS is 320 MHz or 160+160 MHz. The EHT STA may determine, based on |CCFS 3−CCFS 4|=8 and |CCFS 4−CCFS 5|>32 by reading the CCFS 3 field, the CCFS 4 field, and the CCFS 5 field, that the channel bandwidth is 160+160 MHz, and obtain the center frequency of the primary 80 MHz channel, the center frequency of the primary 160 MHz channel, and the center frequency of the secondary 160 MHz channel. The channel bandwidth information of the BSS determined by the EHT STA includes the channel bandwidth of 160+160 MHz, the center frequency of the primary 80 MHz channel, the center frequency of the primary 160 MHz channel, and the center frequency of the secondary 160 MHz channel.

In another possible implementation, 80 MHz, 160 MHz, and 80+80 MHz may also be indicated by using a same Chanel Width value. A specific implementation is shown in Table 10.

TABLE 10

| Bandwidth | CCFS 3 | CCFS 4 | CCFS 5 | Judgment rules |
|---|---|---|---|---|
| 20 MHz | Center frequency information of a primary 20 MHz channel | 0 | 0 | Channel Width = 0 |
| 40 MHz | Center frequency information of a primary 40 MHz channel | 0 | 0 | Channel Width = 1 |
| 80 MHz | Center frequency information of a primary 80 MHz channel | 0 | 0 | Channel Width = 2, CCFS 4 = 0, and CCFS 5 = 0 |
| 160 MHz | Center frequency information of a primary 80 MHz channel | Center frequency information of a primary 160 MHz channel | 0 | Channel Width = 2, CCFS 3 > 0, CCFS 4 > 0, CCFS 5 = 0, and |CCFS 4 − CCFS 3| = 8 |
| 80 + 80 MHz | Center frequency information of a primary 80 MHz channel | Center frequency information of a secondary 80 MHz channel | 0 | Channel Width = 2, CCFS 3 > 0, CCFS 4 > 0, CCFS 5 = 0, and |CCFS 4 = CCFS 3| > 16 |

TABLE 10-continued

| Bandwidth | CCFS 3 | CCFS 4 | CCFS 5 | Judgment rules |
|---|---|---|---|---|
| 320 MHz | Center frequency information of a primary 80 MHz channel | Center frequency information of a primary 160 MHz channel | Center frequency information of a 320 MHz channel | Channel Width = 3, CCFS 3 > 0, CCFS 4 > 0, CCFS 5 > 0, |CCFS 4 − CCFS 3| = 8, and |CCFS 5 − CCFS 4| = 16 |
| 160 + 160 MHz | Center frequency information of a primary 80 MHz channel | Center frequency information of a primary 160 MHz channel | Center frequency information of a secondary 160 MHz channel | Channel Width = 3, CCFS 3 > 0, CCFS 4 > 0, CCFS 5 > 0, |CCFS 4 − CCFS 3| = 8, and CCFS 5 − CCFS 4| > 32 |

For related descriptions, refer to Table 9. Details are not described herein again.

(4) Puncture Info Field

For the Puncture Info field and other details, refer to the scenario 1. Details are not described herein again.

In a possible implementation, when the BSS is established in the 5 GHz frequency band, that is, when the EHT STA receives, in the 5 GHz frequency band, the beacon frame carrying the EHT operation element, the EHT STA may further receive the HT operation element in the beacon frame, and may obtain channel information of the primary 20 MHz channel by reading a Primary Channel field (for a related concept, refer to the foregoing description) carried in the HT operation element, for example, identification information of primary 20 MHz, for example, an index number or a channel number of the primary 20 MHz channel. In this way, a specific location of the channel of the BSS on a frequency domain resource is determined with reference to the obtained channel bandwidth information of the BSS.

In another possible implementation, when the BSS is established in the 6 GHz frequency band, that is, when the EHT STA receives, in the 6 GHz frequency band, the management frame carrying the EHT operation element, because the HT operation element is absent from 6 GHz, the EHT STA may receive the HE operation element in the management frame, and may obtain channel information of the primary 20 MHz channel by reading a Primary Channel field (for a related concept, refer to the foregoing description) carried in the HE operation element, for example, identification information of primary 20 MHz, for example, an index number or a channel number of the primary 20 MHz channel. In this way, a specific channel location of the BSS on a frequency domain resource is determined with reference to the obtained channel bandwidth information of the BSS.

In still another possible implementation, if the AP needs to change at least one of a channel bandwidth, a maximum quantity of receivable spatial streams, and an LDPC preference indication of the AP, the AP may add an Operating Mode Notification Element (for a related concept, refer to the foregoing description) to the beacon frame. The EHT STA may obtain an updated channel bandwidth configuration of the BSS by reading the Operating Mode Notification Element. A specific update manner is described in the following embodiment.

In still another possible implementation, if the channel bandwidth of the BSS is 80+80 MHz, 160+160 MHz, or the like and is formed by bonding two non-contiguous channels, optionally, the two channels may be located in different frequency bands. For example, one channel is located in the 5 GHz frequency band, and the other channel is located in the 6 GHz frequency band. In this embodiment, a reserved field in the Control field may include indication information, for example, Operation Class Present (OCP), used to indicate whether the EHT operation element carries an Operation Class field, or understandably, used to indicate whether the two channels are located in different frequency bands. For example, when OCP=1, it indicates that the EHT operation element carries the Operation Class field, that is, the two channels are located in different frequency bands, and the corresponding Operation Class field may include frequency band indication information used to indicate a frequency band in which a secondary 80 MHz channel or a secondary 160 MHz channel is located.

In summary, in this application, STAs of different protocols may obtain the channel bandwidth information of the BSS by reading operation elements of corresponding protocols. For example, the VHT STA may obtain the channel bandwidth information of the BSS by reading the VHT operation element. The HE STA may obtain the channel bandwidth information of the BSS by reading the VHT/HE operation element. The EHT STA may ignore the VHT operation element, and may obtain the channel bandwidth information of the BSS by reading only the EHT operation element.

Scenario 5

Figure 25:
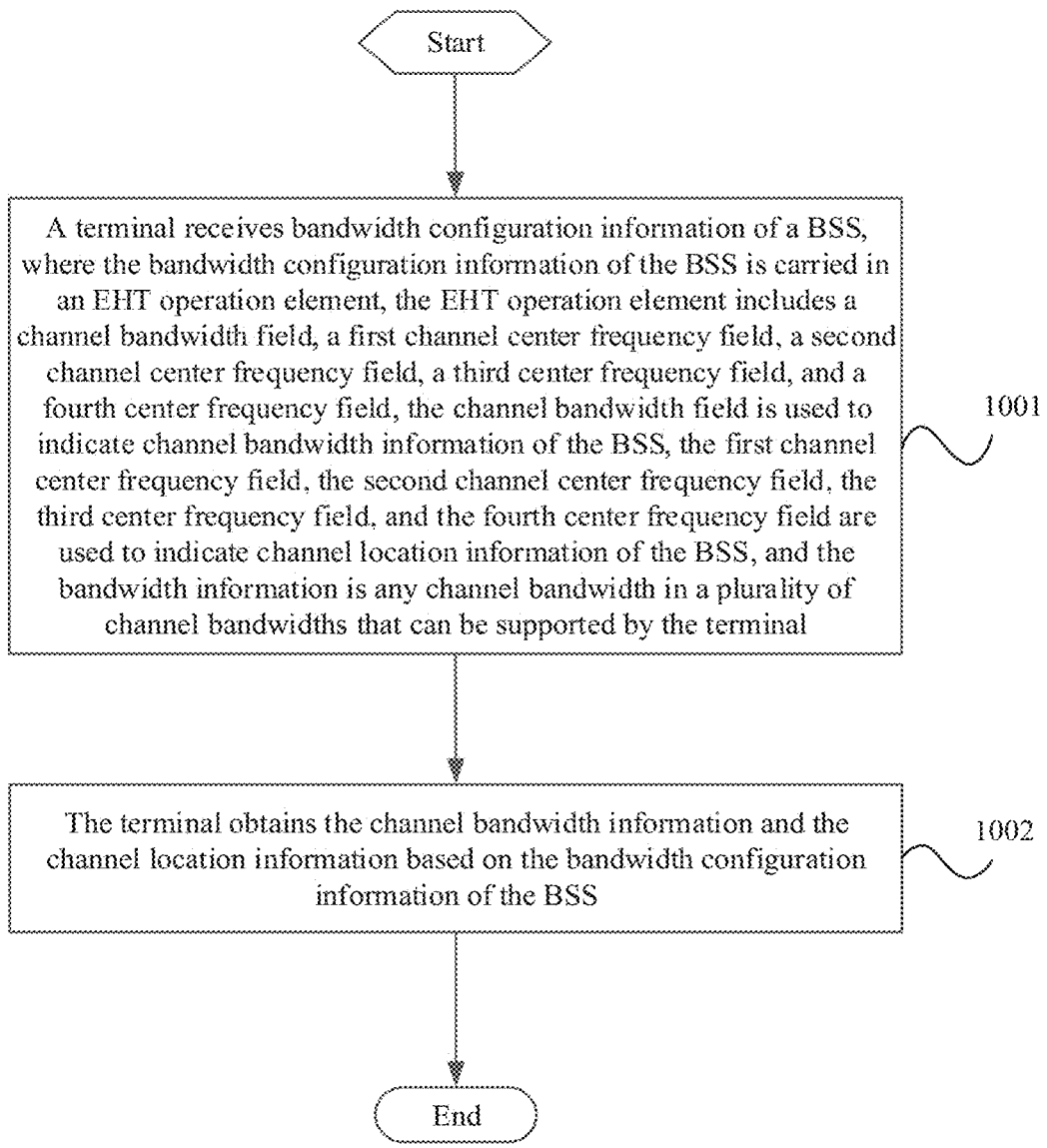
FIG. 25 is a schematic flowchart of a channel bandwidth configuration method according to an embodiment of this application.

With reference to FIG. 5, FIG. 25 is a schematic flowchart of a channel bandwidth configuration method according to an embodiment of this application. In FIG. 25:

Step 1001: A terminal receives bandwidth configuration information of a BSS, where the bandwidth configuration information of the BSS is carried in an EHT operation element, the EHT operation element includes a channel bandwidth field, a first channel center frequency field, a second channel center frequency field, a third center frequency field, and a fourth center frequency field, the channel bandwidth field is used to indicate channel bandwidth information of the BSS, the first channel center frequency field, the second channel center frequency field, the third center frequency field, and the fourth center frequency field are used to indicate channel location information of the BSS, and the bandwidth information is any channel bandwidth in a plurality of channel bandwidths that can be supported by the terminal.

Specifically, an AP sends a beacon frame, where the beacon frame carries an EHT operation element used to indicate an EHT STA to configure the BSS based on the EHT operation element. Optionally, when a primary channel of the AP is in a 5 GHz frequency band, the beacon frame sent by the AP also carries an HT/VHT/HE/EHT operation element. Optionally, when a primary channel of the AP is in a 6 GHz frequency band, the beacon frame sent by the AP also carries an HE/EHT operation element.

In this embodiment, only an example in which the terminal is an EHT STA is used to describe in detail a manner of configuring a channel bandwidth for the EHT STA based on the newly defined EHT operation element.

It should be noted that this application is described only by using an example in which a management frame is a beacon frame. A frame carrying an element such as the EHT operation element may alternatively be another type of management frame. This is not limited in this application.

Step 1002: The terminal obtains the channel bandwidth information and the channel location information based on the bandwidth configuration information of the BSS.

Specifically, after receiving the EHT operation element, the EHT STA may determine the bandwidth configuration information of the BSS by reading information included in each field carried in the EHT operation element. A specific reading manner is described above. Details are not described herein again.

Figure 26:
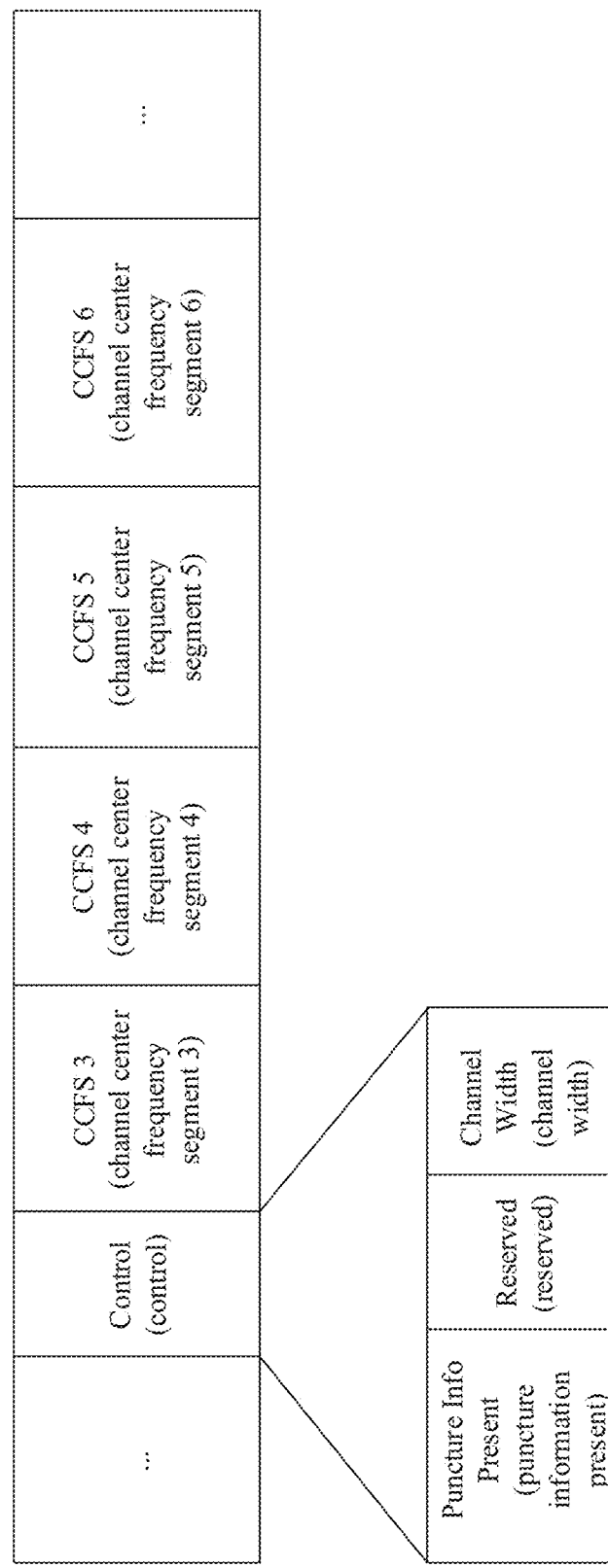
FIG. 26 is an example schematic diagram of a format of an EHT operation element.

Specifically, in this embodiment, a format of the EHT operation element sent by the AP is shown in FIG. 26. Refer to FIG. 26. The EHT operation element includes but is not limited to a Control field, a CCFS 3 field, a CCFS 4 field, a CCFS 5 field, and a CCFS 6 field, and optionally may further include a Puncture Info field.

The following describes indication manners of different fields in FIG. 26 in detail.

(1) Control Field

Specifically, the Control field carries a Puncture Info Present field and a Channel Width field. The Puncture Info Present field is used to indicate whether a Puncture Info field is present, or understandably, used to indicate whether channel puncturing is present in the BSS. For example, a length of the Control field may be 1 byte.

For example, when Puncture Info Present=0, the Puncture Info field is absent. When Puncture Info Present=1, the Puncture Info field is present.

Specifically, the Channel Width field includes the channel bandwidth information of the BSS, used to indicate a channel bandwidth of the BSS.

In an example, when the Channel Width field includes a first preset value, it indicates that the channel bandwidth of the BSS is 20 MHz. In another example, when the Channel Width field includes a second preset value, it indicates that the channel bandwidth of the BSS is 40 MHz. In still another example, when the Channel Width field includes a third preset value, it indicates that the channel bandwidth of the BSS is 80 MHz. In still another example, when the Channel Width field includes a fourth preset value, it indicates that the channel bandwidth of the BSS is 160 MHz or 80+80 MHz. In still another example, when the Channel Width field includes a fifth preset value, it indicates that the channel bandwidth of the BSS is 240 MHz, 160+80 MHz, or 80+160 MHz. In still another example, when the Channel Width field includes a sixth preset value, it indicates that the channel bandwidth of the BSS is 320 MHz or 160+160 MHz. The foregoing preset values are all different.

For example, the value of the Channel Width field and the indicated channel bandwidth are as follows:

Channel Width=0, used to indicate that the channel bandwidth of the BSS is 20 MHz.

Channel Width=1, used to indicate that the channel bandwidth of the BSS is 40 MHz.

Channel Width=2, used to indicate that the channel bandwidth of the BSS is 80 MHz.

Channel Width=3, used to indicate that the channel bandwidth of the BSS is 160 MHz or 80+80 MHz.

Channel Width=4, used to indicate that the channel bandwidth of the BSS is 240 MHz, 160+80 MHz, or 80+160 MHz.

Channel Width=5, used to indicate that the channel bandwidth of the BSS is 320 MHz or 160+160 MHz.

The foregoing is merely an example. In another embodiment, for example, the Channel Width field may not include a value used to indicate a 240 MHz channel. This is not limited in this application.

(2) CCFS 3 Field

Specifically, the CCFS 3 field is the first channel center frequency field in this application, and the field includes first segment center frequency information used to indicate a center frequency of a first segment.

For example, the first segment center frequency information may be an index value corresponding to the center frequency of the segment. For a related concept of the index value, refer to the foregoing description. Details are not described herein again.

(3) CCFS 4 Field

Specifically, the CCFS 4 field is the second channel center frequency field in this application, and the field carries second segment center frequency information used to indicate a center frequency of a second segment. Optionally, when the channel bandwidth is less than 160 MHz or 80+80 MHz, the CCFS 4 field may be set to 0, or may be absent.

For example, the center frequency of the second segment may be an index value corresponding to the center frequency of the segment. For a related concept of the index value, refer to the foregoing description. Details are not described herein again.

(4) CCFS 5 Field

Specifically, the CCFS 5 field is the third channel center frequency field in this application, and the field carries third segment center frequency information used to indicate a center frequency of a third segment. Optionally, when the channel bandwidth is less than 240 MHz, 160+80 MHz, or 80+160 MHz, the CCFS 5 field may be set to 0, or may be absent.

For example, the center frequency of the third segment may be an index value corresponding to the center frequency of the segment. For a related concept of the index value, refer to the foregoing description. Details are not described herein again.

(5) CCFS 6 Field

Specifically, the CCFS 6 field is the fourth channel center frequency field in this application, and the field carries fourth segment center frequency information used to indicate a center frequency of a fourth segment. Optionally, when the channel bandwidth is less than 320 MHz or 160+160 MHz, the CCFS 5 field may be set to 0, or may be absent.

For example, the center frequency of the fourth segment may be an index value corresponding to the center frequency of the segment. For a related concept of the index value, refer to the foregoing description. Details are not described herein again.

Specifically, in this application, when values of Channel Width fields corresponding to two different channel bandwidths are the same, the EHT STA may further read differences between the first channel center frequency information in the CCFS 3 field, the second channel center frequency information in the CCFS 4 field, the third channel center frequency information in the CCFS 5 field, and the fourth channel center frequency information in the CCFS 6 field to determine the channel bandwidth.

Specific manners are as follows:

In an example, when the Channel Width field includes the fourth preset value, for example, a value of 3, and the difference between the first channel center frequency information and the second channel center frequency information is equal to a first preset difference, it indicates that the channel bandwidth of the BSS is 160 MHz. For example, if the difference between the first channel center frequency information and the second channel center frequency information is greater than the first preset difference, it indicates that the channel bandwidth of the BSS is 80+80 MHz. For example, if both the first channel center frequency information and the second channel center frequency information are corresponding index values, the first preset difference may be 16.

In another example, when the Channel Width field includes the fifth preset value, for example, a value of 4, and the difference between the first channel center frequency information and the second channel center frequency information is equal to a second preset difference, and the difference between the second channel center frequency information and the third channel center frequency information is equal to the second preset difference, the channel bandwidth of the BSS is 240 MHz. For example, if all the first channel center frequency information, the second channel center frequency information, and the third channel center frequency information are corresponding index values, the second preset difference may be 16.

In another example, w % ben the Channel Width field includes the fifth preset value, for example, a value of 4, and the difference between the first channel center frequency information and the second channel center frequency information is equal to a third preset difference, and the difference between the second channel center frequency information and the third channel center frequency information is greater than the third preset difference, the channel bandwidth of the BSS is 160+80 MHz. For example, if all the first channel center frequency information, the second channel center frequency information, and the third channel center frequency information are corresponding index values, the third preset difference may be 16.

In another example, when the Channel Width field includes the fifth preset value, for example, a value of 4, and the difference between the first channel center frequency information and the second channel center frequency information is greater than a fourth preset difference, and the difference between the second channel center frequency information and the third channel center frequency information is equal to the fourth preset difference, the channel bandwidth of the BSS is 80+160 MHz. For example, if all the first channel center frequency information, the second channel center frequency information, and the third channel center frequency information are corresponding index values, the fourth preset difference may be 16.

In still another example, when the Channel Width field includes the sixth preset value, for example, a value of 5, and the difference between the first channel center frequency information and the second channel center frequency information, the difference between the second channel center frequency information and the third channel center frequency information, and the difference between the third channel center frequency information and the fourth channel center frequency information are all equal to a fifth preset difference, the channel bandwidth of the BSS is 320 MHz. For example, the fifth preset difference may be 16.

In still another example, when the Channel Width field includes the sixth preset value, for example, a value of 5, and the difference between the first channel center frequency information and the second channel center frequency information, and the difference between the third channel center frequency information and the fourth channel center frequency information are both equal to a sixth preset difference, and the difference between the second channel center frequency information and the third channel center frequency information is greater than the sixth preset difference, the channel bandwidth of the BSS is 160+160 MHz. For example, the sixth preset difference may be 16.

It should be further noted that the center frequency of the first segment described in this application is a center frequency of a first 80 MHz channel or a channel lower than 80 MHz (for a related concept, refer to the foregoing description). The center frequency of the second segment is a center frequency of a secondary 80 MHz channel. The center frequency of the third segment is a center frequency of a third 80 MHz channel. The center frequency of the fourth segment is a center frequency of a fourth 80 MHz channel. The "first 80 MHz channel", the "secondary 80 MHz channel", the "third 80 MHz channel", and the "fourth 80 MHz channel" correspond to values of the center frequencies in sequence. For example, CCFS 0 corresponds to an 80 MHz channel whose center frequency is lowest or a channel lower than 80 MHz, and CCFS 6 corresponds to an 80 MHz channel whose center frequency is highest. The following uses specific examples to describe specific usage of the Channel Width field, the CCFS 3 field, the CCFS 4 field, the CCFS 5 field, and the CCFS 6 field.

TABLE 11

| Bandwidth | CCFS 3 | CCFS 4 | CCFS 5 | CCFS 6 | Judgment rules |
|---|---|---|---|---|---|
| 20 MHz | Center frequency information of a primary 20 MHz channel | 0 or absent | 0 or absent | 0 or absent | Channel Width = 0 |
| 40 MHz | Center frequency information of a primary 40 MHz channel | 0 or absent | 0 or absent | 0 or absent | Channel Width = 1 |

TABLE 11-continued

| Bandwidth | CCFS 3 | CCFS 4 | CCFS 5 | CCFS 6 | Judgment rules |
|---|---|---|---|---|---|
| 80 MHz | Center frequency information of a primary 80 MHz channel | 0 or absent | 0 or absent | 0 or absent | Channel Width = 2 |
| 160 MHz | Center frequency information of a primary 80 MHz channel | Center frequency information of a secondary 80 MHz channel | 0 or absent | 0 or absent | Channel Width = 3, CCFS 3 > 0, CCFS 4 > 0, and \|CCFS 4 = CCFS 3\| = 16 |
| 80 + 80 MHz | Center frequency information of a primary 80 MHz channel | Center frequency information of a secondary 80 MHz channel | 0 or absent | 0 or absent | Channel Width = 3, CCFS 3 > 0, CCFS 4 > 0, and \|CCFS 4 = CCFS 3\| > 16 |
| 240 MHz | Center frequency information of a primary 80 MHz channel | Center frequency information of a secondary 80 MHz channel | Center frequency information of a third 80 MHz channel | 0 or absent | Channel Width = 4, CCFS 0 > 3, CCFS 4 > 0, CCFS 5 > 0, \|CCFS 4 − CCFS 3\| = 16, and \|CCFS 5 − CCFS 4\| = 16 |
| 160 + 80 MHz | Center frequency information of a primary 80 MHz channel | Center frequency information of a secondary 80 MHz channel | Center frequency information of a third 80 MHz channel | 0 or absent | Channel Width = 4, CCFS 3 > 0, CCFS 4 > 0, CCFS 5 > 0, \|CCFS 4 − CCFS 3\| = 16, and \|CCFS 5 − CCFS 4\| > 16 |
| 80 + 160 MHz | Center frequency information of a primary 80 MHz channel | Center frequency information of a secondary 80 MHz channel | Center frequency information of a third 80 MHz channel | 0 or absent | Channel Width = 4, CCFS 3 > 0, CCFS 4 > 0, CCFS 5 > 0, \|CCFS 4 − CCFS 3\| > 16, and \|CCFS 5− CCFS 4\| = 16 |
| 320 MHz | Center frequency information of a primary 80 MHz channel | Center frequency information of a secondary 80 MHz channel | Center frequency information of a third 80 MHz channel | Center frequency information of a fourth 80 MHz channel | Channel Width = 5, CCFS 3 > 0, CCFS 4 > 0, CCFS 5 > 0, CCFS 6 > 0, \|CCFS 4 − CCFS 3\| = 16, \|CCFS 5 − CCFS 4\| = 16, and \|CCFS 6 − CCFS 5\| = 16 |
| 160 + 160 MHz | Center frequency information of a primary 80 MHz channel | Center frequency information of a secondary 80 MHz channel | Center frequency information of a third 80 MHz channel | Center frequency information of a fourth 80 MHz channel | Channel Width = 5, CCFS 3 > 0, CCFS 4 > 0, CCFS 5 > 0, CCFS 6 > 0, \|CCFS 4 − CCFS 3\| = 16, \|CCFS 5 − CCFS 4\| > 16, and \|CCFS 6 − CCFS 5\| = 16 |

Refer to Table 11. For example, when the channel bandwidth is 20 MHz, the value of the Channel Width field is 0, the first channel center frequency information in the CCFS 3 field is used to indicate the center frequency of the first segment, that is, the primary 20 MHz channel, the CCFS 4 field is set to 0 or is absent, the CCFS 5 field is set to 0 or is absent, and the CCFS 6 field is set to 0 or is absent. Specifically, the EHT STA reads the value 0 of the Channel Width field, and may determine that the channel bandwidth of the BSS is 20 MHz. The EHT STA may obtain the center frequency of the primary 20 MHz channel by reading the CCFS 3 field. Specifically, the EHT STA determines the center frequency of the corresponding primary 20 MHz channel by reading the index value in the CCFS 3 field. This content is not repeated in the following embodiment. The channel bandwidth information of the BSS determined by the EHT STA includes the channel bandwidth of 20 MHz and the center frequency of the primary 20 MHz channel.

When the channel bandwidth is 40 MHz, the value of the Channel Width field is 1, the first channel center frequency information in the CCFS 3 field is used to indicate the center frequency of the first segment, that is, the primary 40 MHz channel, the CCFS 4 field is set to 0 or is absent, the CCFS 5 field is set to 0 or is absent, and the CCFS 6 field is set to 0 or is absent. Specifically, the EHT STA reads the value 1 of the Channel Width field, and may determine that the channel bandwidth of the BSS is 40 MHz. The EHT STA may obtain the center frequency of the primary 40 MHz channel by reading the CCFS 3 field. The channel bandwidth information of the BSS determined by the EHT STA includes the channel bandwidth of 40 MHz and the center frequency of the primary 40 MHz channel.

When the channel bandwidth is 80 MHz, the value of the Channel Width field is 2, the first channel center frequency information in the CCFS 3 field is used to indicate the center frequency of the first 80 MHz segment, the CCFS 4 field is set to 0 or is absent, the CCFS 5 field is set to 0 or is absent, and the CCFS 6 field is set to 0 or is absent. Specifically, the EHT STA reads the value 2 of the Channel Width field, and may determine that the channel bandwidth of the BSS is 80 MHz. The EHT STA may obtain the center frequency of the primary 80 MHz channel by reading the CCFS 3 field. The channel bandwidth information of the BSS determined by the EHT STA includes the channel bandwidth of 80 MHz and the center frequency of the primary 80 MHz channel.

When the channel bandwidth is 160 MHz, the value of the Channel Width field is 3, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the CCFS 5 field is set to 0 or is absent, the CCFS 6 field is set to 0 or is absent, and |CCFS 3−CCFS 4|=16. Specifically, the EHT STA reads the value 3 of the Channel Width field, and may determine that the channel bandwidth of the BSS is 160 MHz or 80+80 MHz. The EHT STA may determine, based on |CCFS 3−CCFS 4|=8 by reading the CCFS 3 field and the CCFS 4 field, that the channel bandwidth is 160 MHz, and obtain the center frequency of the first 80 MHz channel and the center frequency of the secondary 80 MHz channel. The channel bandwidth information of the BSS determined by the EHT STA includes the channel bandwidth of 160 MHz, the center frequency of the first 80 MHz channel, and the center frequency of the second 160 MHz channel.

When the channel bandwidth is 80+80 MHz, the value of the Channel Width field is 3, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the CCFS 5 field is set to 0 or is absent, the CCFS 6 field is set to 0 or is absent, and |CCFS 3−CCFS 4|>16. Specifically, the EHT STA reads the value 3 of the Channel Width field, and may determine that the channel bandwidth of the BSS is 160 MHz or 80+80 MHz. The EHT STA may determine, based on |CCFS 3−CCFS 4|>16 by reading the CCFS 3 field and the CCFS 4 field, that the channel bandwidth is 80+80 MHz, and obtain the center frequency of the first 80 MHz channel and the center frequency of the secondary 80 MHz channel. The channel bandwidth information of the BSS determined by the EHT STA includes the channel bandwidth of 80+80 MHz, the center frequency of the first 80 MHz channel, and the center frequency of the secondary 80 MHz channel.

When the channel bandwidth is 240 MHz, the value of the Channel Width field is 4, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the third channel center frequency information in the CCFS 5 field is used to indicate the center frequency of the third segment, that is, the third 80 MHz channel, the CCFS 6 field is set to 0 or is absent, |CCFS 4−CCFS 3|=16, and |CCFS 5−CCFS 4|=16. Specifically, the EHT STA reads the value 4 of the Channel Width field, and may determine that the channel bandwidth of the BSS is 240 MHz, 160+80 MHz, or 80+160 MHz. The EHT STA may determine, based on |CCFS 4−CCFS 3|=16 and |CCFS 5−CCFS 4|=16 by reading the CCFS 3 field, the CCFS 4 field, and the CCFS 5 field, that the channel bandwidth is 240 MHz, and obtain the center frequency of the first 80 MHz channel, the center frequency of the secondary 80 MHz channel, and the center frequency of the third 80 MHz channel. The channel bandwidth information of the BSS determined by the EHT STA includes the channel bandwidth of 240 MHz, the center frequency of the first 80 MHz channel, the center frequency of the secondary 80 MHz channel, and the center frequency of the third 80 MHz channel.

When the channel bandwidth is 160+80 MHz, the value of the Channel Width field is 4, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the third channel center frequency information in the CCFS 5 field is used to indicate the center frequency of the third segment, that is, the third 80 MHz channel, the CCFS 6 field is set to 0 or is absent, |CCFS 4−CCFS 3|=16, and |CCFS 5−CCFS 4|>16. Specifically, the EHT STA reads the value 4 of the Channel Width field, and may determine that the channel bandwidth of the BSS is 240 MHz, 160+80 MHz, or 80+160 MHz. The EHT STA may determine, based on |CCFS 4−CCFS 3|=16 and |CCFS 5−CCFS 4|>16 by reading the CCFS 3 field, the CCFS 4 field, and the CCFS 5 field, that the channel bandwidth is 160+80 MHz, and obtain the center frequency of the first 80 MHz channel, the center frequency of the secondary 80 MHz channel, and the center frequency of the third 80 MHz channel. The channel bandwidth information of the BSS determined by the EHT STA includes the channel bandwidth of 160+80 MHz, the center frequency of the first 80 MHz channel, the center frequency of the secondary 80 MHz channel, and the center frequency of the third 80 MHz channel.

When the channel bandwidth is 80+160 MHz, the value of the Channel Width field is 4, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the third channel center frequency information in the CCFS 5 field is used to indicate the center frequency of the third segment, that is, the third 80 MHz channel, the CCFS 6 field is set to 0 or is absent, |CCFS 4−CCFS 3|>16, and |CCFS 5−CCFS 4|=16. Specifically, the EHT STA reads the value 4 of the Channel Width field, and may determine that the channel bandwidth of the BSS is 240 MHz, 160+80 MHz, or 80+160 MHz. The EHT STA may determine, based on |CCFS 4−CCFS 3|>16 and |CCFS 5−CCFS 4|=16 by reading the CCFS 3 field, the CCFS 4 field, and the CCFS 5 field, that the channel bandwidth is 80+160 MHz, and obtain the center frequency of the first 80 MHz channel, the center frequency of the secondary 80 MHz channel, and the center frequency of the third 80 MHz channel. The channel bandwidth information of the BSS determined by the EHT STA includes the channel bandwidth of 80+160 MHz, the center frequency of the first 80 MHz channel, the center frequency of the secondary 80 MHz channel, and the center frequency of the third 80 MHz channel.

When the channel bandwidth is 320 MHz, the value of the Channel Width field is 5, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the third channel center frequency information in the CCFS 5 field is used to indicate the center frequency of the third segment, that is, the third 80 MHz channel, the fourth channel center frequency information in the CCFS 6 field is used to indicate the center frequency of the fourth segment, that is, the fourth 80 MHz channel, |CCFS 4−CCFS 3|=16, |CCFS 5−CCFS 4|=16, and |CCFS 6−CCFS 5|=16. Specifically, the EHT STA reads the value 5 of the Channel Width field, and may determine that the channel bandwidth of the BSS is 320 MHz or 160+160 MHz. The EHT STA may determine, based on |CCFS 4−CCFS 3|=16, |CCFS 5−CCFS 4|=16, and |CCFS 6−CCFS 5|=16 by reading the CCFS 3 field, the CCFS 4 field, the CCFS 5 field, and the CCFS 6 field, that the channel bandwidth is 320 MHz, and obtain the center frequency of the first 80 MHz channel, the center frequency of the secondary 80 MHz channel, the center frequency of the third 80 MHz channel, and the center frequency of the fourth 80 MHz channel. The channel bandwidth information of the BSS determined by the EHT STA includes the channel bandwidth of 320 MHz, the center frequency of the first 80 MHz channel, the center frequency of the secondary 80 MHz channel, the center frequency of the third 80 MHz channel, and the center frequency of the fourth 80 MHz channel.

When the channel bandwidth is 160+160 MHz, the value of the Channel Width field is 5, the first channel center frequency information in the CCFS 3 field is used to indicate the center frequency of the first 80 MHz segment, the second channel center frequency information in the CCFS 4 field is used to indicate the center frequency of the second segment, that is, the secondary 80 MHz channel, the third channel center frequency information in the CCFS 5 field is used to indicate the center frequency of the third segment, that is, the third 80 MHz channel, the fourth channel center frequency information in the CCFS 6 field is used to indicate the center frequency of the fourth segment, that is, the fourth 80 MHz channel, |CCFS 4−CCFS 3|=16. |CCFS 5−CCFS 4|>16, and |CCFS 6−CCFS 5|=16. Specifically, the EHT STA reads the value 5 of the Channel Width field, and may determine that the channel bandwidth of the BSS is 320 MHz or 160+160 MHz. The EHT STA may determine, based on |CCFS 4−CCFS 3|=16, |CCFS 5−CCFS 4|>16, and |CCFS 6−CCFS 5|=16 by reading the CCFS 3 field, the CCFS 4 field, the CCFS 5 field, and the CCFS 6 field, that the channel bandwidth is 160+160 MHz, and obtain the center frequency of the first 80 MHz channel, the center frequency of the secondary 80 MHz channel, the center frequency of the third 80 MHz channel, and the center frequency of the fourth 80 MHz channel. The channel bandwidth information of the BSS determined by the EHT STA includes the channel bandwidth of 160+160 MHz, the center frequency of the first 80 MHz channel, the center frequency of the secondary 80 MHz channel, the center frequency of the third 80 MHz channel, and the center frequency of the fourth 80 MHz channel.

(4) Puncture Info Field

For the Puncture Info field and other details, refer to the scenario 1. Details are not described herein again.

In a possible implementation, when the BSS is established in the 5 GHz frequency band, that is, when the EHT STA receives, in the 5 GHz frequency band, the beacon frame carrying the EHT operation element, the EHT STA may further receive the HT operation element in the beacon frame, and may obtain channel information of the primary 20 MHz channel by reading a Primary Channel field (for a related concept, refer to the foregoing description) carried in the HT operation element, for example, identification information of primary 20 MHz, for example, an index number or a channel number of the primary 20 MHz channel. In this way, a specific location of the channel of the BSS on a frequency domain resource is determined with reference to the obtained channel bandwidth information of the BSS.

In another possible implementation, when the BSS is established in the 6 GHz frequency band, that is, when the EHT STA receives, in the 6 GHz frequency band, the management frame carrying the EHT operation element, because the HT operation element is absent from 6 GHz, the EHT STA may receive the HE operation element in the management frame, and may obtain channel information of the primary 20 MHz channel by reading a Primary Channel field (for a related concept, refer to the foregoing description) carried in the HE operation element, for example, identification information of primary 20 MHz, for example, an index number or a channel number of the primary 20 MHz channel. In this way, a specific location of the channel of the BSS on a frequency domain resource is determined with reference to the obtained channel bandwidth information of the BSS.

In still another possible implementation, if the AP needs to change at least one of a channel bandwidth, a maximum quantity of receivable spatial streams, and an LDPC preference indication of the AP, the AP may add an Operating Mode Notification Element (for a related concept, refer to the foregoing description) to the beacon frame. The EHT STA may obtain an updated channel bandwidth configuration of the BSS by reading the Operating Mode Notification Element. A specific update manner is described in the following embodiment.

In still another possible implementation, if the channel bandwidth of the BSS is 80+80 MHz, 160+160 MHz, or the like and is formed by bonding two non-contiguous channels, optionally, the two channels may be located in different frequency bands. For example, one channel is located in the 5 GHz frequency band, and the other channel is located in the 6 GHz frequency band. In this embodiment, a reserved field in the Control field may include indication information, for example, operating class present (Operation Class Present), used to indicate whether the EHT operation element carries an Operation Class field, or understandably, used to indicate whether the two channels are located in different frequency bands. For example, when OCP=1, it indicates that the EHT operation element carries the Operation Class field, that is, the two channels are located in different frequency bands, and the corresponding Operation Class field may include frequency band indication information used to indicate a frequency band in which a primary 80 MHz channel or a secondary 160 MHz channel is located.

In summary, in this application, STAs of different protocols may obtain the channel bandwidth information of the BSS by reading operation elements of corresponding protocols. For example, the VHT STA may obtain the channel bandwidth information of the BSS by reading the VHT operation element. The HE STA may obtain the channel bandwidth information of the BSS by reading the HE operation element. The EHT STA may ignore the VHT operation element, and may obtain the channel bandwidth information of the BSS by reading only the EHT operation element.

The foregoing mainly describes the solutions provided in the embodiments of this application from a perspective of interaction between network elements. It may be understood that, to implement the foregoing functions, the terminal includes corresponding hardware structures and/or software modules for performing the functions. A person skilled in the art should be easily aware that, in combination with units and algorithm steps of the examples described in the embodiments disclosed in this specification, the embodiments of this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the terminal may be divided into functional modules based on the foregoing method examples. For example, each functional module is obtained through division based on a corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division in actual implementation.

Figure 27:
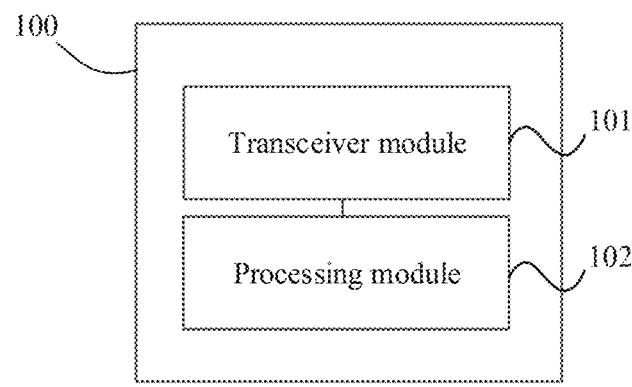
FIG. 27 is a schematic diagram of a structure of a terminal according to an embodiment of this application.

When each functional module is obtained through division based on a corresponding function, FIG. 27 is a possible schematic diagram of a structure of a terminal 100 related to the foregoing embodiments. As shown in FIG. 27, the terminal 100 may include a transceiver module 101 and a processing module 102.

In a possible implementation, the transceiver module 101 is configured to receive bandwidth configuration information of a basic service set (BSS), where the bandwidth configuration information of the BSS is carried in an extremely high throughput operation element, the extremely high throughput operation element includes a channel bandwidth field, a first channel center frequency field, and a second channel center frequency field, the channel bandwidth field is used to indicate channel bandwidth information of the BSS, the first channel center frequency field and the second channel center frequency field are used to indicate channel location information of the BSS, and the bandwidth information is any channel bandwidth in a plurality of channel bandwidths that can be supported by the terminal; and the processing module 102 is configured to obtain the channel bandwidth information and the channel location information based on the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a first preset bit value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 101 is configured to receive a high throughput operation element, where the high throughput operation element includes a primary channel field, and primary channel information is carried in the primary channel field.

On a basis of the foregoing technical solution, the transceiver module 101 is configured to receive a high efficiency operation element, where the high efficiency operation element includes a primary channel field, and primary channel information is carried in the primary channel field.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, the second channel center frequency field includes second channel center frequency information, and the second channel center frequency information is zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes third channel center frequency information used to indicate a center frequency of a first segment of the BSS, and the second channel center frequency field includes fourth channel center frequency information used to indicate a center frequency of a second segment of the BSS, where the fourth preset value is used to indicate that the channel bandwidth of the BSS is 160 MHz or 80+80 MHz; and if a difference between the third channel center frequency information and the fourth channel center frequency information is equal to a first preset difference, the channel bandwidth of the BSS is 160 MHz, or if a difference between the third channel center frequency information and the fourth channel center frequency information is greater than a second preset difference, the channel bandwidth of the BSS is 80+80 MHz.

On a basis of the foregoing technical solution, the channel bandwidth field indicates a fifth preset value, the first channel center frequency field includes fifth channel center frequency information used to indicate a center frequency of a first segment of the BSS, and the second channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fifth channel center frequency information and the sixth channel center frequency information is equal to a third preset difference, the channel bandwidth of the BSS is 320 MHz; or if a difference between the third channel center frequency information and the fourth channel center frequency information is greater than a fourth preset difference, the channel bandwidth of the BSS is 160+160 MHz.

In another possible implementation, with reference to FIG. 27, the transceiver module 101 is configured to receive bandwidth configuration information of a BSS, where the bandwidth configuration information of the BSS is carried in an extremely high throughput operation element, the extremely high throughput operation element includes a channel bandwidth field and a center frequency field, the channel bandwidth field is used to indicate channel bandwidth information of the BSS, the center frequency field is used to indicate location information of the BSS, and the bandwidth information is any channel bandwidth in a plurality of channel bandwidths that can be supported by the terminal, and the processing module 102 is configured to obtain the channel bandwidth information and the location information based on the bandwidth configuration information of the BSS.

On a basis of the foregoing technical solution, the center frequency field includes a first channel center frequency field, where the first channel center frequency field includes first channel center frequency information used to indicate a center frequency of a channel bandwidth of the BSS.

On a basis of the foregoing technical solution, the center frequency field includes a second channel center frequency field and a third channel center frequency field, where the second channel center frequency field includes second channel center frequency information used to indicate a center frequency of a first segment of the BSS, and the third channel center frequency field includes third channel center frequency information used to indicate a center frequency of a second segment of the BSS.

On a basis of the foregoing technical solution, the channel bandwidth field indicates any one of a first preset value, a second preset value, a third preset value, a fourth preset value, a fifth preset value, and a sixth preset value, where the first preset value is used to indicate that the channel bandwidth of the BSS is 20 MHz, the second preset value is used to indicate that the channel bandwidth of the BSS is 40 MHz, the third preset value is used to indicate that the channel bandwidth of the BSS is 80 MHz, the fourth preset value is used to indicate that the channel bandwidth of the BSS is 160 MHz, the fifth preset value is used to indicate that the channel bandwidth of the BSS is 240 MHz, and the sixth preset value is used to indicate that the channel bandwidth of the BSS is 320 MHz.

On a basis of the foregoing technical solution, the channel bandwidth field indicates any one of a seventh preset value, an eighth preset value, a ninth preset value, and a tenth preset value, where the seventh preset value is used to indicate that the channel bandwidth of the BSS is 80+80 MHz, the eighth preset value is used to indicate that the channel bandwidth of the BSS is 160+80 MHz, the ninth preset value is used to indicate that the channel bandwidth of the BSS is 80+160 MHz, and the tenth preset value is used to indicate that the channel bandwidth of the BSS is 160+160 MHz.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 101 is configured to receive a high throughput operation element, where the high throughput operation element includes a primary channel field, and identification information of a primary channel is carried in the primary channel field.

On a basis of the foregoing technical solution, the transceiver module 101 is configured to receive a high efficiency operation element, where the high efficiency operation element includes a primary channel field, and identification information of a primary channel is carried in the primary channel field.

In another possible implementation, with reference to FIG. 27, the transceiver module 101 is configured to receive bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, and a third center frequency field, the channel bandwidth field is used to indicate channel bandwidth information of the BSS, the first channel center frequency field, the second channel center frequency field, and the third channel center frequency field are used to indicate location information of the BSS, and the bandwidth information is any channel bandwidth in a plurality of channel bandwidths that can be supported by the terminal; and the processing module 102 is configured to obtain the channel bandwidth information and the location information based on the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 101 is configured to receive a high throughput operation element, where the high throughput operation element includes a primary channel field, and identification information of a primary channel is carried in the primary channel field.

On a basis of the foregoing technical solution, the transceiver module 101 is configured to receive a high efficiency operation element, where the high efficiency operation element includes a primary channel field, and identification information of a primary channel is carried in the primary channel field.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, and the second channel center frequency field and the third channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field is set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a second preset difference, the channel bandwidth of the BSS is 80+80 MHz.

On a basis of the foregoing technical solution, the channel bandwidth field indicates a fifth preset value, the first channel center frequency field includes fourth channel center frequency information, the second channel center frequency field includes fifth channel center frequency information, the first channel center frequency field and the second channel center frequency field are used to indicate a center frequency of a first segment of the BSS, and the third channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fourth channel center frequency information and the fifth channel center frequency information is equal to a third preset difference, and a difference between the fifth channel center frequency information and the sixth channel center frequency information is equal to a fourth preset difference, the channel bandwidth of the BSS is 320 MHz; or if a difference between the fourth channel center frequency information and the fifth channel center frequency information is equal to a fifth preset value, and a difference between the fifth channel center frequency information and the sixth channel center frequency information is greater than a sixth preset difference, the channel bandwidth of the BSS is 160+160 MHz.

In another possible implementation, with reference to FIG. 27, the transceiver module 101 is configured to receive bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, a third center frequency field, and a fourth center frequency field, the channel bandwidth field is used to indicate channel bandwidth information of the BSS, the first channel center frequency field, the second channel center frequency field, the third center frequency field, and the fourth center frequency field are used to indicate location information of the BSS, and the bandwidth information is any channel bandwidth in a plurality of channel bandwidths that can be supported by the terminal; and the processing module 102 is configured to obtain the channel bandwidth information and the location information based on the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 101 is configured to receive a high throughput operation element, where the high throughput operation element includes a primary channel field, and identification information of a primary channel is carried in the primary channel field.

On a basis of the foregoing technical solution, the transceiver module 101 is configured to receive a high efficiency operation element, where the high efficiency operation element includes a primary channel field, and identification information of a primary channel is carried in the primary channel field.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, and the second channel center frequency field, the third channel center frequency field, and the fourth channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field and the fourth channel center frequency field are set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a first preset difference, the channel bandwidth of the BSS is 80+80 MHz.

On a basis of the foregoing technical solution, the channel bandwidth field indicates a fifth preset value, the first channel center frequency field includes fourth channel center frequency information used to indicate a center frequency of a first segment of the BSS, the second channel center frequency field includes fifth channel center frequency information used to indicate a center frequency of a second segment of the BSS, the third channel center frequency field includes sixth channel center frequency information used to indicate a center frequency of a third segment of the BSS, and the fourth channel center frequency field is set to zero, where the fifth preset value is used to indicate that the channel bandwidth of the BSS is 240 MHz, 160+80 MHz, or 80+160 MHz; and if a difference between the fourth channel center frequency information and the fifth channel center frequency information is equal to a second preset difference, and a difference between the fifth channel center frequency information and the sixth channel center frequency information is equal to the second preset difference, the channel bandwidth of the BSS is 240 MHz; if a difference between the fourth channel center frequency information and the fifth channel center frequency information is equal to a third preset difference, and a difference between the fifth channel center frequency information and the sixth channel center frequency information is greater than the third preset difference, the channel bandwidth of the BSS is 160+80 MHz; or if a difference between the fourth channel center frequency information and the fifth channel center frequency information is greater than a fourth preset difference, and a difference between the fifth channel center frequency information and the sixth channel center frequency information is equal to the fourth preset difference, the channel bandwidth of the BSS is 80+160 MHz.

On a basis of the foregoing technical solution, the channel bandwidth field indicates a sixth preset value, the first channel center frequency field includes seventh channel center frequency information used to indicate a center frequency of a first segment of the BSS, the second channel center frequency field includes eighth channel center frequency information used to indicate a center frequency of a second segment of the BSS, the third channel center frequency field includes ninth channel center frequency information used to indicate a center frequency of a third segment of the BSS, and the fourth channel center frequency field includes tenth channel center frequency information used to indicate a center frequency of a fourth segment of the BSS, where the sixth preset value is used to indicate that the channel bandwidth of the BSS is 320 MHz or 160+160 MHz; and if a difference between the seventh channel center frequency information and the eighth channel center frequency information, a difference between the eighth channel center frequency information and the ninth channel center frequency information, and a difference between the ninth channel center frequency information and the tenth channel center frequency information are all equal to a fifth preset difference, the channel bandwidth of the BSS is 320 MHz; or if a difference between the seventh channel center frequency information and the eighth channel center frequency information and a difference between the seventh channel center frequency information and the tenth channel center frequency information are both equal to a sixth preset difference, and a difference between the eighth channel center frequency information and the ninth channel center frequency information is greater than the sixth preset difference, the channel bandwidth of the BSS is 160+160 MHz.

Figure 28:
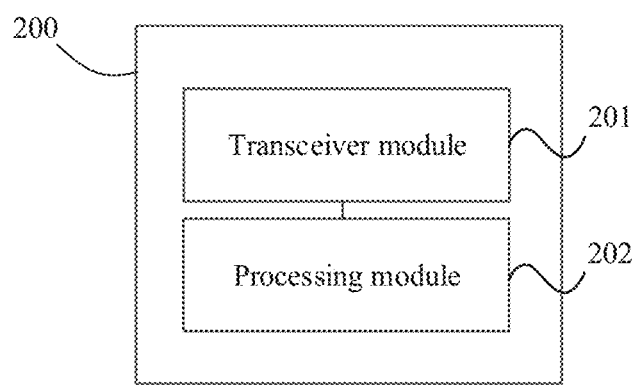
FIG. 28 is a schematic diagram of a structure of a network device according to an embodiment of this application.

FIG. 28 is a possible schematic diagram of a structure of a network device 200 used in the foregoing embodiments. As shown in FIG. 28, the network device 200 may include a transceiver module 201 and a processing module 202.

In a possible implementation, the transceiver module 201 is configured to generate bandwidth configuration information of a BSS, where the bandwidth configuration information of the BSS is carried in an extremely high throughput operation element, the extremely high throughput operation element includes a channel bandwidth field, a first channel center frequency field, and a second channel center frequency field, the channel bandwidth field is used to indicate channel bandwidth information of the BSS, the first channel center frequency field and the second channel center frequency field are used to indicate channel location information of the BSS, and the bandwidth information is any channel bandwidth in a plurality of channel bandwidths that can be supported by a terminal; and the processing module 202 is configured to send the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a first preset bit value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 201 is configured to send a high throughput operation element, where the high throughput operation element carries primary channel information of the BSS.

On a basis of the foregoing technical solution, the transceiver module 201 is configured to send a high efficiency operation element, where the high efficiency operation element carries primary channel information of the BSS.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, the second channel center frequency field includes second channel center frequency information, and the second channel center frequency information is zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes third channel center frequency information used to indicate a center frequency of a first segment of the BSS, and the second channel center frequency field includes fourth channel center frequency information used to indicate a center frequency of a second segment of the BSS, where the fourth preset value is used to indicate that the channel bandwidth of the BSS is 160 MHz or 80+80 MHz; and if a difference between the third channel center frequency information and the fourth channel center frequency information is equal to a first preset difference, the channel bandwidth of the BSS is 160 MHz; or if a difference between the third channel center frequency information and the fourth channel center frequency information is greater than a second preset difference, the channel bandwidth of the BSS is 80+80 MHz.

On a basis of the foregoing technical solution, the channel bandwidth field indicates a fifth preset value, the first channel center frequency field includes fifth channel center frequency information used to indicate a center frequency of a first segment of the BSS, and the second channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fifth channel center frequency information and the sixth channel center frequency information is equal to a third preset difference, the channel bandwidth of the BSS is 320 MHz; or if a difference between the third channel center frequency information and the fourth channel center frequency information is greater than a fourth preset difference, the channel bandwidth of the BSS is 160+160 MHz.

In another possible implementation, with reference to FIG. 28, the processing module 201 is configured to generate bandwidth configuration information of a BSS, where the bandwidth configuration information of the BSS is carried in an extremely high throughput operation element, the extremely high throughput operation element includes a channel bandwidth field and a center frequency field, the channel bandwidth field is used to indicate channel bandwidth information of the BSS, the center frequency field is used to indicate location information of the BSS, and the bandwidth information is any channel bandwidth in a plurality of channel bandwidths that can be supported by a terminal; and the processing module 202 is configured to send the bandwidth configuration information of the BSS.

On a basis of the foregoing technical solution, the center frequency field includes a first channel center frequency field, where the first channel center frequency field includes first channel center frequency information used to indicate a center frequency of a channel bandwidth of the BSS.

On a basis of the foregoing technical solution, the center frequency field includes a second channel center frequency field and a third channel center frequency field, where the second channel center frequency field includes second channel center frequency information used to indicate a center frequency of a first segment of the BSS, and the third channel center frequency field includes third channel center frequency information used to indicate a center frequency of a second segment of the BSS.

On a basis of the foregoing technical solution, the channel bandwidth field indicates any one of a first preset value, a second preset value, a third preset value, a fourth preset value, a fifth preset value, and a sixth preset value, where the first preset value is used to indicate that the channel bandwidth of the BSS is 20 MHz, the second preset value is used to indicate that the channel bandwidth of the BSS is 40 MHz, the third preset value is used to indicate that the channel bandwidth of the BSS is 80 MHz, the fourth preset value is used to indicate that the channel bandwidth of the BSS is 160 MHz, the fifth preset value is used to indicate that the channel bandwidth of the BSS is 240 MHz, and the sixth preset value is used to indicate that the channel bandwidth of the BSS is 320 MHz.

On a basis of the foregoing technical solution, the channel bandwidth field indicates any one of a seventh preset value, an eighth preset value, a ninth preset value, and a tenth preset value, where the seventh preset value is used to indicate that the channel bandwidth of the BSS is 80+80 MHz, the eighth preset value is used to indicate that the channel bandwidth of the BSS is 160+80 MHz, the ninth preset value is used to indicate that the channel bandwidth of the BSS is 80+160 MHz, and the tenth preset value is used to indicate that the channel bandwidth of the BSS is 160+160 MHz.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in the channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 201 is configured to send a high throughput operation element, where the high throughput operation element carries primary channel information of the BSS.

On a basis of the foregoing technical solution, the transceiver module 201 is configured to send a high efficiency operation element, where the high efficiency operation element carries primary channel information of the BSS.

In another possible implementation, with reference to FIG. 28, the transceiver module 201 is configured to generate bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, and a third center frequency field, the channel bandwidth field is used to indicate channel bandwidth information of the BSS, the first channel center frequency field, the second channel center frequency field, and the third channel center frequency field are used to indicate location information of the BSS, and the bandwidth information is any channel bandwidth in a plurality of channel bandwidths that can be supported by a terminal; and the processing module 202 is configured to send the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit; the bit one-to-one corresponds to a channel element in a channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 201 is configured to send a high throughput operation element, where the high throughput operation element includes a primary channel field, and identification information of a primary channel is carried in the primary channel field.

On a basis of the foregoing technical solution, the transceiver module 201 is configured to send a high efficiency operation element, where the high efficiency operation element includes a primary channel field, and identification information of a primary channel is carried in the primary channel field.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, and the second channel center frequency field and the third channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field is set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a second preset difference, the channel bandwidth of the BSS is 80+80 MHz.

On a basis of the foregoing technical solution, the channel bandwidth field indicates a fifth preset value, the first channel center frequency field includes fourth channel center frequency information, the second channel center frequency field includes fifth channel center frequency information, the first channel center frequency field and the second channel center frequency field are used to indicate a center frequency of a first segment of the BSS, and the third channel center frequency field includes sixth channel center frequency information used to indicate a center frequency of a second segment of the BSS, where the fifth preset value is used to indicate that the channel bandwidth of the BSS is 320 MHz or 160+160 MHz; and if a difference between the fourth channel center frequency information and the fifth channel center frequency information is equal to a third preset difference, and a difference between the fifth channel center frequency information and the sixth channel center frequency information is equal to a fourth preset difference, the channel bandwidth of the BSS is 320 MHz; or if a difference between the fourth channel center frequency information and the fifth channel center frequency information is equal to a fifth preset value, and a difference between the fifth channel center frequency information and the sixth channel center frequency information is greater than a sixth preset difference, the channel bandwidth of the BSS is 160+160 MHz.

In another possible implementation, with reference to FIG. 28, the transceiver module 201 is configured to generate bandwidth configuration information of a BSS, where the bandwidth configuration information of the BSS is carried in an extremely high throughput operation element, the extremely high throughput operation element includes a channel bandwidth field, a first channel center frequency field, a second channel center frequency field, a third center frequency field, and a fourth center frequency field, the channel bandwidth field is used to indicate channel bandwidth information of the BSS, the first channel center frequency field, the second channel center frequency field, the third center frequency field, and the fourth center frequency field are used to indicate location information of the BSS, and the bandwidth information is any channel bandwidth in a plurality of channel bandwidths that can be supported by a terminal; and the processing module 202 is configured to send the bandwidth configuration information of the BSS.

On a basis of the foregoing technical solution, the extremely high throughput operation element further includes a puncture information field used to indicate a punctured channel in the BSS.

On a basis of the foregoing technical solution, the puncture information field includes at least one bit, the bit one-to-one corresponds to a channel element in a channel bandwidth of the BSS; and when the bit is a preset value, it indicates that the corresponding channel element is a punctured channel, and the channel element is 20 MHz.

On a basis of the foregoing technical solution, the puncture information field includes puncture mode indication information used to indicate that the punctured channel is in any one of preset punctured channel modes.

On a basis of the foregoing technical solution, the transceiver module 201 is configured to send a high throughput operation element, where the high throughput operation element includes a primary channel field, and identification information of a primary channel is carried in the primary channel field.

On a basis of the foregoing technical solution, the transceiver module 201 is configured to send a high efficiency operation element, where the high efficiency operation element includes a primary channel field, and identification information of a primary channel is carried in the primary channel field.

On a basis of the foregoing technical solution, the channel bandwidth field indicates a first preset value, a second preset value, or a third preset value, the first channel center frequency field includes first channel center frequency information used to indicate a center frequency of the channel bandwidth of the BSS, and the second channel center frequency field, the third channel center frequency field, and the fourth channel center frequency field are set to zero, where the first preset value is used to indicate that the channel bandwidth of the BSS is 20 MHz, the second preset value is used to indicate that the channel bandwidth of the BSS is 40 MHz, and the third preset value is used to indicate that the channel bandwidth of the BSS is 80 MHz.

On a basis of the foregoing technical solution, the channel bandwidth field indicates a fourth preset value, the first channel center frequency field includes second channel center frequency information used to indicate a center frequency of a first segment of the BSS, the second channel center frequency field includes third channel center frequency information used to indicate a center frequency of a second segment of the BSS, and the third channel center frequency field and the fourth channel center frequency field are set to zero, where the fourth preset value is used to indicate that the channel bandwidth of the BSS is 160 MHz or 80+80 MHz; and if a difference between the second channel center frequency information and the third channel center frequency information is equal to a first preset difference, the channel bandwidth of the BSS is 160 MHz; or if a difference between the second channel center frequency information and the third channel center frequency information is greater than a first preset difference, the channel bandwidth of the BSS is 80+80 MHz.

On a basis of the foregoing technical solution, the channel bandwidth field indicates a fifth preset value, the first channel center frequency field includes fourth channel center frequency information used to indicate a center frequency of a first segment of the BSS, the second channel center frequency field includes fifth channel center frequency information used to indicate a center frequency of a second segment of the BSS, the third channel center frequency field includes sixth channel center frequency information used to indicate a center frequency of a third segment of the BSS, and the fourth channel center frequency field is set to zero, where the fifth preset value is used to indicate that the channel bandwidth of the BSS is 240 MHz, 160+80 MHz, or 80+160 MHz; and if a difference between the fourth channel center frequency information and the fifth channel center frequency information is equal to a second preset difference, and a difference between the fifth channel center frequency information and the sixth channel center frequency information is equal to the second preset difference, the channel bandwidth of the BSS is 240 MHz; if a difference between the fourth channel center frequency information and the fifth channel center frequency information is equal to a third preset difference, and a difference between the fifth channel center frequency information and the sixth channel center frequency information is greater than the third preset difference, the channel bandwidth of the BSS is 160+80 MHz; or if a difference between the fourth channel center frequency information and the fifth channel center frequency information is greater than a fourth preset difference, and a difference between the fifth channel center frequency information and the sixth channel center frequency information is equal to the fourth preset difference, the channel bandwidth of the BSS is 80+160 MHz.

On a basis of the foregoing technical solution, the channel bandwidth field indicates a sixth preset value, the first channel center frequency field includes seventh channel center frequency information used to indicate a center frequency of a first segment of the BSS, the second channel center frequency field includes eighth channel center frequency information used to indicate a center frequency of a second segment of the BSS, the third channel center frequency field includes ninth channel center frequency information used to indicate a center frequency of a third segment of the BSS, and the fourth channel center frequency field includes tenth channel center frequency information used to indicate a center frequency of a fourth segment of the BSS, where the sixth preset value is used to indicate that the channel bandwidth of the BSS is 320 MHz or 160+160 MHz; and if a difference between the seventh channel center frequency information and the eighth channel center frequency information, a difference between the eighth channel center frequency information and the ninth channel center frequency information, and a difference between the ninth channel center frequency information and the tenth channel center frequency information are all equal to a fifth preset difference, the channel bandwidth of the BSS is 320 MHz; or if a difference between the seventh channel center frequency information and the eighth channel center frequency information and a difference between the seventh channel center frequency information and the tenth channel center frequency information are both equal to a sixth preset difference, and a difference between the eighth channel center frequency information and the ninth channel center frequency information is greater than the sixth preset difference, the channel bandwidth of the BSS is 160+160 MHz.

Figure 29:
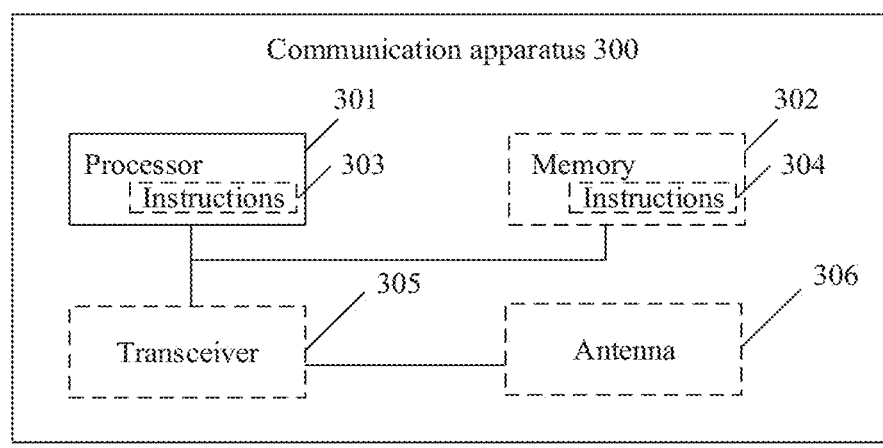
FIG. 29 is a schematic diagram of a structure of a communication apparatus according to an embodiment of this application.

The following describes an apparatus provided in an embodiment of this application, as shown in FIG. 29.

FIG. 29 is a schematic diagram of a structure of a communication apparatus according to an embodiment of this application. As shown in FIG. 29, a communication apparatus 300 may include a processor 301 and a transceiver 305, and optionally further includes a memory 302.

The transceiver 305 may be referred to as a transceiver unit, a transceiver circuit, or the like, and is configured to implement a transceiver function. The transceiver 305 may include a receiver and a transmitter. The receiver may be referred to as a receiver circuit, or the like, and is configured to implement a receiving function. The transmitter may be referred to as a transmitter circuit, or the like, and is configured to implement a sending function.

The memory 302 may store a computer program, software code, or instructions 304, where the computer program, the software code, or the instructions 304 may further be referred to as firmware. The processor 301 may control a MAC layer and a PHY layer by running a computer program, software code, or instructions 303 in the processor 301, or by invoking the computer program, the software code, or the instructions 304 stored in the memory 302, to implement the channel bandwidth configuration method provided in the foregoing embodiments of this application. The processor 301 may be a central processing unit (CPU), and the memory 302 may be, for example, a read-only memory (ROM), or a random access memory (RAM).

The processor 301 and the transceiver 305 that are described in this application may be implemented on an integrated circuit (IC), an analog IC, a radio frequency integrated circuit (RFIC), a hybrid signal (IC), an application-specific integrated circuit (ASIC), a printed circuit board (PCB), an electronic device, or the like.

The communication apparatus 300 may further include an antenna 306. Modules included in the communication apparatus 300 are merely examples for description, and are not limited in this application.

As described above, the communication apparatus described in the foregoing embodiment may be an access point or a station. However, a scope of the communication apparatus described in this application is not limited thereto, and the structure of the communication apparatus may not be limited in FIG. 29. The communication apparatus may be an independent device or may be a part of a relatively large device. For example, the communication apparatus may be implemented in the following form:

(1) an independent integrated circuit (IC), a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 30:
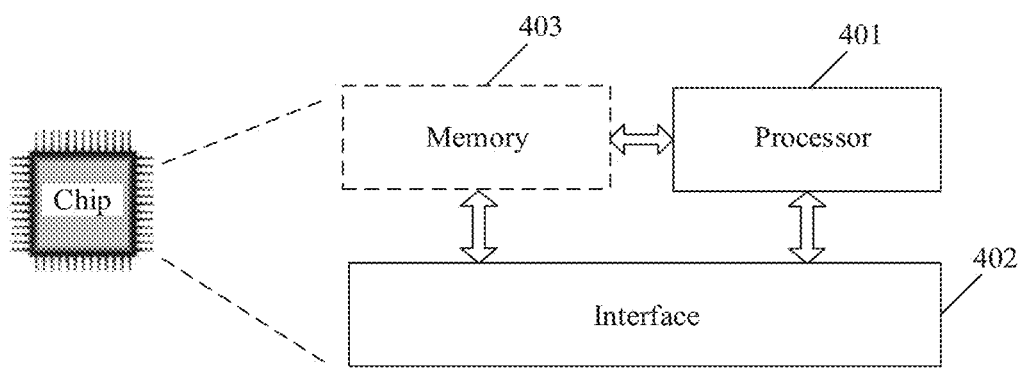
FIG. 30 is a schematic diagram of a structure of a chip system according to an embodiment of this application.

For the communication apparatus implemented in the form of the chip or the chip system, refer to a schematic diagram of a structure of a chip shown in FIG. 30. The chip shown in FIG. 30 includes a processor 401 and an interface 402. There may be one or more processors 401, and there may be a plurality of interfaces 402. Optionally, the chip or the chip system may include a memory 403.

All related content of the steps in the foregoing method embodiments may be cited in function descriptions of the corresponding functional modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by a terminal, to control the terminal to implement the foregoing method embodiments.

Based on a same technical concept, an embodiment of this application further provides a computer program. When the computer program is executed by a terminal, the computer program is used to implement the foregoing method embodiments.

The program may be entirely or partially stored in a storage medium that is packaged with a processor, or may be entirely or partially stored in a memory that is not packaged with a processor.

Based on a same technical concept, an embodiment of this application further provides a processor. The processor is configured to implement the foregoing method embodiments. The processor may be a chip.

Based on a same technical concept, an embodiment of this application further provides a communication system. The communication system includes the AP and the STA in the foregoing method embodiments.

Methods or algorithm steps described with reference to the content disclosed in the embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in the network device. Certainly, the processor and the storage medium may alternatively exist in the network device as discrete components.

A person skilled in the art should be aware that in the foregoing one or more examples, functions described in the embodiments of this application may be implemented by hardware, software, firmware, or any combination thereof. When the functions described in the embodiments of this application are implemented by the software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or special-purpose computer.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A communication method, comprising:
    receiving an extremely high throughput (EHT) operation element, wherein the EHT operation element comprises a channel bandwidth field, a first channel center frequency field, and a second channel center frequency field, wherein the channel bandwidth field indicates a channel bandwidth of a basic service set (BSS), the first channel center frequency field and the second channel center frequency field indicate channel location information of the BSS, wherein the channel bandwidth field indicates a preset value equal to 4, the preset value equal to 4 indicates that the channel bandwidth of the BSS is 320 MHz, the first channel center frequency field indicates a center frequency of a primary 160 MHz channel in the 320 MHz channel bandwidth of the BSS, the second channel center frequency field indicates a center frequency of the 320 MHz channel bandwidth of the BSS, and a difference between a value of the first channel center frequency field and a value of the second channel center frequency field is equal to 16; and
    obtaining bandwidth configuration information of the BSS based on the EHT operation element, wherein the bandwidth configuration information of the BSS comprises the channel bandwidth and the channel location information.

2. The communication method according to claim 1, wherein the EHT operation element further comprises a puncture bitmap indicating a punctured channel in the BSS.

3. The communication method according to claim 2, wherein the puncture bitmap comprises at least one bit; each bit of the at least one bit one-to-one corresponds to a channel element in the channel bandwidth of the BSS; and when the bit is a preset bit value, the preset bit value indicates that the corresponding channel element is a punctured channel, wherein a channel bandwidth of the channel element is 20 MHz.

4. The communication method according to claim 1, wherein the receiving EHT operation element, comprises:
    receiving the EHT operation element in a 5 GHz frequency band.

5. The communication method according to claim 4, wherein the receiving EHT operation element in the 5 GHz frequency band comprises:
    receiving a management frame in the 5 GHz frequency band, wherein the management frame carries a high throughput (HT) operation element and the EHT operation element.

6. The communication method according to claim 1, wherein the receiving EHT operation element, comprises:
    receiving the EHT operation element in a 6 GHz frequency band.

7. The communication method according to claim 6, wherein the receiving EHT operation element in the 6 GHz frequency band comprises:
    receiving a management frame, wherein the management frame carries a high efficiency (HE) operation element and the EHT operation element.

8. An apparatus, comprising:
    at least one processor; and
    at least one memory that stores computer instructions, which when executed by the at least one processor, cause the apparatus to:
        receive an extremely high throughput (EHT) operation element, wherein the EHT operation element comprises a channel bandwidth field, a first channel center frequency field, and a second channel center frequency field, wherein the channel bandwidth field indicates a channel bandwidth of a basic service set (BSS), the first channel center frequency field and the second channel center frequency field indicate channel location information of the BSS, wherein the channel bandwidth field indicates a preset value equal to 4, the preset value equal to 4 indicates that the channel bandwidth of the BSS is 320 MHz, the first channel center frequency field indicates a center frequency of a primary 160 MHz channel in the 320 MHz channel bandwidth of the BSS, the second channel center frequency field indicates a center frequency of the 320 MHz channel bandwidth of the BSS, and a difference between a value of the first channel center frequency field and a value of the second channel center frequency field is equal to 16; and obtain bandwidth configuration information of the BSS based on the EHT operation element, wherein the bandwidth configuration information of the BSS comprises the channel bandwidth and the channel location information.

9. The apparatus according to claim 8, wherein the EHT operation element further comprises a puncture bitmap indicating a punctured channel in the BSS.

10. The apparatus according to claim 9, wherein the puncture bitmap comprises at least one bit; each bit of the at least one bit one-to-one corresponds to a channel element in the channel bandwidth of the BSS; when the bit is a preset bit value, the preset bit value indicates that the corresponding channel element is a punctured channel, wherein a channel bandwidth of the channel element is 20 MHz.

11. The apparatus according to claim 8, wherein the computer instructions, when executed by the at least one processor, cause the apparatus to:
receive the EHT operation element in a 5 GHz frequency band.

12. The apparatus according to claim 11, wherein the computer instructions, when executed by the at least one processor, cause the apparatus to:
receive a management frame in the 5 GHz frequency band, wherein the management frame carries a high throughput (HT) operation element and the EHT operation element.

13. The apparatus according to claim 8, wherein the computer instructions, when executed by the at least one processor, cause the apparatus to:
receive the EHT operation element in a 6 GHz frequency band.

14. The apparatus according to claim 13, wherein the computer instructions, when executed by the at least one processor, cause the apparatus to:
receive a management frame, wherein the management frame carries a high efficiency (HE) operation element and the EHT operation element.

15. A non-transitory computer readable storage medium storing computer instructions, which when executed by at least one processor, causing an apparatus comprising the at least one processor to:
receive an extremely high throughput (EHT) operation element, wherein the EHT operation element comprises a channel bandwidth field, a first channel center frequency field, and a second channel center frequency field, wherein the channel bandwidth field indicates a channel bandwidth of a basic service set (BSS), the first channel center frequency field and the second channel center frequency field indicate channel location information of the BSS, wherein the channel bandwidth field indicates a preset value equal to 4, the preset value equal to 4 indicates that the channel bandwidth of the BSS is 320 MHz, the first channel center frequency field indicates a center frequency of a primary 160 MHz channel in the 320 MHz channel bandwidth of the BSS, the second channel center frequency field indicates a center frequency of the 320 MHz channel bandwidth of the BSS, and a difference between a value of the first channel center frequency field and a value of the second channel center frequency field is equal to 16; and
obtain bandwidth configuration information of the BSS based on the EHT operation element, wherein the bandwidth configuration information of the BSS comprises the channel bandwidth and the channel location information.

16. The non-transitory computer readable storage medium according to claim 15, wherein the EHT operation element further comprises a puncture bitmap indicating a punctured channel in the BSS.

17. The non-transitory computer readable storage medium according to claim 16, wherein the puncture bitmap comprises at least one bit; each of the at least one bit one-to-one corresponds to a channel element in the channel bandwidth of the BSS; when the bit is a preset bit value, the preset bit value indicates that the corresponding channel element is a punctured channel, wherein a channel bandwidth of the channel element is 20 MHz.

18. The non-transitory computer readable storage medium according to claim 15, wherein the computer instructions, when executed by the at least one processor, cause the apparatus to:
receive a management frame in a 5 GHz frequency band, wherein the management frame carries a high throughput (HT) operation element and the EHT operation element.

19. The non-transitory computer readable storage medium according to claim 15, wherein the computer instructions, when executed by the at least one processor, cause the apparatus to:
receive a management frame in a 6 GHz frequency band,, wherein the management frame carries a high efficiency (HE) operation element and the EHT operation element.

* * * * *